United States Patent
Wilson

(10) Patent No.: US 9,422,690 B2
(45) Date of Patent: Aug. 23, 2016

(54) METHOD AND APPARATUS FOR PERFORMING BURIAL ASSESSMENT SURVEYS

(71) Applicant: Michael W. N. Wilson, Aberdeenshire (GB)

(72) Inventor: Michael W. N. Wilson, Aberdeenshire (GB)

(*) Notice: Subject to any disclaimer, the term of this patent is extended or adjusted under 35 U.S.C. 154(b) by 138 days.

(21) Appl. No.: 14/083,095

(22) Filed: Nov. 18, 2013

(65) Prior Publication Data

US 2014/0154014 A1 Jun. 5, 2014

Related U.S. Application Data

(63) Continuation-in-part of application No. 13/691,076, filed on Nov. 30, 2012.

(51) Int. Cl.
| | |
|---|---|
| *E02F 5/10* | (2006.01) |
| *E02F 5/02* | (2006.01) |
| *E02F 5/12* | (2006.01) |
| *E02F 5/14* | (2006.01) |
| *H02G 1/10* | (2006.01) |

(52) U.S. Cl.
CPC ............... *E02F 5/027* (2013.01); *E02F 5/106* (2013.01); *E02F 5/125* (2013.01); *E02F 5/14* (2013.01); *H02G 1/10* (2013.01)

(58) Field of Classification Search
CPC .................................. E02F 5/106; E02F 5/125
See application file for complete search history.

(56) References Cited

U.S. PATENT DOCUMENTS

| | | |
|---|---|---|
| 3,757 A | 9/1844 | Owen |
| 416,999 A | 12/1889 | Coult |
| 2,194,947 A | 3/1940 | Lawton |
| 3,347,054 A | 10/1967 | Sherrod |
| 3,540,226 A | 11/1970 | Sherrod |
| 3,732,701 A | 5/1973 | Lynch |

(Continued)

FOREIGN PATENT DOCUMENTS

| | | |
|---|---|---|
| CN | 101 187 211 A | 5/2008 |
| DE | 1105355 | 4/1961 |

(Continued)

OTHER PUBLICATIONS

E-Marine—Information entitled "Sea Plough" from website: http://www.emarine.ae/en/index.php?page=sea-plough, Apr. 23, 2012.

(Continued)

*Primary Examiner* — Matthew D Troutman
(74) *Attorney, Agent, or Firm* — Frank J. Catalano; Gable Gotwals

(57) ABSTRACT

A BAS plow creates a V-trench along the linear route of a pipeline path and an instrumented bottle moving with the BAS plow collects BAS data indicative of the pitch, roll, heading, yaw, three dimensional positioning, speed and depth of the chassis, the shearing force applied to the seabed material and the applied tow force. The bottle can be swapped to collect the acquired data or an umbilical can be used to provide a real time stream of data. The Bas plow can simultaneously backfill the created trench, leaving an undisrupted seabed, or the pipeline can be laid in the BAS trench, which can also be made deeper and wider by additional trench cutting passes, significantly reducing the total time required for combined BAS and pipeline laying processes. The BAS plow can be released and retrieved over-the-stem of a towing vessel.

15 Claims, 63 Drawing Sheets

(56) References Cited

U.S. PATENT DOCUMENTS

| | | |
|---|---|---|
| 3,990,377 A | 11/1976 | Marquinez |
| 4,011,727 A | 3/1977 | Suzuki et al. |
| 4,129,992 A | 12/1978 | Carlsson et al. |
| 4,329,793 A | 5/1982 | Reece |
| 4,428,132 A | 1/1984 | Reece |
| 4,479,741 A | 10/1984 | Berti et al. |
| 4,538,937 A | 9/1985 | Lynch |
| 4,585,372 A | 4/1986 | Grinsted et al. |
| 4,802,793 A | 2/1989 | Grinsted et al. |
| 4,892,443 A | 1/1990 | Kunze et al. |
| 4,992,000 A | 2/1991 | Doleshal |
| 5,288,172 A | 2/1994 | Reuhl |
| 5,462,389 A | 10/1995 | Messina |
| 5,855,181 A | 1/1999 | Oxford |
| 6,022,173 A * | 2/2000 | Saxon .................. E02F 5/08 37/337 |
| 6,050,009 A | 4/2000 | Adamson et al. |
| 6,061,932 A | 5/2000 | Rowley |
| 6,647,853 B2 | 11/2003 | Hickey |
| 6,719,494 B1 * | 4/2004 | Machin ................ E02F 3/9206 37/344 |
| 6,821,054 B2 | 11/2004 | Ballard |
| 6,837,653 B1 | 1/2005 | Grinsted |
| 8,091,255 B2 | 1/2012 | Drabble |
| 8,827,001 B2 * | 9/2014 | Wendte ................ A01B 63/008 172/4 |
| 2002/0071724 A1 | 6/2002 | Reece |
| 2004/0031174 A1 | 2/2004 | Ballard |
| 2008/0017096 A1 | 1/2008 | Shepherd |
| 2013/0225069 A1 | 8/2013 | Bruce |

FOREIGN PATENT DOCUMENTS

| | | |
|---|---|---|
| EP | 0088190 | 9/1983 |
| EP | 0116410 | 8/1984 |
| EP | 0296783 | 12/1988 |
| EP | 816 574 A1 | 1/1998 |
| FR | 1156475 | 5/1958 |
| FR | 2284715 | 4/1976 |
| GB | 2285821 | 7/1995 |
| GB | 2 448 909 A | 11/2008 |
| GB | 2448909 | 12/2010 |
| JP | S5392518 | 8/1978 |
| JP | 2001 259562 A | 9/2001 |
| WO | WO 2012/064271 A1 | 5/2012 |

OTHER PUBLICATIONS

Nord Stream—Press release dated Feb. 8, 2011; from website: http://www.nord-stream.com/press-info/press-releases/seabed-works-ensure-safety-of-nord, Apr. 23, 2012.
Underwater Plows 492 Oil and Gas Journal, vol. 79, No. 6, Feb. 1981, pp. 77-80,—XP-001334447, p. 77, Tulsa, Oklahoma, USA.
Ecosse Subsea Systems—SCAR pre-cut trenching plough YouTube video released Nov. 1, 2010: www.youtube.com/watch?v=clPyXqHq6Yw.

* cited by examiner

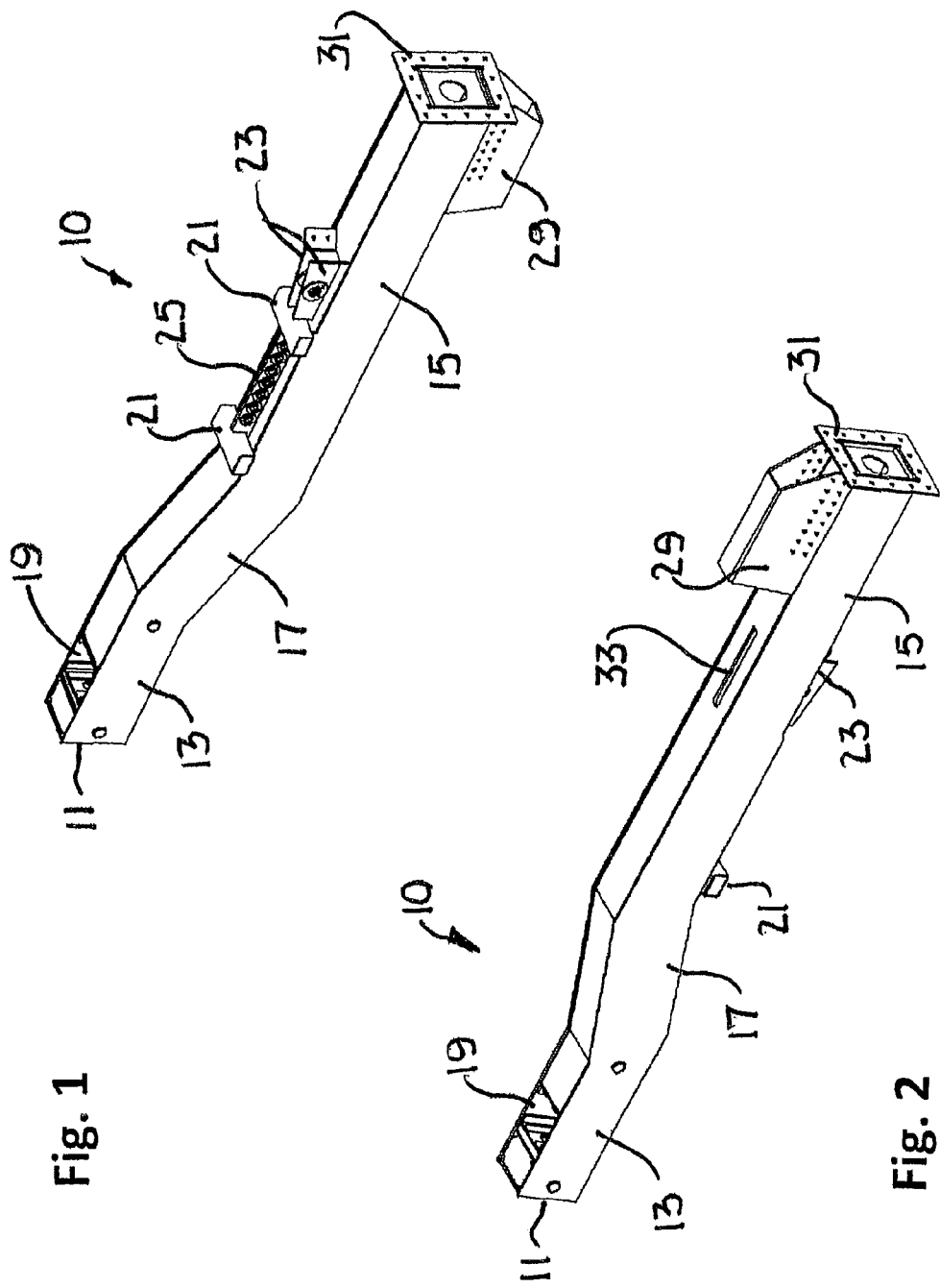

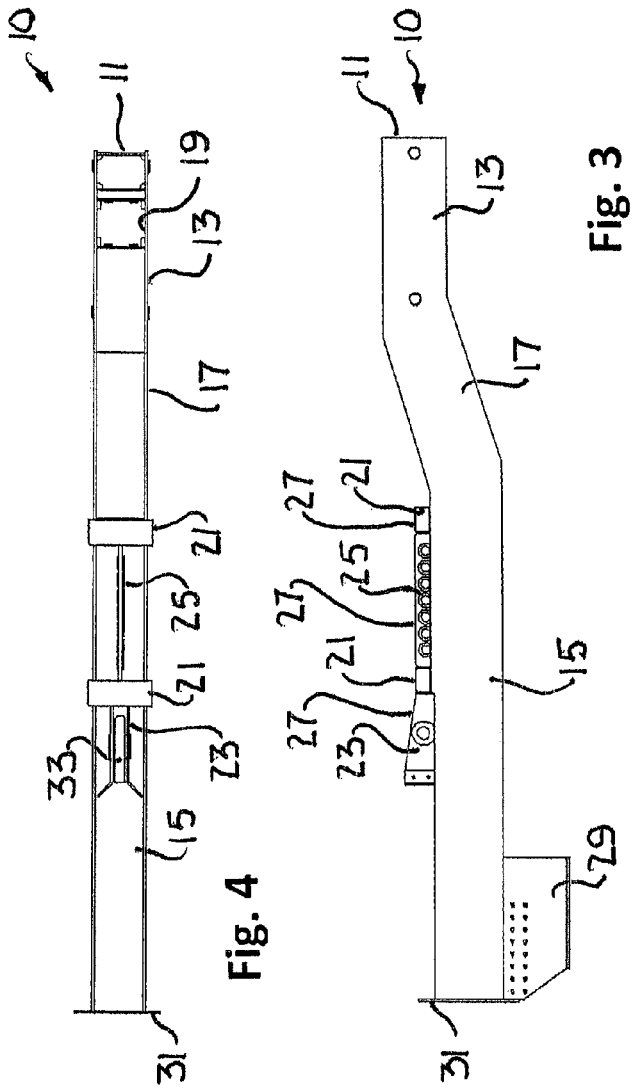

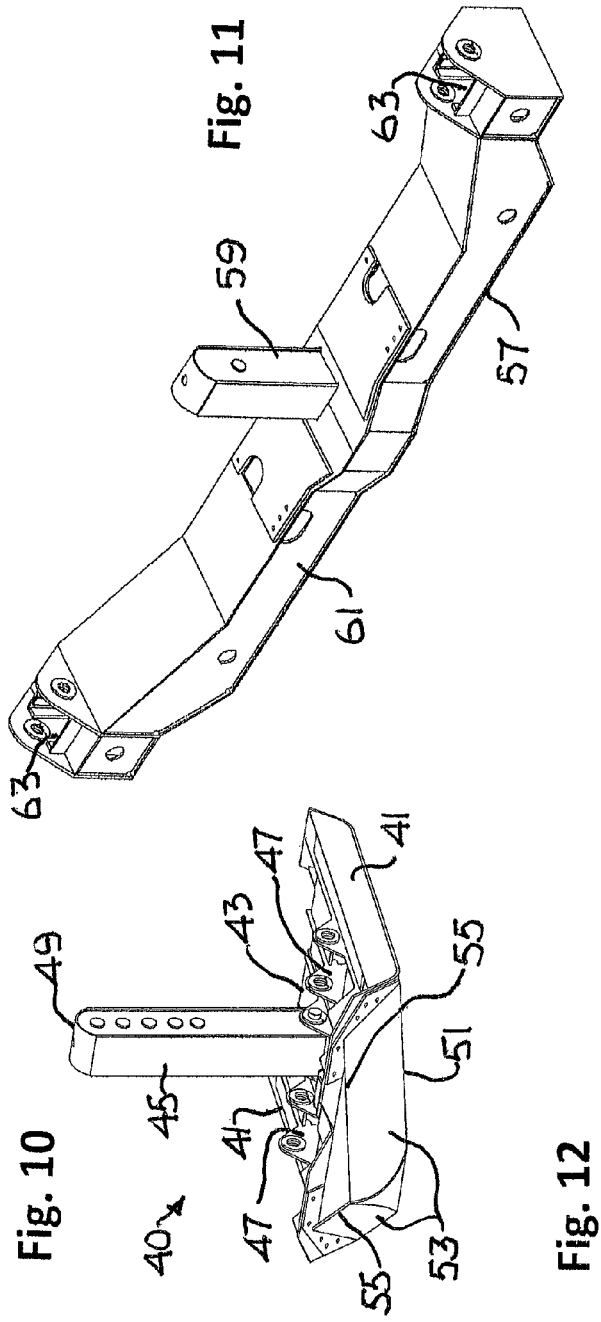

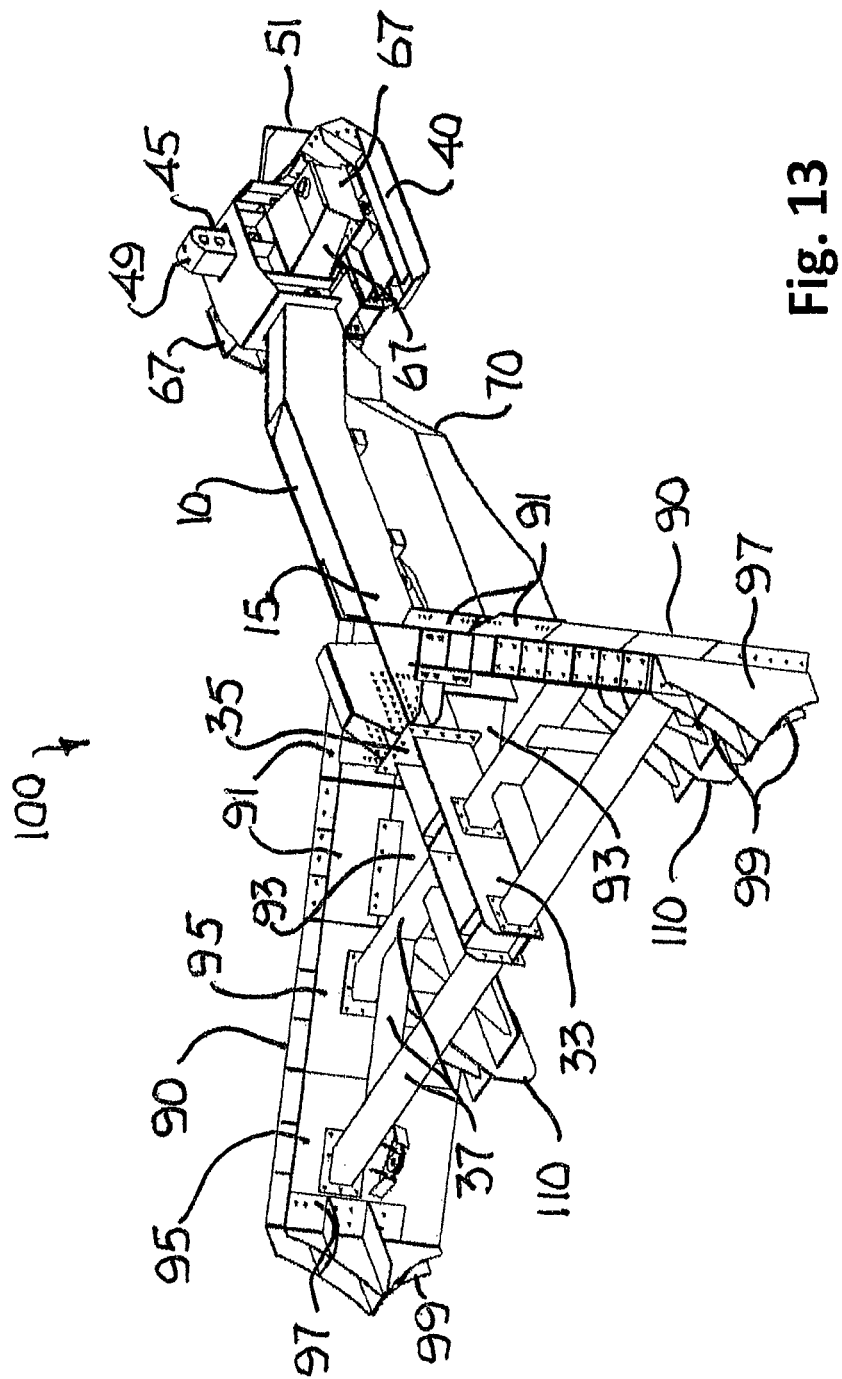

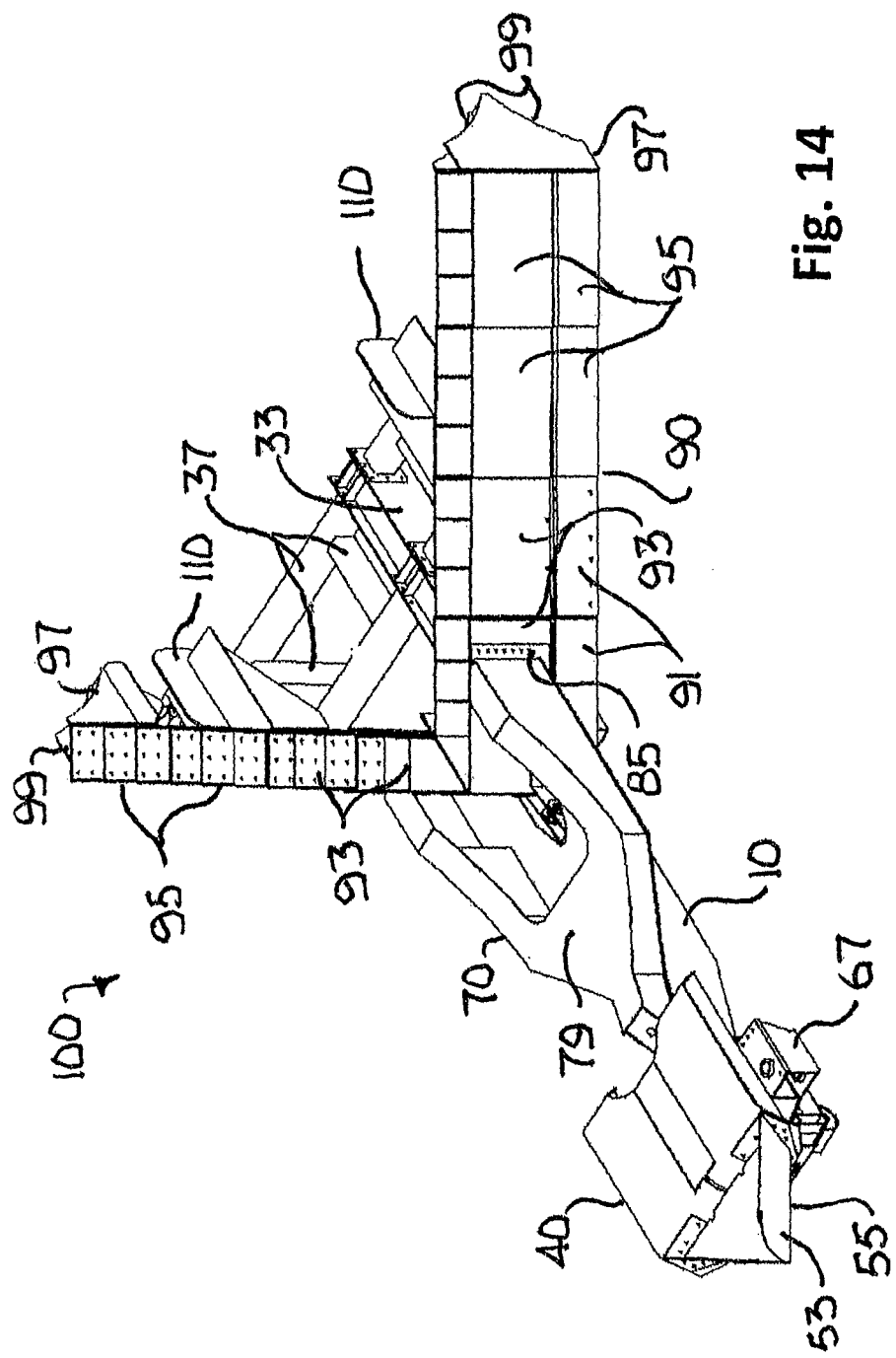

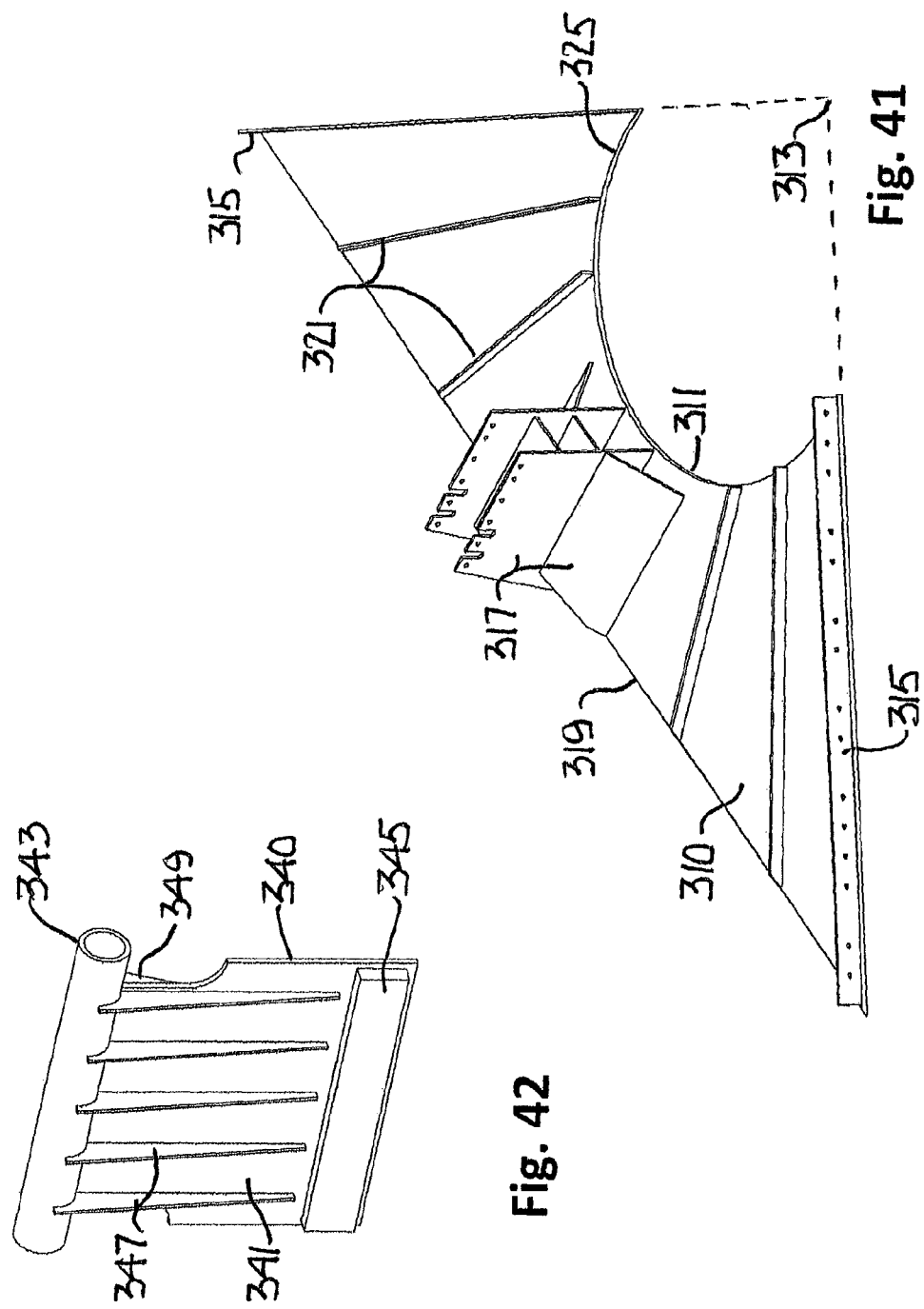

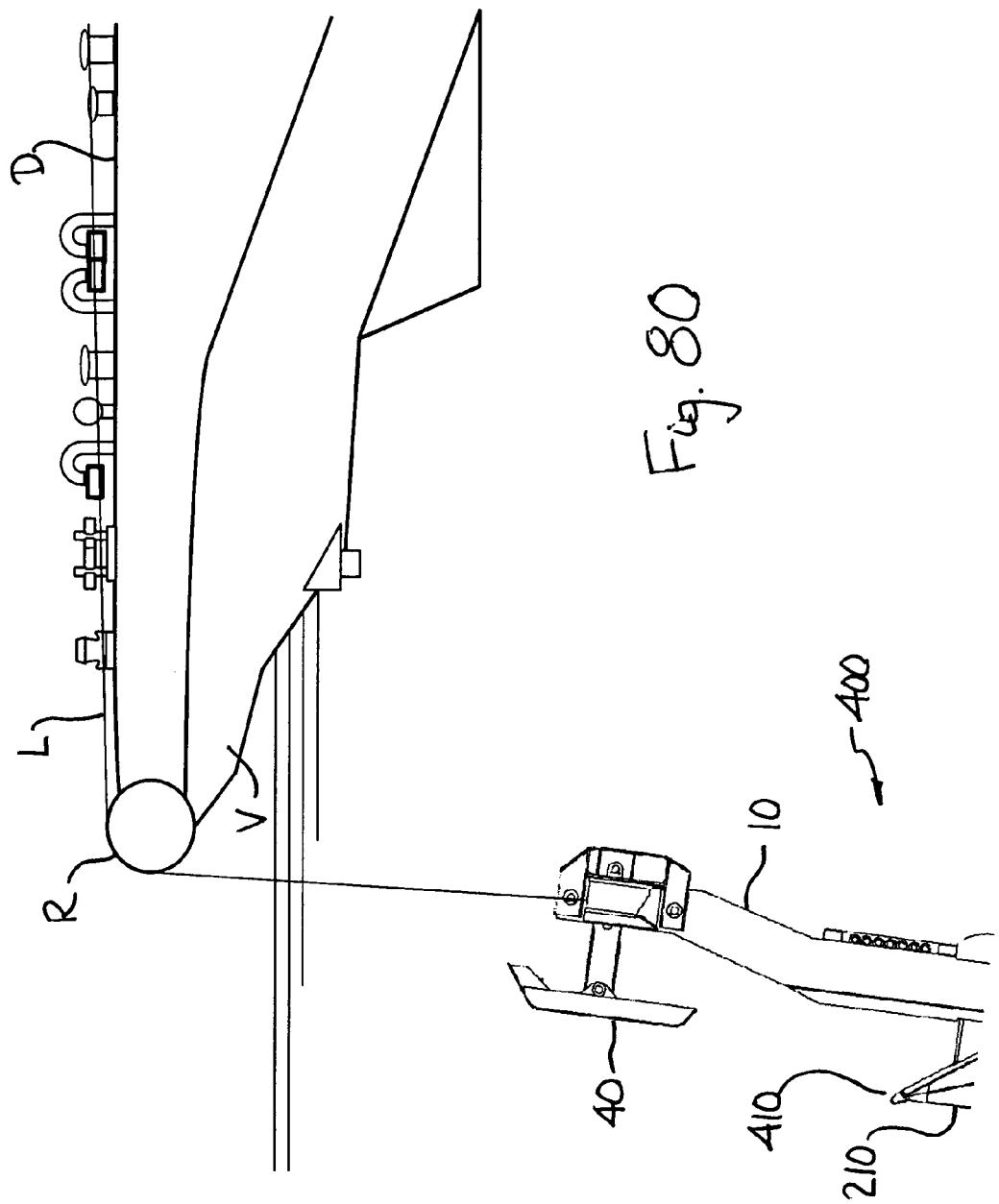

METHOD AND APPARATUS FOR PERFORMING BURIAL ASSESSMENT SURVEYS

CROSS-REFERENCE TO CO-PENDING APPLICATIONS

This application is a continuation-in-part of U.S. patent application Ser. No. 13/691,076 filed Nov. 30, 2012 and claims priority to that application.

BACKGROUND OF THE INVENTION

This invention relates generally to the offshore laying of pipe and cable and more particularly concerns equipment used in the preparation and trenching of the seabed to receive the pipe or cable and in the backfilling of the trench once the pipe or cable has been laid.

Present pipe laying methods include a few basic seabed trenching tasks performed using long-accepted, time-consuming, budget-eating practices and equipment.

One problem is that sometimes, before trenching can begin, it may be necessary to clear the seabed of boulders on, or partially buried in, the intended pipeline path. Presently, the boulder removal process involves dragging the boulders, one at a time, at cables-end from a transport/towing vessel. In some boulder fields, this can be a lengthy and tedious process. It always requires one or more divers, a remotely operated vehicle (ROV), or other boulder handling mechanisms to connect the cable to the boulder.

Another problem is that, when the time for trench cutting arrives, a trench cutting plow must be lowered to the seabed. Launching a trench cutting plow typically requires a large vessel carrying a crane and supporting equipment to lift the plow from the vessel, to swing the plow clear of the deck and to lower the plow into the sea. After its final trench cutting pass, retrieval of the trench cutting plow from the seabed to its storage area on the towing vessel again requires use of the crane and supporting equipment. In operation on the seabed, known trench cutting plows have additional problems. For example, many require skids which straddle the width of the trench being cut, so the number of possible passes that can be made and the depth of the trench that can be cut is limited.

Similar problems are experienced in the backfilling of the trench to cover the pipe. First, a heavy backfill plow must be lowered to the seabed. As with launching trench cutting plows, launching known backfill plows typically requires a large vessel and a crane and supporting equipment to raise the plow from the vessel, to swing the plow clear of the deck and to lower the plow into the sea. After its final pass the backfill plow must be retrieved from the seabed and returned to its place on the towing vessel by use of the crane and supporting equipment. In operation of the backfill plow on the seabed, one or more passes of the plow are necessary to cover the pipeline and fill the trench. Typical known backfill plows have chasses with front skids which travel in the trench and straddle the pipeline, followed by moldboards which are angled forwardly and away from the chassis to collect the spoil in their path and deposit it in the trench to the sides of the pipeline. Since the skids ride in the trench in close proximity to the pipeline, there is significant risk that contact with the skids will compromise the integrity of the pipe. Also, since the mixture of seawater and spoil, which is more dense than the hollow pipe, is pushed by the moldboards to the outer limits of the trench and discharged to the sides of the pipe, there is a significant risk that, as the spoil settles, the pipe will "float," resulting in inadequate burial of the pipeline.

Much of the seabed trenching task equipment and operating methods are, in terms of time and money, very inefficient and beg for improvement. But the inadequacy of the individual plows and their operating methods is dwarfed by the need for a large, heavily equipped vessel to transport, launch and retrieve these plows instead of a much smaller vessel which could otherwise be used for operating purposes. Typically, the cost of known trench cutting and backfill plows is in a range of $8,000,000 each. The cost of the transport/towing vessel with the crane and supporting equipment is in a range of $500,000,000. The rental fee for the vessel and plows ranges from $150,000 to $600,000 per day.

Accordingly, it is an object of this invention to reduce the weight and cost and increase the efficiency of the plows, equipment and vessels used in the offshore laying of pipe and cable.

This invention may also be adapted to relate generally to the burial of offshore pipelines and cables and more particularly to the performance of burial assessment surveys at offshore pipeline and cable sites.

The relative quantities of sand, clay and boulders along the pipeline or cable path have a significant impact on the choice of trenching tools. Traditionally, a burial assessment survey (BAS) is performed for this purpose. Presently known BAS methods involve taking core samples and conducting core penetrometer tests, followed by interpretation of the collected data by geotechnical engineers. The data collected is then used to facilitate the selection of the appropriate trenching tool and also to prepare an estimate of anticipated trenching progress rates.

The primary purpose of core sampling and penetrometer testing is to find "bedrock" for building purposes. Taking the samples and performing the tests are substantially vertical motion activities reasonably well suited to localized building site assessments. However, in the assessment of pipeline and cable paths, they require inordinate interpolation and guess work. Typically, pipeline and cable sampling and testing are performed at 1 km intervals. Therefore, use of the known BAS methods to assess such paths takes considerable time and produces data streams with enormous gaps.

Sometimes, knife-type cutting plows are instrumented to provide some trench center line data, but the linear data collected is insufficient to support a V-trench wide analysis. Furthermore, in this linear approach, the full time required to trace the path centerline is lengthy and generally serves no other purpose than to collect limited linear data. And the disruption of the sea bed by the knife-type cut remains when the trace is completed.

It is, therefore, an object of this invention to provide a method and apparatus useful in the performance of burial assessment surveys. It is also an object of this invention to provide a BAS method and apparatus capable of producing continuous streams of data descriptive of the V-trench cross-sections of possible pipeline or cable paths. It is a further object of this invention to provide a BAS method and apparatus capable of reducing the total time required for combined BAS and actual pipeline or cable V-trench cutting processes. Another object of this invention is to provide a BAS method and apparatus useable in the performance of burial assessment surveys without leaving a disrupted seabed when the trace is completed.

SUMMARY OF THE INVENTION

Single and Multi-Mode Chasses

In accordance with the invention, a seabed-plow chassis is provided in which an elongated member is adapted for mounting a skid on one of its ends to support that end above the seabed and is adapted for mounting one or more tools on its other end to perform a variety of seabed trenching tasks.

In a first mode of operation in which the chassis is a part of a boulder clearing plow, the tool consists of moldboards for clearing boulders which are initially pushed by the skid outward of the path traveled by the skid further outward from the path as the skid leads the moldboards along the seabed.

In a second mode of operation in which the chassis is a part of a trench cutting plow, the tool consists of a plow share and moldboards for sequentially cutting and moving spoil to create a trench as the skid leads the plow share and moldboards along the seabed.

In a third mode of operation in which the chassis is a part of a backfill plow, the tool consists of a blade and moldboards which cooperate as the blade and moldboards lead the skid along the seabed to sequentially collect, funnel inward and release downward into the trench spoil lying outside of the trench.

Different chasses can be adapted to accommodate each of the modes or the same chassis can be adapted to interconnect any of the tools with the skid according to the desired mode of operation.

The elongated member of the chassis may have one or more permanent transition surfaces or one or more attachments providing transition surfaces. The transition surfaces are configured to extend between the skid and the various tools which may be mounted on the chassis. The transition surface contours are shaped and located so that the appropriate transition surface makes contact with and pivots about a fulcrum on the stern of a plow transporting/towing vessel as the plow crosses that fulcrum during its release from the vessel into the sea and during its retrieval from the sea onto the vessel. The shapes and locations of the transition surfaces and the weight of the elongated member are coordinated so as to resist roll of the chassis about a transition axis as the plow moves on the deck or across the fulcrum.

Preferably, the vertical longitudinal cross-sections of the transition surfaces are concave, the fulcrum is a roller and the paths defined by continuous symmetrically opposite points of the transition surfaces are contoured to maintain contact with the roller as the plow crosses the roller.

In a preferred embodiment of the chassis for use in more than one mode of operation, a first transition surface is configured to extend between the skid and the tool in the first/boulder clearing and third/backfill modes and a second transition surface is configured to extend between the skid and the tool in the second/trench cutting mode.

Boulder Clearing Plow and Methods

For clearing boulders from a seabed, the plow includes the chassis, a skid mounted on and supporting one end of the chassis above the seabed and moldboards mounted on and oriented in angular relationship to the other end of the chassis. The trailing moldboards clear boulders initially pushed outwardly by the leading skid further outward as the skid leads the moldboards along the seabed.

In a preferred embodiment of the boulder clearing plow, a head is mounted on a leading end of the skid. The head has leading faces angled rearward from a vertical, longitudinal center plane of the skid and tapered rearward from its top edges, enabling the head to torque boulders partially buried in the seabed away from the skid. The chassis transition surface extends between the skid and the moldboards and is contoured to maintain contact with and pivot about the fulcrum/roller on the stern of the vessel as the plow crosses the fulcrum during launch and recovery.

The boulder clearing plow may also include keel plates, at least one keel plate extending under each moldboard. The heel plates' primary function is to ensure the lateral stability of the plow during operation by resisting departure of the plow from its intended path even when the plow encounters seabed obstructions or uneven amounts of spoil.

The plow components are, in weight and in their contact surfaces with the fulcrum, coordinated to resist roll of the plow about a launch and recovery transition axis of the boulder clearing plow.

Pulling points for connection of a pulling line to the boulder clearing plow are symmetrically arranged in relation to the longitudinal axis of the chassis and are displaced from the bottom of the boulder clearing plow by a height less than a radius of the vessel roller to facilitate passage of the plow contact surface over the vessel roller.

The method of clearing boulders from a path on the seabed includes the steps of positioning the plow bow-forward in the direction of an initial seabed path and then propelling the plow along the initial seabed path to push boulders lying in the initial seabed path to the port and starboard sides of the plow. After the initial path is cleared the method continues, if a wider path is necessary, with the step of repositioning the plow bow-forward in a direction opposite the initial seabed path direction and on a second seabed path along one of the port and starboard sides of the initial seabed path. Once so repositioned, the method continues with the step of propelling the plow along the second seabed path to push boulders from the second seabed path further to one of the starboard and port sides of the plow, respectively. After the second path is cleared the method continues, if an even wider path is necessary, with the step of repositioning the plow bow-forward in the direction of the initial seabed path and on a third seabed path along the other of the starboard and port sides of the initial seabed path. Once so repositioned, the method continues with the step of propelling the plow along the third seabed path to push boulders from the third seabed path further to the other of the starboard and port sides of the plow, respectively. If a still wider path is necessary, the method can further include repeating the above widening steps in relation to the path resulting from the contiguity of the initial, second and third paths. The method anticipates repeating these steps for successively contiguous paths until a single path of desired width has been cleared along the seabed.

For the over-the-stern boulder clearing plow herein disclosed, the method of clearing boulders from the seabed path is preceded by the steps of propelling the plow on the deck of the vessel toward and across the fulcrum on the stern of the vessel, allowing the plow to rotate about the fulcrum as the plow crosses the fulcrum and is released from the fulcrum into the sea and lowering the released plow at tow-line end toward the seabed. Furthermore, the method of clearing boulders from the seabed path is followed by the steps of raising the plow at tow-line end toward the fulcrum on the stern of the vessel at the other end of the tow line and pulling the plow across the fulcrum onto the deck of the vessel.

Backfill Plow and Methods

For backfilling spoil into a seabed trench, the plow includes the chassis, a skid supporting the aft end of the chassis above the seabed, moldboards mounted on the chassis forward of the skid and a blade mounted on and spanning the bottom edges of the moldboards. The blade collects the spoil in its path as the plow travels forward on the seabed. The moldboards are sized and oriented to span the trench and funnel the collected spoil toward the center of the blade as the plow travels forward on the seabed. The blade has a passage at its rear apex which is configured to dispense the collected and funneled spoil onto the top of a pipe disposed in the trench below the passage.

In a preferred embodiment, the backfill plow further includes a flapper board aft of the passage which fragments spoil discharged through the passage. The flapper board consists of a plate swinging below a horizontal shaft with a weight biasing the plate toward a vertical orientation.

The skid is configured to straddle the trench and includes a crossbar mounted on the rear end of the chassis, a pair of skid posts, one on each end of the crossbar, and a pair of skis, one on the bottom of each post. The front surface of the crossbar may be adapted to the level spoil which has been discharged into the trench.

The backfill plow may also include at least two keel plates spaced apart under the blade. The primary function of the keel plates is to ensure the lateral stability of the plow during operation by resisting departure of the backfill plow from its intended path even when the plow encounters seabed obstructions or uneven amounts of spoil.

The plow has at least one transition surface between the skid and the moldboards which is contoured to contact and pivot about the fulcrum on the stern of a vessel as the backfill plow crosses the fulcrum during launch and retrieval of the backfill plow from and to the vessel.

The plow components are, in weight and in contact surfaces with the fulcrum, coordinated to resist roll of the backfill plow about the transition axis of the plow.

Pulling points for connection of a pulling line to the backfill plow are symmetrically arranged in relation to the longitudinal axis of the chassis and are displaced from the bottom of the backfill plow by a height less than the radius of the roller to facilitate passage of the plow contact surfaces over the roller.

The method of backfilling spoil into a seabed trench includes the steps of propelling the blade to travel forward on the seabed and collect spoil along the sides of the trench, funneling the collected spoil toward a rear apex of the blade and allowing the funneled spoil to be discharged through an opening in the blade apex and onto a top surface of a pipe disposed in the trench. The method may further include one or both of the steps of fragmenting the discharged spoil before the discharged spoil reaches the pipe and/or leveling the spoil after it is discharged into the trench.

For the over-the-stern backfill plow herein disclosed, the method of backfilling spoil into the trench is preceded by the steps of propelling the backfill plow on the deck of the vessel toward and across the fulcrum on the stern of the vessel, allowing the backfill plow to rotate about the fulcrum as the plow crosses the fulcrum and is released from the fulcrum into the sea and lowering the released plow at tow-line end to the seabed. Furthermore, the method of backfilling spoil into the trench can be followed by the steps of raising the backfill plow at tow-line end toward the fulcrum on the stern of the vessel at the other end of the tow line and pulling the plow across the fulcrum onto the deck of the vessel.

As a result of the above plow structures and methods, the vessels needed for transport, launch, recovery and operation of the plows are smaller and presently plentiful. They are available to the user at rental fees ranging from $10,000 to $100,000 per day. This is a huge savings in comparison to the $150,000 to $600,000 per day rental fees presently paid for vessels required by the old plow structures and methods.

Further in accordance with the invention, a new BAS apparatus and method are provided which will continuously collect data along the entire linear route of the pipeline or cable path. Each path is traced by the new BAS apparatus in the same manner that a typical anchor-type trench cutting plow will travel the pipeline or cable trenching path during the laying process.

The BAS plow has a chassis, a skid mounted on the leading end of the chassis, an anchor-type plow share mounted proximate a trailing end of the chassis and a bottle aligned parallel to and mounted for simultaneous motion with the chassis.

The bottle contains instrumentation suited to acquiring electronic logging data indicative of the pitch, roll, heading, yaw, speed and depth of the chassis. A sensor mounted on the tip of the plow share acquires data indicative of the shearing force applied by the plow share to the seabed. The sensor provides a continuous readout of the acquired data. Additional load cells mounted on the skid provide data indicative of the tow force applied to the skid. The bottle can be mounted externally on or internally within the chassis.

In a backfill embodiment of the plow, a T-shaped extension has a leg mounted on and extending rearward from the trailing end of the chassis and arms extending outward from a trailing end of the leg. Moldboards extend outward and forward from the distal ends of the arms. The bottom surfaces of the leg, arms and moldboards are in a common plane. The elevation of the moldboards in relation to the arms is adjustable.

In a variation of the backfill embodiment, a T-shaped extension has a leg mounted on and extending rearward and upward from the trailing end of the chassis and arms extending outward and downward from a trailing end of the leg. The moldboards extend forward from distal ends of the arms. The bottom surfaces of the leg and the arms defining an arch between the moldboards. The elevation of the moldboards in relation to the arms is adjustable.

The bottle instrumentation includes a gyro measuring the pitch, roll, heading, yaw and speed of the plow. The bottle can be swapped to collect the acquired data or a data transmission umbilical can be used to provide a real time stream of data. A hydro-acoustic link could also be used.

The BAS method of performing burial assessment surveys (BAS) along offshore pipeline and cable paths includes the simultaneous steps of creating a V-shaped trench and continuously acquiring BAS data along the trench being created. The V-shaped trench is created by towing a BAS plow with an anchor-type plow share on the seabed. Data is continuously acquired by towing the BAS plow with the bottle which contains instruments adapted to collect selected types of BAS data. Such data may include the plow speed, the trench depth, the pitch and roll of the plow, the heading and yaw and the three dimensional positioning of the plow. Data is also continuously acquired by towing the BAS plow with a sensor, adapted to collect selected other types of BAS data, mounted on the tip of the plow share. Such other data may include the tip resistance of the plow share. Data may further be continuously acquired by towing the BAS plow with load cells located to monitor the tow tension and/or and tow force applied to the plow.

The Bas plow may further perform the simultaneous step of backfilling the created trench. Backfilling may be accomplished by towing the BAS plow with the moldboards extending outward and forward from the trailing end of the chassis extension to collect and deposit spoil into the created trench. The moldboards may be connected to the BAS plow either by the straight T-shaped extension with which the bottom surfaces of the extension and the moldboards are in a common plane to permit the deposit of spoil and boulders to the top of the created trench or the angled T-shaped extension with an arch between the moldboards to permit the deposit of spoil and boulders to extend above the created trench.

The method contemplates laying a pipeline, cable or umbilical in the BAS trench or deepening and widening the created V-shaped BAS trench by at least one additional trench cutting pass and laying the pipeline, cable or umbilical in the deepened and widened trench.

The BAS plow can be released from the deck of a towing vessel by propelling the plow on the deck of the vessel toward and across a fulcrum on the stem of the vessel, allowing the plow to rotate about the fulcrum as the plow crosses the fulcrum and is released from the fulcrum into the sea and lowering the released plow at tow-line end toward the seabed. The BAS plow can be retrieved to the deck of the towing vessel by raising the plow at tow-line end toward the fulcrum on the stern of the vessel at the other end of the tow line and pulling the plow across the fulcrum onto the deck of the vessel.

BRIEF DESCRIPTION OF THE DRAWINGS

Other objects and advantages of the invention will become apparent upon reading the following detailed description and upon reference to the drawings in which:

FIG. 1 is a top, left, rear perspective view illustrating a chassis adapted for use in any of boulder clearing, trench cutting and backfill modes;

FIG. 2 is a bottom, right, front perspective view of the chassis of FIG. 1;

FIG. 3 is a side elevation view of the chassis of FIG. 1;

FIG. 4 is a top plan view of the chassis of FIG. 1;

FIG. 5 is a bottom plan view of the chassis of FIG. 1;

FIG. 10 is a top, left, front perspective view illustrating a skid configured for use in the boulder clearing mode and the first pass of a plow in trench cutting plow mode;

FIG. 11 is a top, left, front perspective view illustrating a crossbeam usable to convert two skids as seen in FIG. 10 into a skid configured for use in the backfill plow mode;

FIG. 12 is a front elevation view illustrating a skid configured for use in the second and subsequent passes of a plow in the trench cutting plow mode;

FIG. 13 is a top, right, rear perspective view illustrating the chassis of FIG. 1 used in the boulder clearing plow mode;

FIG. 14 is a bottom, right, front perspective view of the boulder clearing plow of FIG. 13;

FIG. 41 is a top, left, rear perspective view illustrating a spoil collecting blade for use with the backfill plow of FIG. 37;

FIG. 42 is a top, right, rear perspective view illustrating a flapper board for use with the backfill plow of FIG. 37;

FIG. 80 is a side elevation view of a fifth/first sequential pivot of a BAS plow in release/retrieval from/to a vessel to/from the sea.

Figure 6:
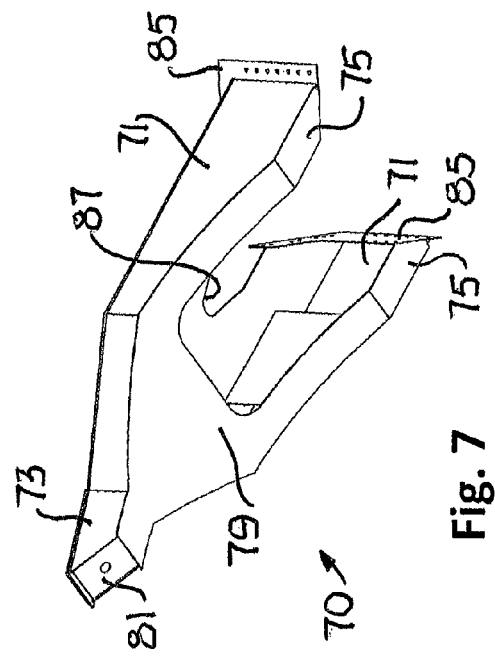
FIG. 6 is a top, left, front perspective view of a transition attachment for use with the chassis of FIG. 1.
Figure 7:
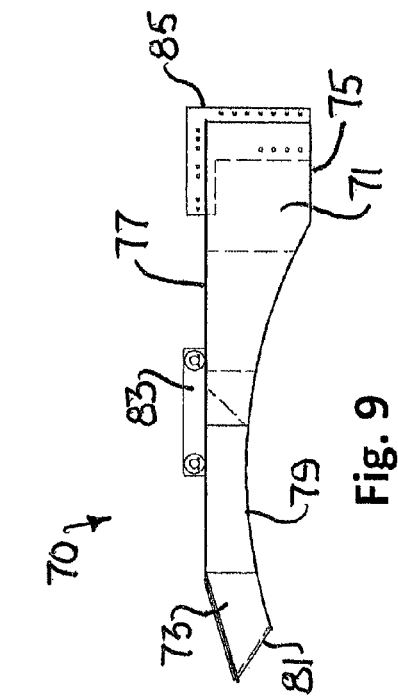
FIG. 7 is a bottom, left, front perspective view of the transition attachment of FIG. 6.
Figure 8:
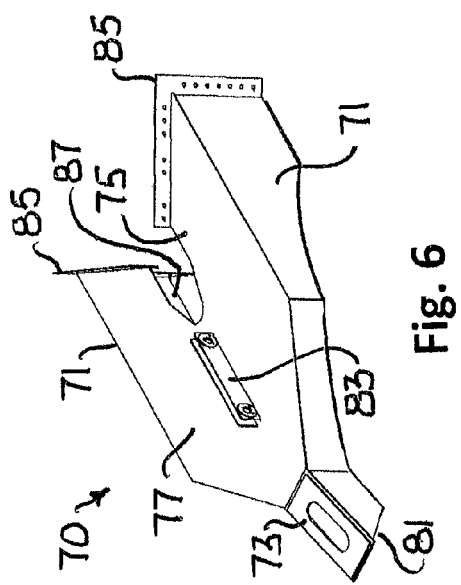
FIG. 8 is a top plan view of the transition attachment of FIG. 6.

While the invention will be described in connection with preferred embodiments thereof, it will be understood that it is not intended to limit the invention to those embodiments or to the details of the construction or arrangement of parts illustrated in the accompanying drawings.

DETAILED DESCRIPTION

Single Mode and Multi-Mode Chasses Turning first to FIGS. 1-5, a seabed-plow chassis 10 for use as a component of various seabed plows has an elongated member 11 adapted for mounting a skid on one of its ends 13 and one or more tools on its other end 15.

As seen in FIGS. 13-17, the chassis 10 is used in a first mode of operation as part of a boulder clearing plow 100. In the first mode 100, boulders B on or partially buried in the seabed are initially pushed by the skid 40 outward of the path P traveled by the skid 40. The tool includes moldboards 90 which push the boulders B initially pushed away by the skid 40 and other boulders B in the path of the moldboards 90 further outward as the skid 40 leads the moldboards 90 along the seabed S.

As seen in FIGS. 26-29, the chassis 10 is used in a second mode of operation as part of a trench cutting plow 200. In the second mode 200, the tool includes a plow share 210 and moldboards 90 which sequentially cut and move spoil M to create a trench T as the skid 40 leads the plow share 210 and the moldboards 90 along the seabed S.

As seen in FIGS. 37-40, the chassis 10 is used in a third mode of operation as part of a backfill plow 300. In the third mode 300, the tool includes a blade 310 and moldboards 90 which cooperate, as the blade 310 and moldboards 90 lead the skid 40 along the seabed S, to sequentially collect spoil M lying outside of the trench, funnel the collected spoil M inward, and release the funneled spoil M downward into the trench T.

Figure 15:
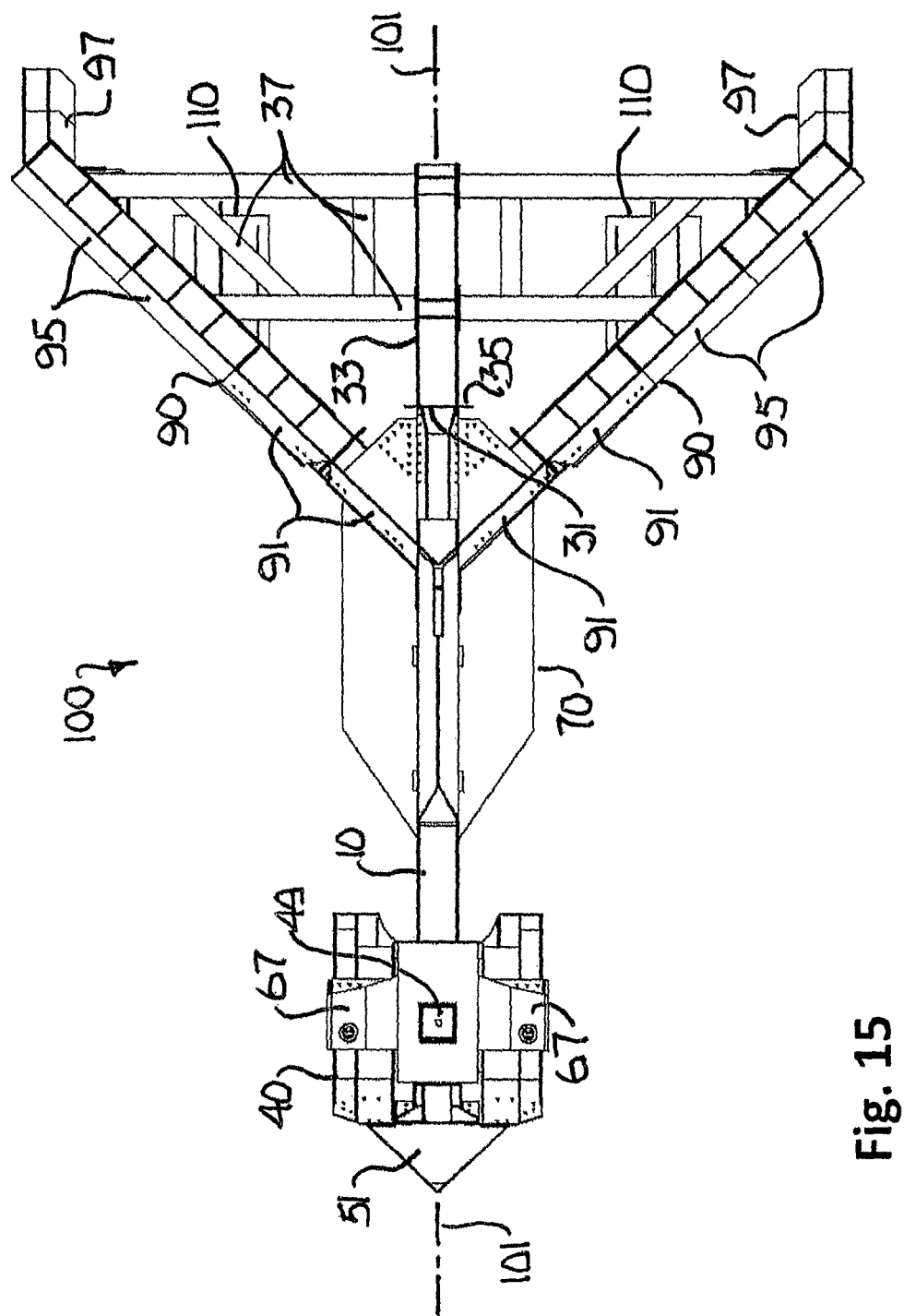
FIG. 15 is a top plan view of the boulder clearing plow of FIG. 13.
Figure 27:
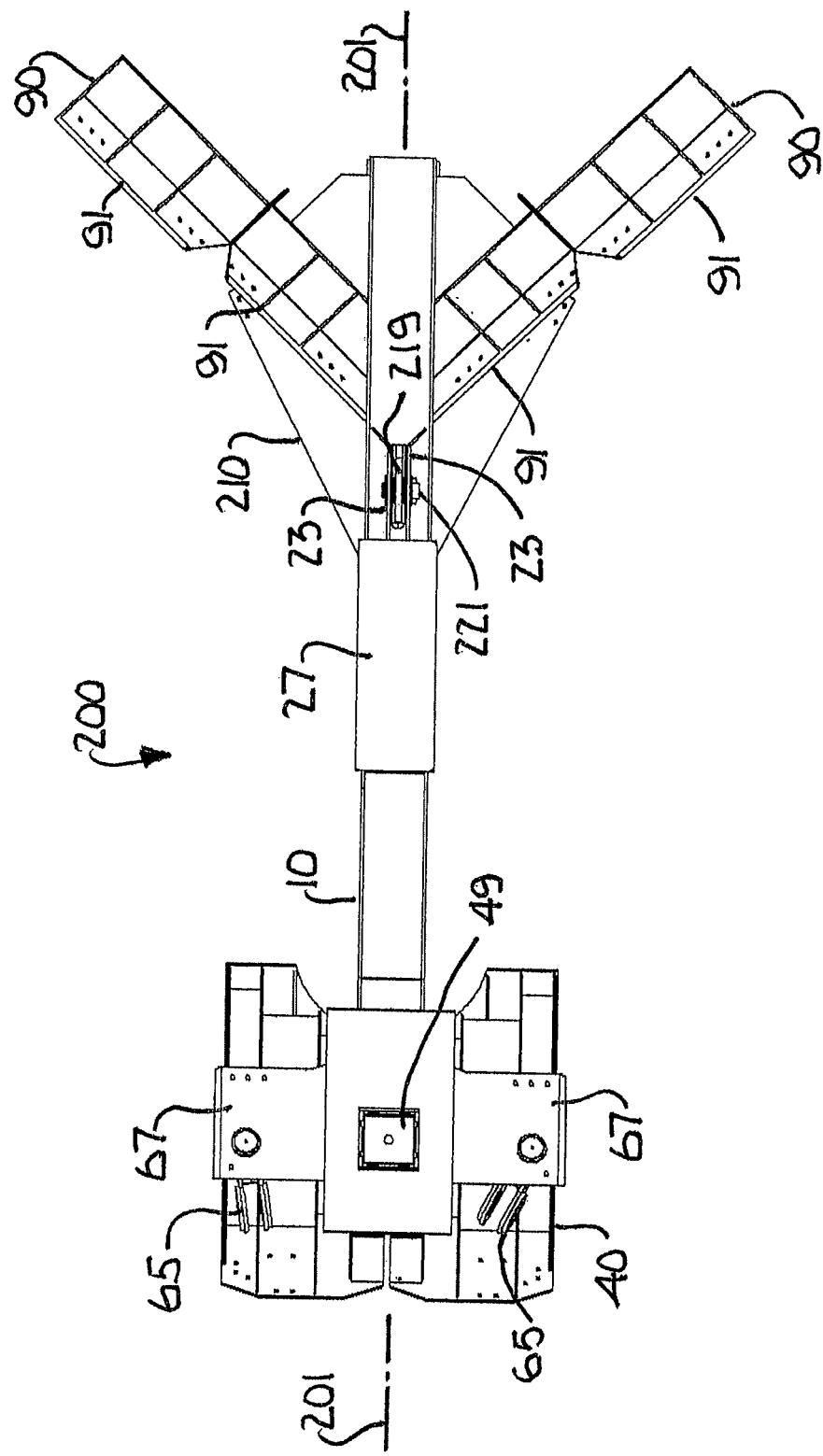
FIG. 27 is a top plan view of the trench cutting plow of FIG. 26.
Figure 28:
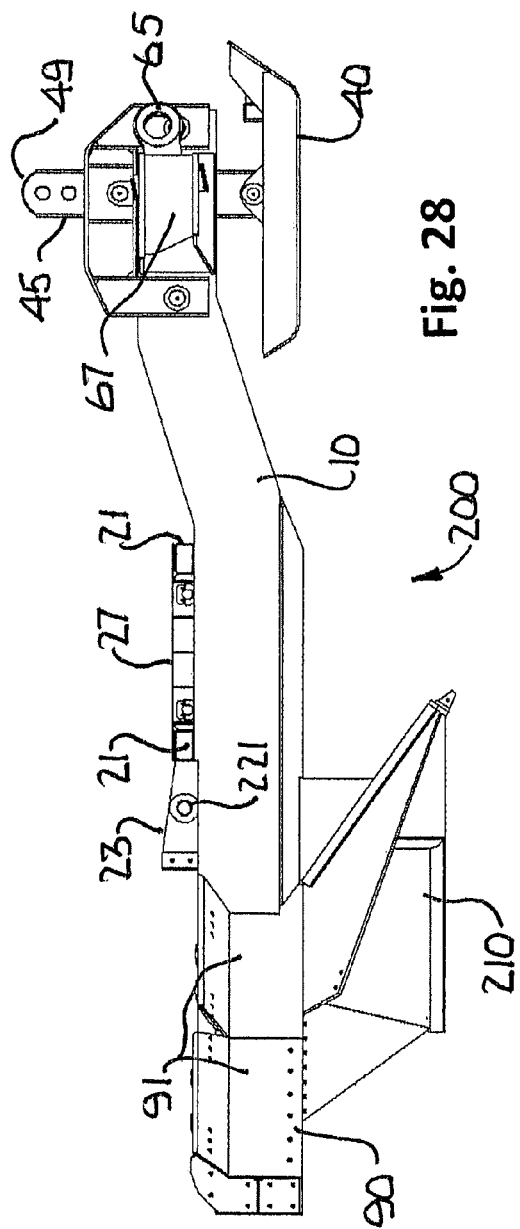
FIG. 28 is a side elevation view of the trench cutting plow of FIG. 26.
Figure 29:
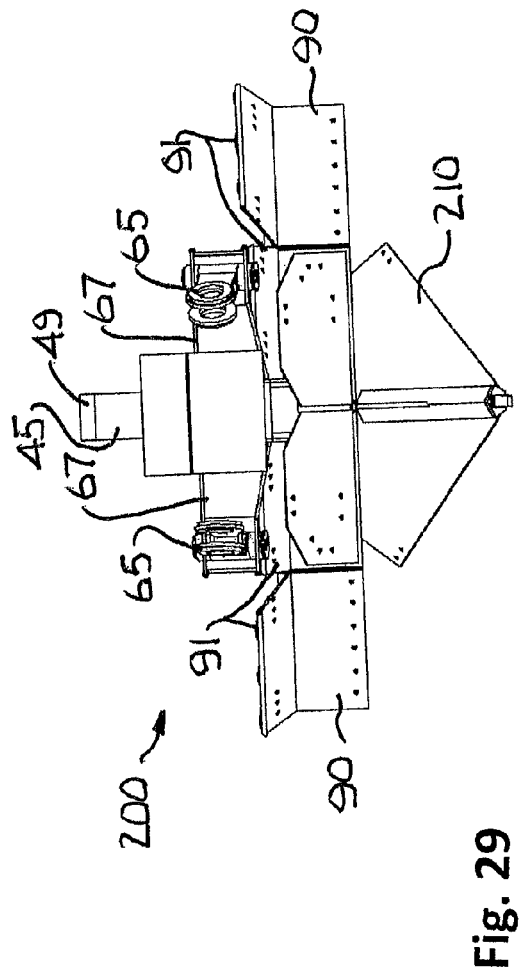
FIG. 29 is a front elevation view of the trench cutting plow of FIG. 26.
Figure 30:
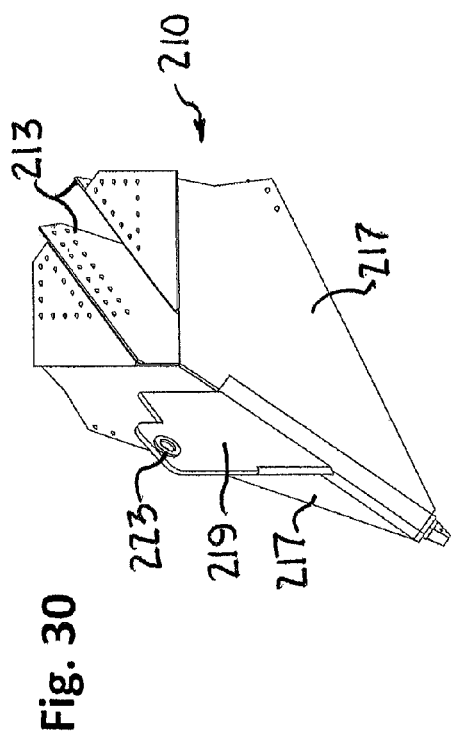
FIG. 30 is a top, left, front perspective view of a detachable share for use with the trench cutting plow of FIG. 26.
Figure 32:
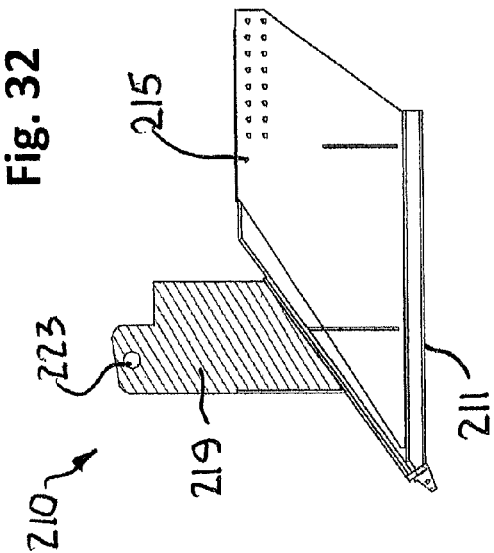
FIG. 32 is a vertical, longitudinal, center cross-sectional view of the detachable share of FIG. 30.
Figure 31:
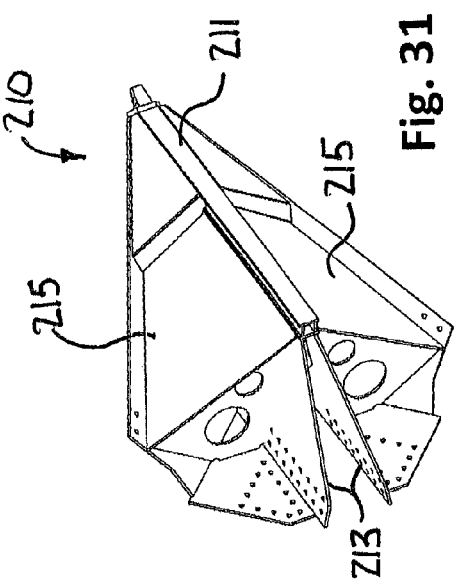
FIG. 31 is a bottom, right, rear perspective view of the detachable share of FIG. 30.
Figure 38:
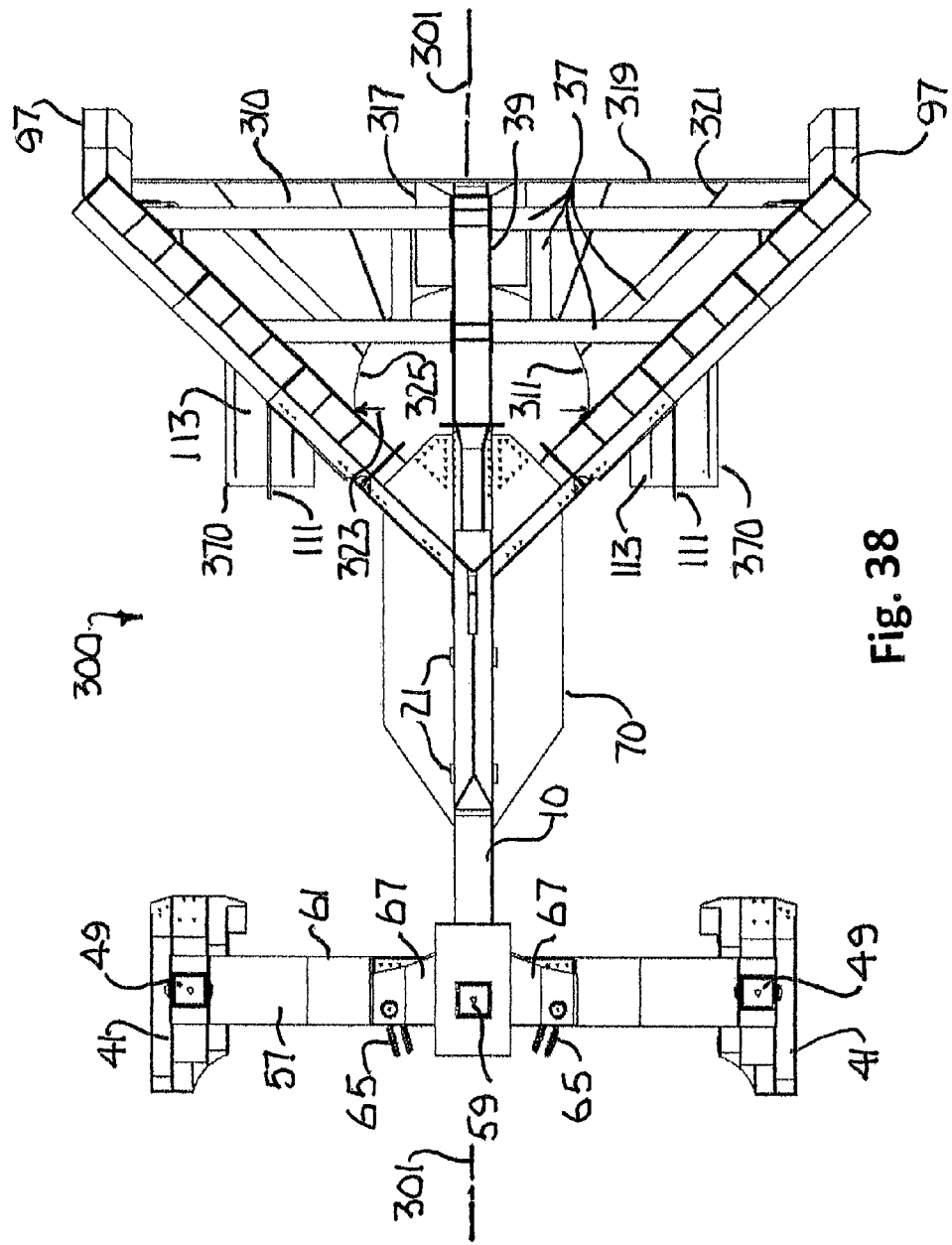
FIG. 38 is a top plan view of the backfill plow of FIG. 37.

The chassis 10 is uniquely configured to facilitate over-the-stern launch and retrieval of a plow 100, 200 or 300 from and to, respectively, the deck D of a vessel V and to and from, respectively, the seabed S. The movement of the plow 100, 200 or 300 from or to a resting place on the deck D of the vessel V to or from a point at which all contact of the plow 100, 200 or 300 with the vessel V is terminated is herein referred to as "transition." Looking at FIGS. 15, 27 and 38, the plows 100, 200 or 300 described herein have longitudinal axes 101, 201 and 301, respectively. As shown, the longitudinal axes 101, 201 and 301 are aligned in parallel with their anticipated directions of movement on the seabed S. Looking at FIGS. 19-22, 33-36 and 43-46, the plow axes 103, 203 and 303 are aligned in the direction of "transition" of the plows 100, 200 and 300, respectively, on the deck D. As shown, the longitudinal axes 101, 201, and 103 of FIGS. 15, 27 and 38 are aligned with the transition axes 103, 203, and 303 of FIGS. 19-22, 33-36 and 42-46, respectively. The plows 100, 200 and 300 need not, however, be aligned on the deck D in the same orientation they assume in operation on the seabed S. Therefore, as used herein, a "transition" axis" is any axis, longitudinal or not, which extends through a plow 100, 200 or 300 in a direction parallel to the anticipated direction of movement 39 of the plow during launch or retrieval.

It is preferred that the plows 100, 200 or 300 will have their weight distribution and the location of their surfaces which contact the deck D and the fulcrum/roller R on the stem of the vessel V during release or retrieval so coordinated as to resist roll of the plows 100, 200 or 300 about their respective transition axes 103, 203 and 303, respectively. As shown and described, the chassis 10, skid 40 and skid posts 45, transition attachment 70, moldboards 90 and keel plates 110 and 370 have various surfaces contoured to support their plows in sliding contact with the deck D and to pivot about the fulcrum/roller R on the stem of the vessel V as the plow 100, 200 or 300 crosses the fulcrum/roller R during release/retrieval of the plow. Other components can be used or specially added for the purpose.

Chassis Structure

Figure 26:
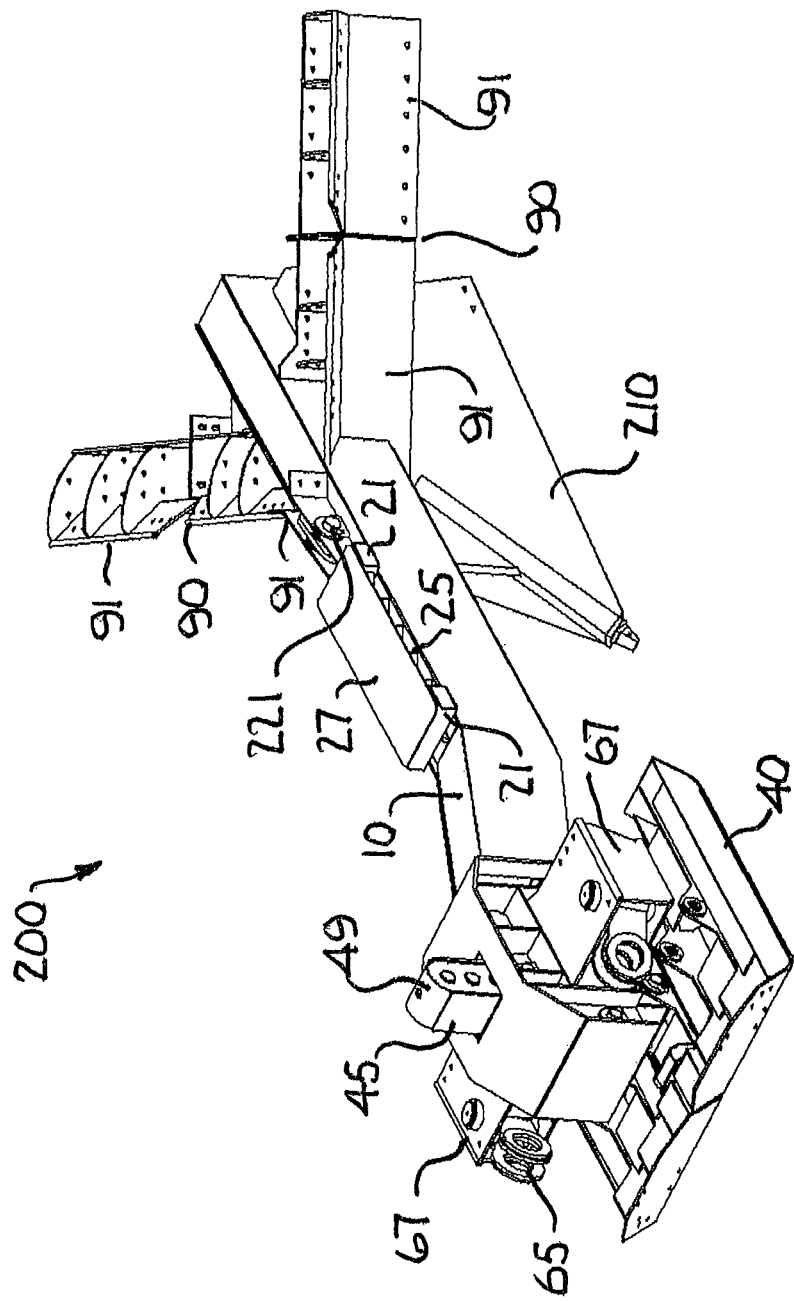
FIG. 26 is a top, left, rear perspective view illustrating the chassis of FIG. 1 used in the trench cutting plow mode.
Figure 37:
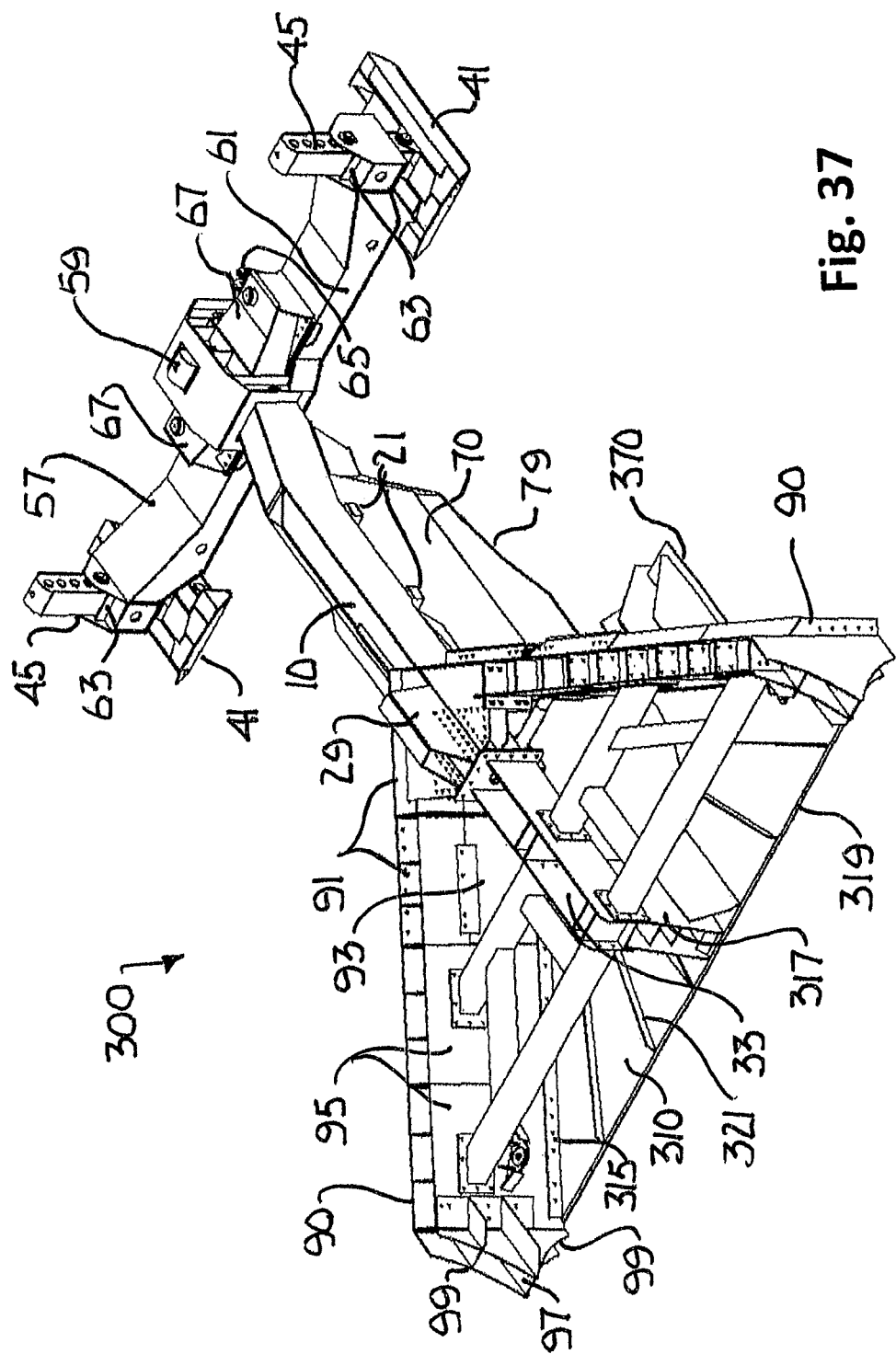
FIG. 37 is a top, left, front perspective view illustrating the chassis of FIG. 1 used in the backfill plow mode.

Returning to FIGS. 1-5, a preferred embodiment of the chassis 10 can be used in any of the plow modes 100, 200 and 300 seen in FIGS. 13, 26 and 37, respectively. As best seen in FIGS. 1 and 2, in the preferred embodiment of the chassis 10, the skid and tool ends 13 and 15 of the elongated member 19 are substantially horizontal and joined by a midsection 27 which angles down from the skid end 13 to the tool end 15. A post receptacle 19 extends vertically through the skid end 13. Fork lift receptacles 21 extend widthwise across the top of the tool end 15 of the elongated member 11. One receptacle 21 is at the junction of the tool end 15 with the angled portion 17 of the elongated member 11. The other receptacle 21 is further to the rear of the elongated member 11 and immediately in front of a spaced pair of share connection plates 23 which extend above the elongated member 11.

A transition member 25 extends above the tool end 15 of the elongated member 11 between the fork lift receptacles 21. As best seen in FIG. 3, the top surfaces of the receptacles 21, the share connection plates 23 and the transition member 25 form a substantially continuous transition surface 27 useful for launch and recovery purposes as hereinafter explained in relation to the second/trench cutting mode 200.

Side extension plates 29 taper downwardly from the tool end 15 and a back flange plate 31 caps the tool end 15 of the elongated member 11. A share connection slot 33 extends through the bottom of the tool end 15 of the elongated member 11 between the share connection plates 23.

Looking at FIGS. 13-17, 26-29 and 37-40, each of the plows 100, 200 and 300 has pulling points 65, as shown on tow bars 67 extending laterally from the skid end 13 of the elongated member 11, for connection of a pulling line L to the plow 100, 200 and 300. Preferably, the pulling points 65 are symmetrically arranged in relation to the central longitudinal axes 101, 201 and 301 of the plows 100, 200 and 300 and are displaced from the points of contact of the plows 100, 200 and 300 with the deck D or roller R by a height less than a radius of the roller R to facilitate passage of the points of contact across the roller R.

Transition Attachment

Turning to FIGS. 6-9, a transition attachment 70 is configured to extend between the skid and tool ends 13 and 15 on the bottom of the elongated member 11 of the chassis 10 when the chassis is used in either of its first/boulder clearing or third/trench cutting modes 100 or 300 as seen in FIGS. 13, 26 and 37.

Figure 16:
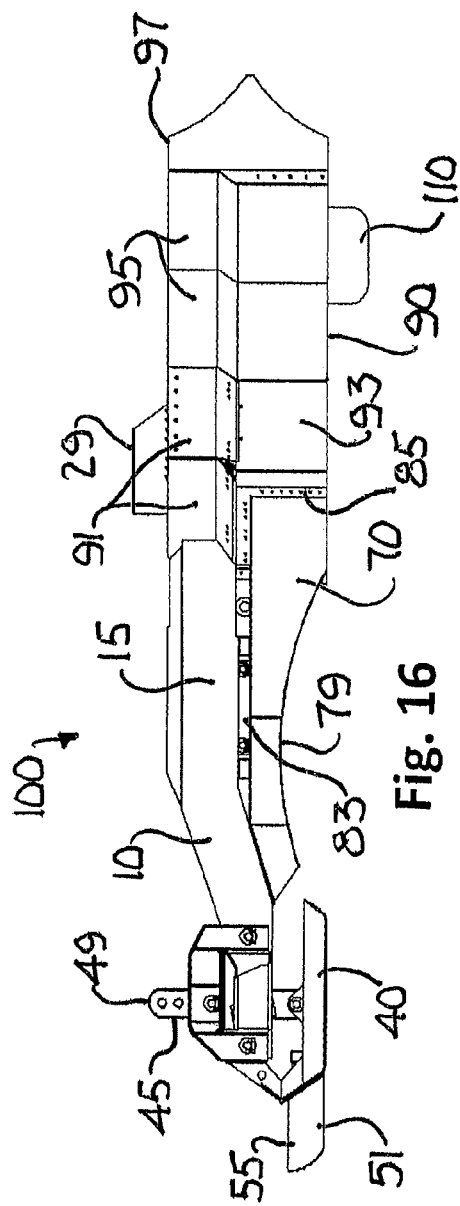
FIG. 16 is a side elevation view of the boulder clearing plow of FIG. 13.
Figure 17:
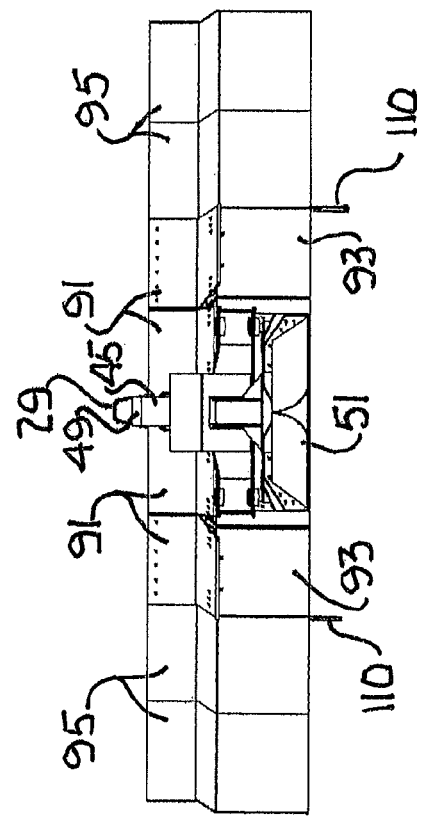
FIG. 17 is a front elevation view of the boulder clearing plow of FIG. 13.
Figure 39:
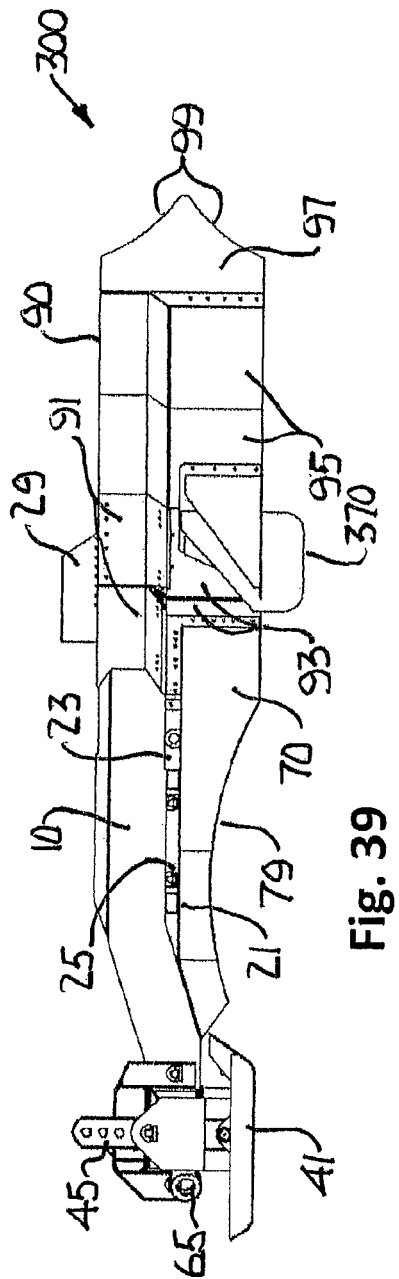
FIG. 39 is a side elevation view of the backfill plow of FIG. 37.

As shown in FIGS. 6-9, the transition attachment 70 extends in a generally horizontal wishbone shape with its tines 71 opening from its front to its rear ends 73 and 75. The top surface 77 of the transition attachment 70 is contoured to mate against the bottom surface 31 of the elongated member 11 of the chassis 10 against which the transition attachment 70 will be secured by pinning the transition member 25 of the chassis 10 between the transition clevis plates 83, as is best seen in FIGS. 16 and 39. The bottom surface 79 of the transition attachment 70 is contoured to make contact with and pivot about fulcrum R on the stem of a plow transporting/towing vessel V, seen in FIGS. 21 and 22 and 44 and 45, as the plow 100 or 300 crosses the fulcrum/roller R during its release from the vessel into the sea and during its retrieval from the sea onto the vessel.

The shape of the attachment bottom surface 79 and the weight of the elongated member 11 and attachment 70 are coordinated so as to resist roll of the chassis 11 about the plow transition axis 103 or 303 as the plow 100 or 300 moves on the deck D toward or away from the fulcrum R.

Figure 9:
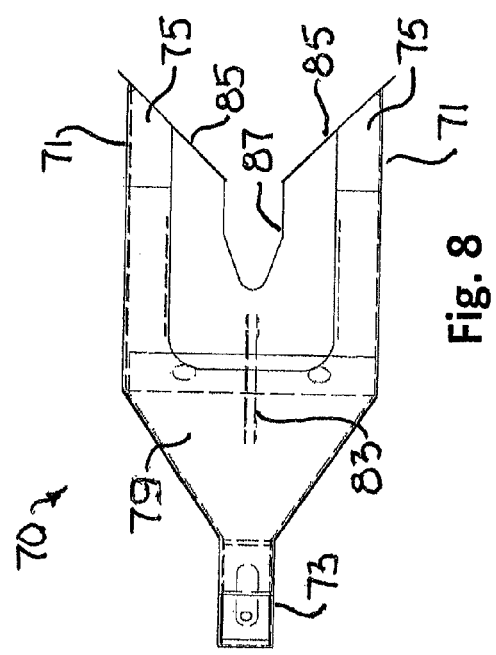
FIG. 9 is a side elevation view of the transition attachment of FIG. 6.

Preferably, the fulcrum R is a roller and, as best seen in FIG. 9, the vertical longitudinal cross-sections of the attachment bottom surface 79 are concave. Looking at FIGS. 16, 39 and 50, the radius of the concavity 79 is greater than the radius of the fulcrum R so as to facilitate passage of the transition attachment 70 across the fulcrum R during release and retrieval of the plows 100 and 300. Looking at FIG. 8, the concavity 79 is symmetric about a longitudinal vertical plane centered on the attachment 70. The surface 79 can have any shape as long as it provides paths which facilitate the over-the-stem release and retrieval of the plow 100 or 300. The paths may be linear or planar and are preferably symmetrically defined by continuous opposite points of the attachment bottom surface 79.

As shown, the front end 73 of the attachment 70 has a leading face 81 which is angled to smooth the transition to and from the skid end 13 of the elongated member 11 of the chassis 10. Back plates 85 are provided on the ends of the tines 71 for connection to the moldboards 90. The gap 87 between the tines 71 functions as a passageway for debris in the third/backfill mode 300, as is hereinafter explained.

Skid

Turning to FIGS. 10 and 11, a preferred embodiment of the skid 40 is adaptable for use in any of the plow modes 100, 200 and 300 seen in FIGS. 13, 26 and 37, respectively.

In FIG. 10, the skid 40 is shown configured for use in the first/boulder clearing and second/trench cutting modes 100 and 200, seen in FIGS. 13 and 26, respectively. When used in the first/boulder clearing or second/trench cutting mode 100 or 200, the parallel outer skis 41 of the skid 40 are in close proximity to each other, bolted on opposite sides of a center ski 43. In this bolted configuration, a head 51 can be mounted on the front of the skis 41 and 43 in either the first/boulder clearing mode or for a first pass, the second/trench cutting mode 100 or 200. Alternatively, as shown in FIG. 12, the outer skis 41 can be pivotally mounted on the center ski 43 using linkages 48 so that the outer skis 41 can be canted laterally upward from the center ski 43, provided the head 51 is not attached to the skis 41 and 43. The use of canted outer skis 41 is specially applicable to second and subsequent passes in this second/trench cutting mode 200, enabling the canted skis 41 to conform to the side walls of the trench T and facilitating the deepening of the trench T by a second and subsequent passes of the trench cutting plow 200. Thus, deeper trenches can be cut without need for a larger trenching plow.

In of the above bolted or pivotal configurations for the outer skis 41, whether or not the head 51 is used, a post 45, which is pinned in a receptacle 47 in the center ski 43, extends upward to a top 49 which is convex from front to back. As shown, the outer skis 41 have receptacles 47 which are the same as the center ski receptacles 47. When used in the first/boulder clearing mode 100, the boulder clearing head 51 is preferably added to the leading end of the skid 40 across the fronts of the skis 41 and 43. As shown, the leading faces 53 of the head 51 are angled rearward from a vertical, longitudinal center plane of the skid 40 and are tapered rearward from their top edges 55. The angled and tapered faces 53 will torque partially buried boulders out of the seabed and away from the skid 40 and, if necessary, allow the plow 200 to ride over a boulder B which strikes the head 51 below its top edges 55.

When used in the second/trench cutting mode 200, either the bolted configuration of the skis 41 or the pivotal configuration of the skis 41 in an uncanted condition can be used, preferably with the head 51 in place for the first pass of the plow 200. For subsequent passes, it is preferred that the pivotal configuration of the skis 41 be used in the canted condition without the head 51. In the second/trench cutting mode 200, trenches up to 25 meters wide can be cut using multiple passes.

In FIG. 11, a crossbeam 57 is shown for converting the outer skis 41 of the skid 40 shown in FIG. 10 for use in the third/backfill mode 300. In the backfill mode 300, a crossbeam 57 spaces a pair of open ended receptacles 63 apart from a center post 59 extending upward from the midpoint of the crossbeam 57. As seen in FIG. 37, two posts 45 are seated, one in each of the receptacles 47 of the two outer skis 41 as shown in FIG. 10. The posts 45 extend up from their respective outer skis 41, pass through their respective open ended receptacles 63 in the crossbeam 57 and are pinned with the skis 41 at the desired distance below the crossbeam 57. The crossbeam center post 59 is pinned in the chassis post receptacle 19 to set the desired height of the chassis 10 above the skis 41. The crossbeam 57 as shown has a front surface 61 configured to also serve as a spoil leveler in the backfill mode 300.

Boulder Clearing Plow and Methods

Looking at FIGS. 13-17, the boulder clearing plow 100 includes the chassis 10, the skid 40, the transition attachment 70 and the moldboards 90. The skid 40, in the configuration shown in FIG. 10 with the head 51 is mounted on and supports the skid end 13 of the chassis 10 above the seabed S. The moldboards 90 include primary, secondary and tertiary moldboards 91, 93 and 95 mounted on the tool end 15 of the chassis 10. The transition attachment 70 is mounted under the chassis 10 between the skid 40 and the primary moldboards 91.

As best seen in FIG. 13, in the first/boulder clearing mode 100 the chassis 10 is oriented upside down in comparison to its orientation as shown in FIGS. 1 and 2. That is, in the boulder clearing plow 100, the skid end 13 is lower than the tool end 15 of the elongated member 11 and the skid post 45 extends upward through the receptacle 19 in the skid end 13 of the chassis 10.

As seen in FIGS. 13-17, the primary moldboards 91, which may be permanently or detachably mounted on the tool end 15 of the chassis 10, are angled outward and rearward from the tool end 15 of the chassis 10 and the transition attachment 70. The secondary moldboards 93 are mounted below the primary moldboards 91 and the transition attachment 70 to increase the overall depth of the moldboards 91. The tertiary moldboards 95 are used when wider paths are to be cleared of boulders B. They are mounted at the free ends of the primary and secondary moldboards 91 and 93 and increase the length of the moldboards 90 for the full depth of the combined primary and secondary moldboards 91 and 93.

As best seen in FIGS. 13-15, when the tertiary moldboards 95 are used, a chassis extension 33 is connected by its front flange 35 to the back flange plate 31 of the chassis 10. A supporting structure 37 of beams and struts connects the chassis extension 33 to the tertiary moldboards 95. Recovery fins 97 are appended to the free ends of the moldboards 90. The fins 97 have divergingly arcute ends 99 for contact with the roller R during launch and recovery.

Figure 18:
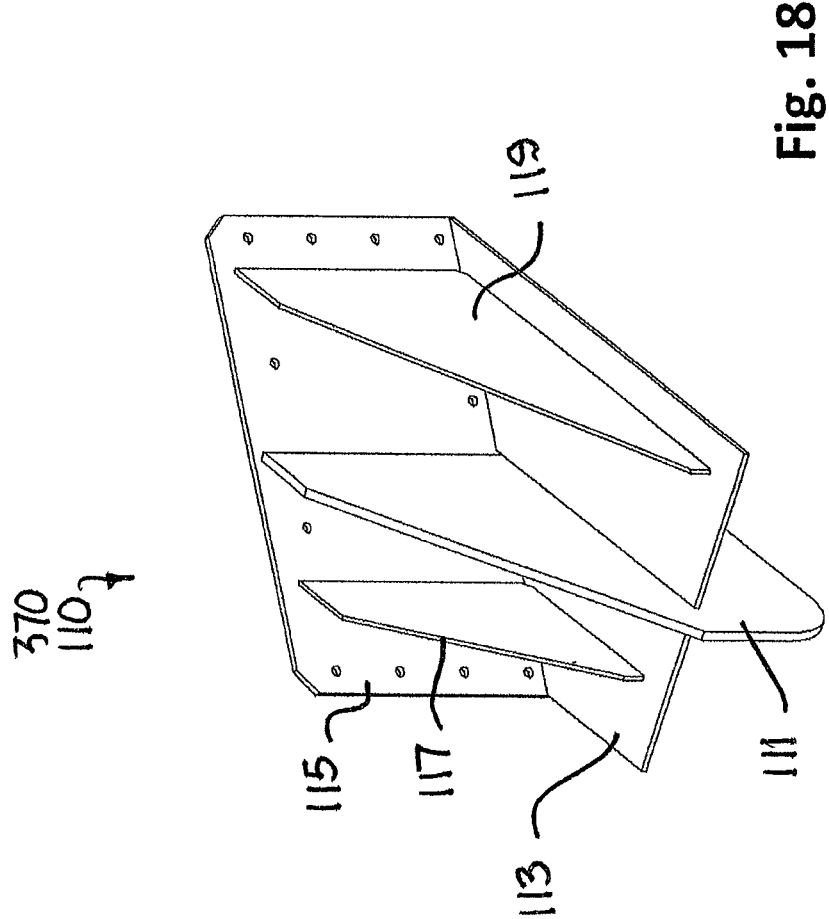
FIG. 18 is a top, left rear perspective view of a typical keel plate for use with the boulder clearing plow of FIG. 13 and the backfill plow of FIG. 37.

The boulder clearing plow 100 may also include keel plates 110, shown in detail in FIG. 18. The keel plates 110 have a vertical center plate 111 and horizontal base plates 113 which extend laterally from the center plate 111. The base plates 113 and the center plates 111 support a vertical mounting plate 115 at an angle complementary to the angle of the moldboards 90. This structure is reinforced by small and large vertical support plates 117 and 119. At least one keel plate 110 mounted on the front of and extending under each set of moldboards 90. As best seen in FIGS. 14, 15, 17 and 18, the keel plates 110 are mounted in parallel at the junctions of the secondary and tertiary moldboards 93 and 95. The primary function of the keel plates 110 is to steady the path of the boulder clearing plow 100 as the head 51 and moldboards 90 encounter boulders B, spoil M and/or other obstacles on the seabed S.

Figure 19:
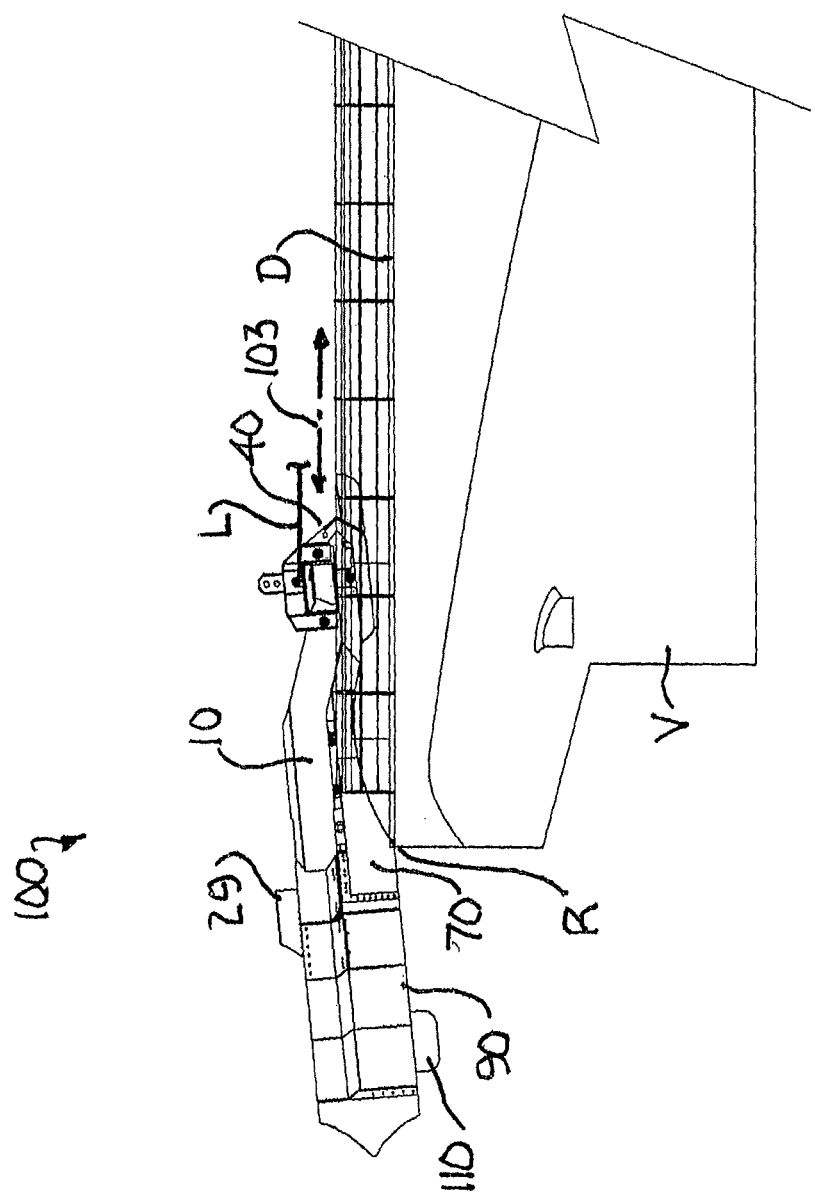
FIG. 19 is a side elevation view of the boulder clearing plow of FIG. 13 during release from/retrieval to a vessel with the plow skid pivoting on the stern of a vessel.
Figure 20:
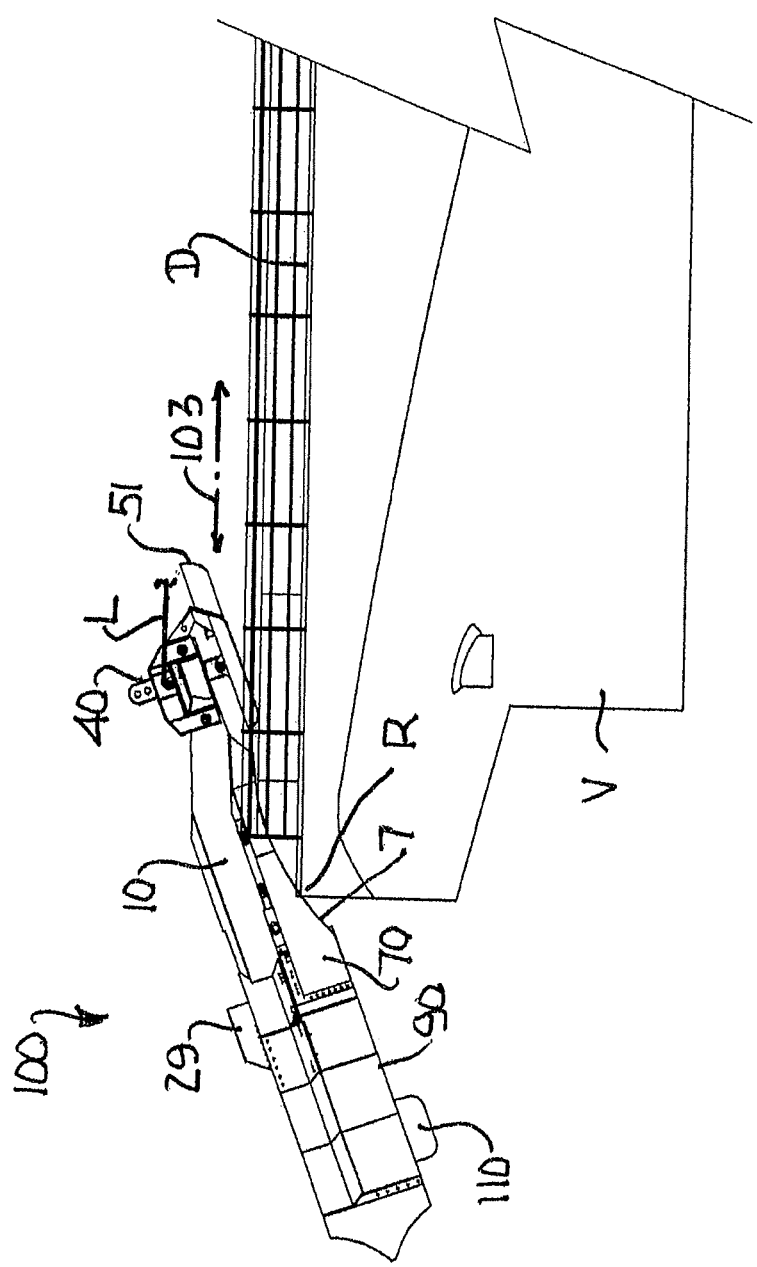
FIG. 20 is a side elevation view of the boulder clearing plow of FIG. 13 during release from/retrieval to a vessel with the plow chassis angled portion pivoting on the stern of a vessel.
Figure 21:
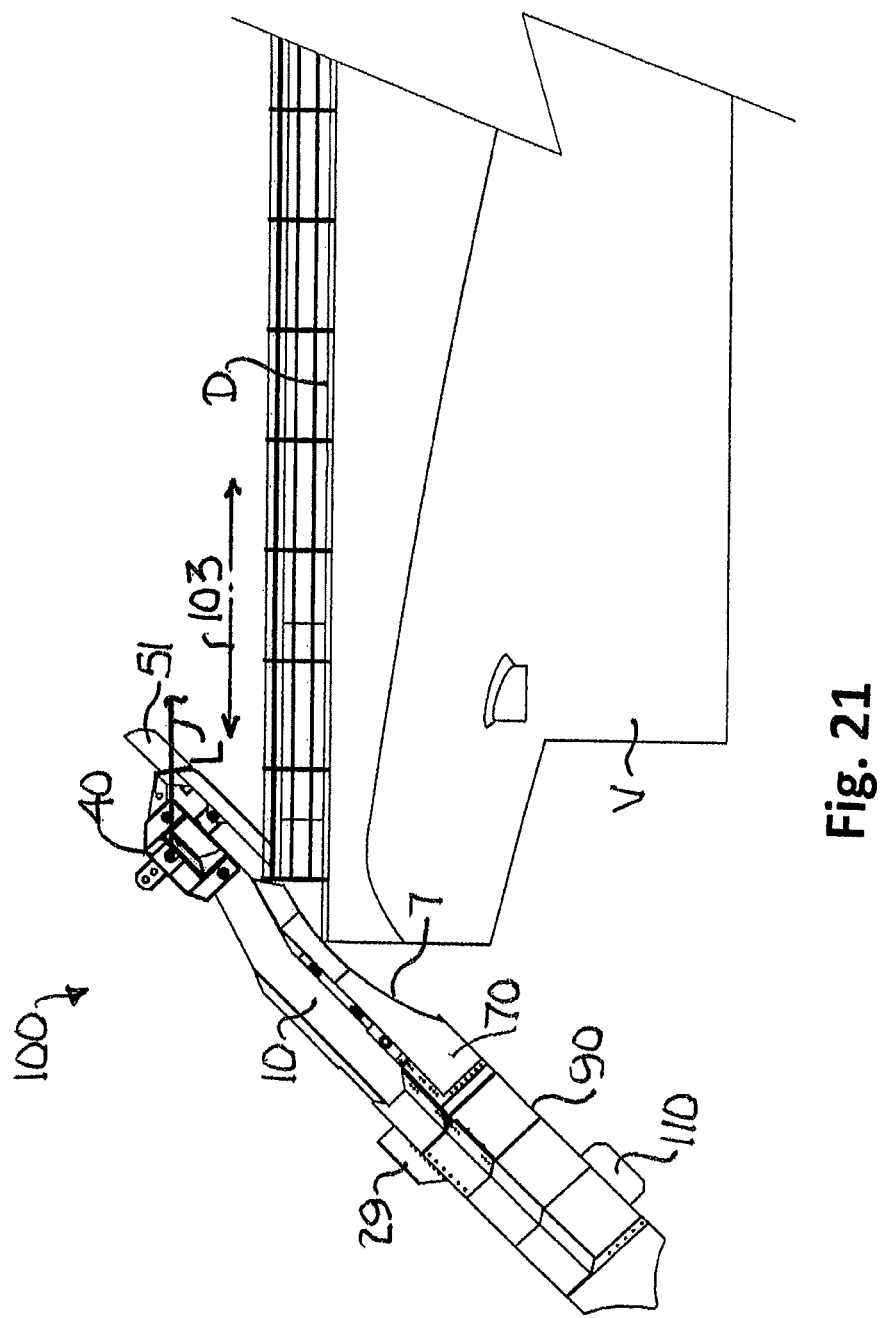
FIG. 21 is a side elevation view of the boulder clearing plow of FIG. 13 during release from/retrieval to a vessel with the plow transition attachment pivoting on the stern of a vessel.

Turning to FIGS. 19-22 and 50, the over-the stern release (FIGS. 19-22) and retrieval (FIGS. 22-19) of the boulder clearing plow 100 from a vessel V to the seabed S or from the seabed S onto a vessel V, respectively, are illustrated. During release, the plow 100 is preferably and as shown initially positioned on the deck D with its moldboards 90 aft and the longitudinal axis 101 of the plow 100 aligned on the transition axis 103 of the plow 100. The skid 40 and keel plates 110 provide the initial contact points or surfaces of the plow 100 with the deck D. As seen in FIG. 19, as the plow 100 is propelled, by winch or other suitable push/pull equipment (not shown), along the deck D of the vessel V toward and across the fulcrum/roller R at the stern of the vessel V, when the keel plates 110 have cleared the fulcrum/roller R, the plow 100 drops onto the moldboard 90 and slides on the moldboards to the concave surface of the transition attachment 70, at which point the moldboards slide to the transition attachment 70 and the skid 40 begins to rise from the deck D. All contact between the plow 100 and the vessel V has transferred to the transition attachment 70 and the fulcrum/roller R of the vessel V. Looking at FIG. 20, as the transition attachment 70 travels travel sternward beyond the fulcrum/roller R, all contact between the plow 100 and the vessel V remains on the concave transition surface 79 of the attachment 70 and the fulcrum/roller R of the vessel V and the plow 100 continues to tip toward the sea and the skid 40 continues to rise. As seen in FIG. 21, as the attachment 70 travels further sternward on the fulcrum/roller R, all contact between the plow 100 and the vessel V is still between the transition attachment 70 and the fulcrum/roller R but the skid 40 is nearly vertical. Looking at FIG. 22, as the plow 100 continues to rotate on and travel across the fulcrum/roller R, the buoyancy of the sea water and the travel speed of the vessel V limit rotation of the plow 100. As the transition attachment 70 slides off the fulcrum/roller R, the skid 40 becomes the final contact with the fulcrum/roller R until the plow 100 is fully released at the end of a pulling line L to the seabed S.

Figure 22:
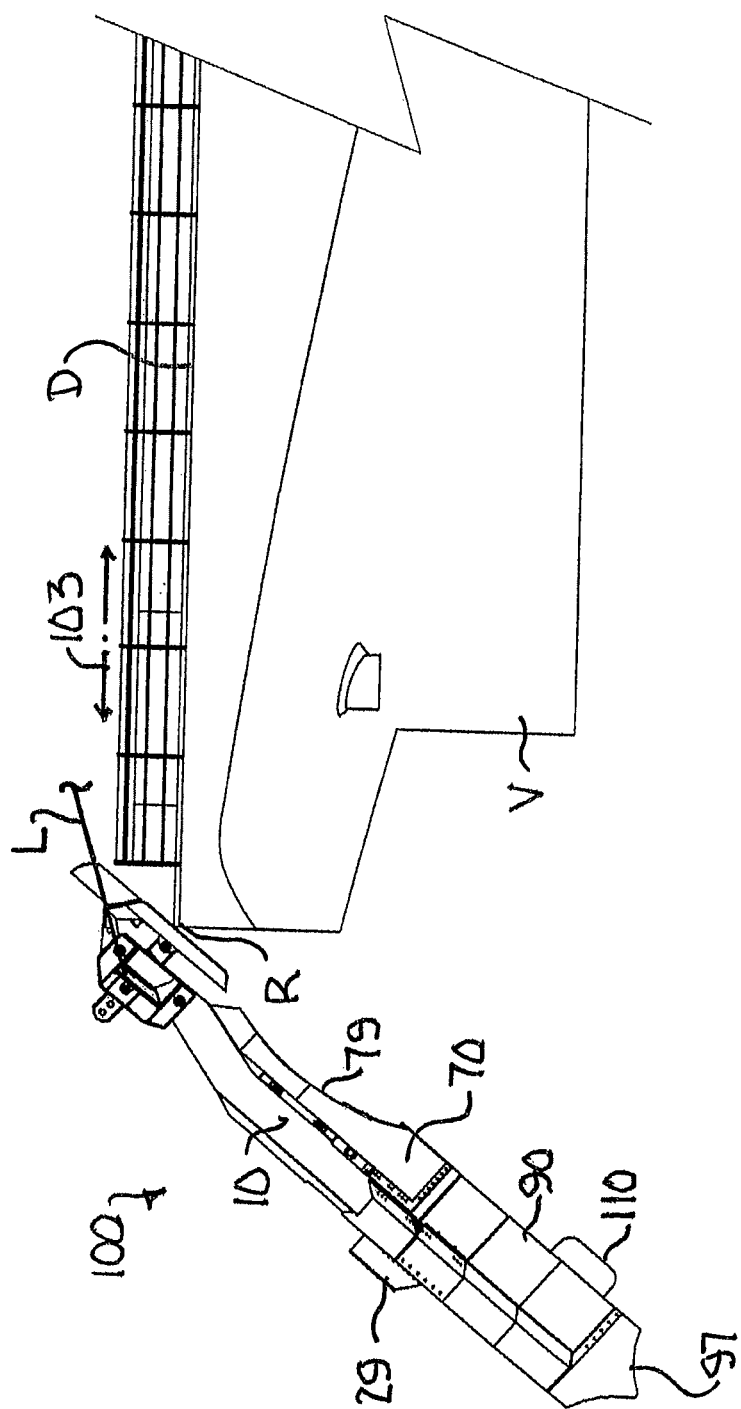
FIG. 22 is a side elevation view of the boulder clearing plow of FIG. 13 during release from/retrieval to a vessel with the plow keel plates pivoting on the stem of a vessel.

Retrieval of the boulder clearing plow 100 at the end of the pulling line L from the seabed S is accomplished by reversal of the release method. As seen in FIG. 22, as the plow 100 is raised at the end of the line L toward the fulcrum/roller R on the stern of the vessel V, the skid 40 will first contact the fulcrum/roller R. As noted above, the pulling points 65 of the plow 110 are located so as to assure that the head 51 and skis 41 and 43 of the sled 40 will not hang-up on the fulcrum/roller R. Further contact with the fulcrum/roller R transfers sequentially to the transition surface 79 of the transition attachment 70 as seen in FIG. 21, the concave portion of the attachment transition surface 79 as seen in FIG. 20 and then along the bottom of the moldboards 90, as seen in FIG. 19, until they contact the keel plates 110 and the plow 100 has been pulled fully across the fulcrum/roller R and comes to rest with the skid 40 and keel plates 110 as the contact points on the deck D of the vessel V.

Figure 23:
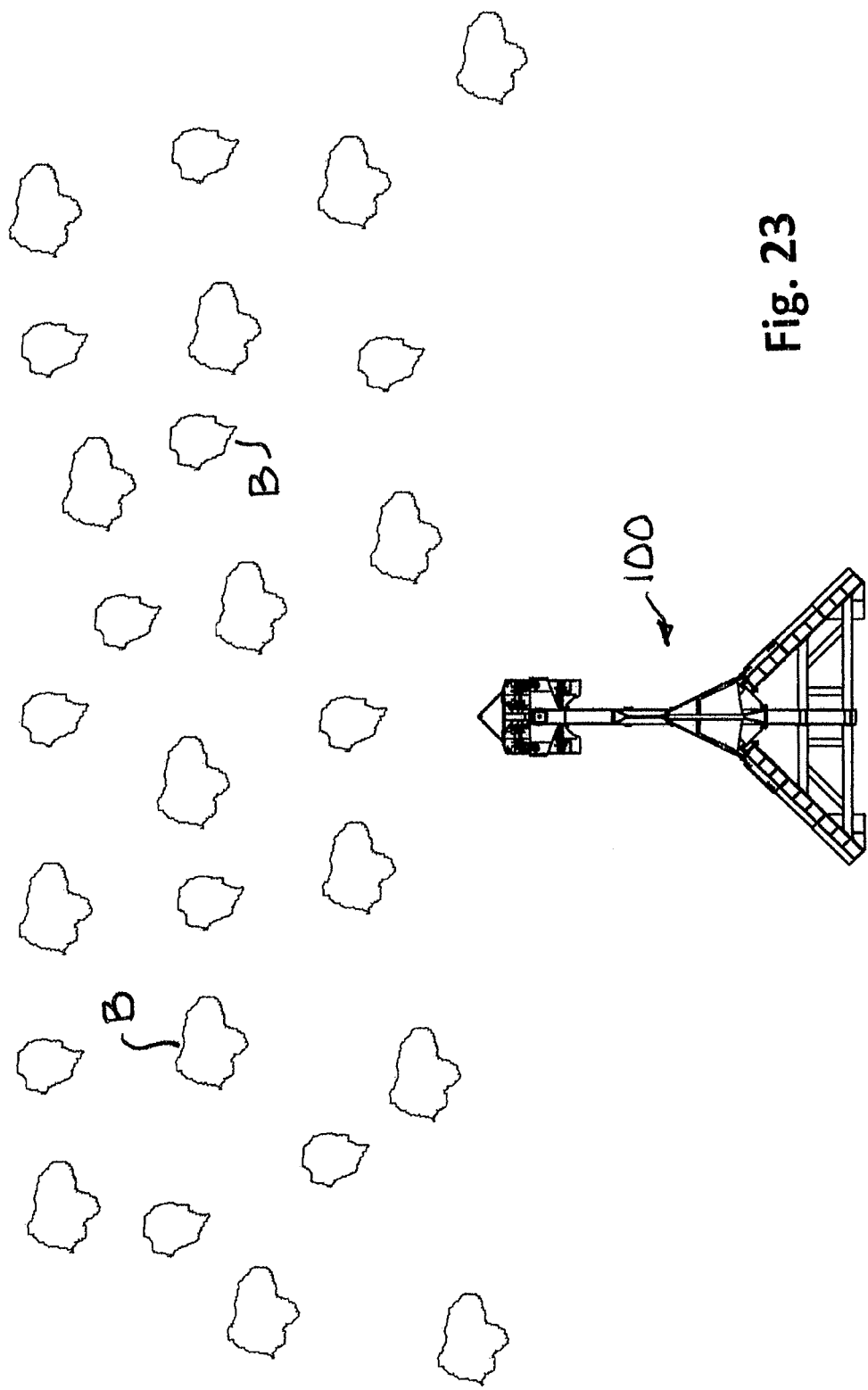
FIG. 23 is a top plan view illustrating the boulder clearing plow of FIG. 13 positioned to clear a path through a field of boulders.
Figure 24:
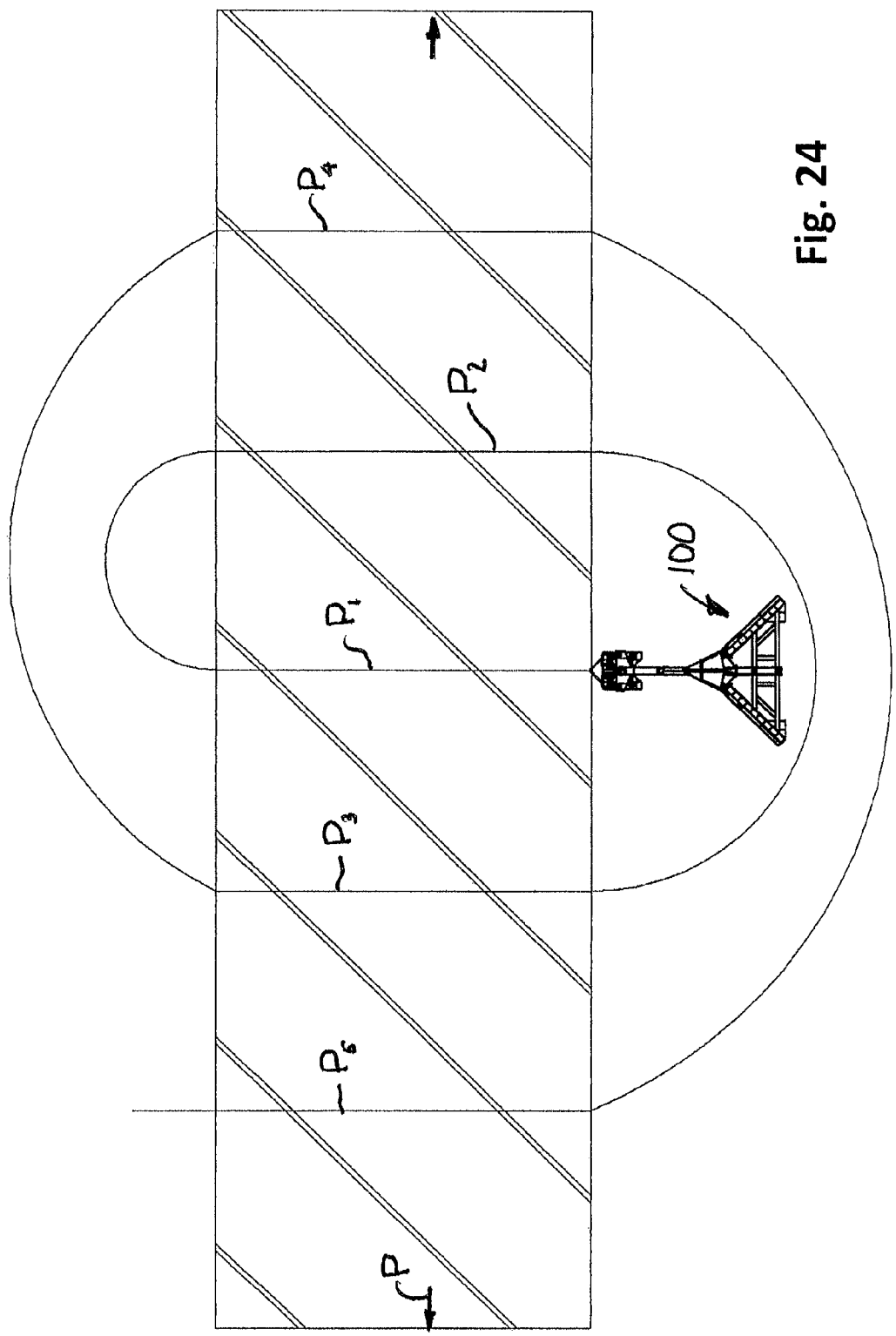
FIG. 24 is a graphic representation of a typical boulder clearance route pattern of the boulder clearing plow of FIG. 13.
Figure 25:
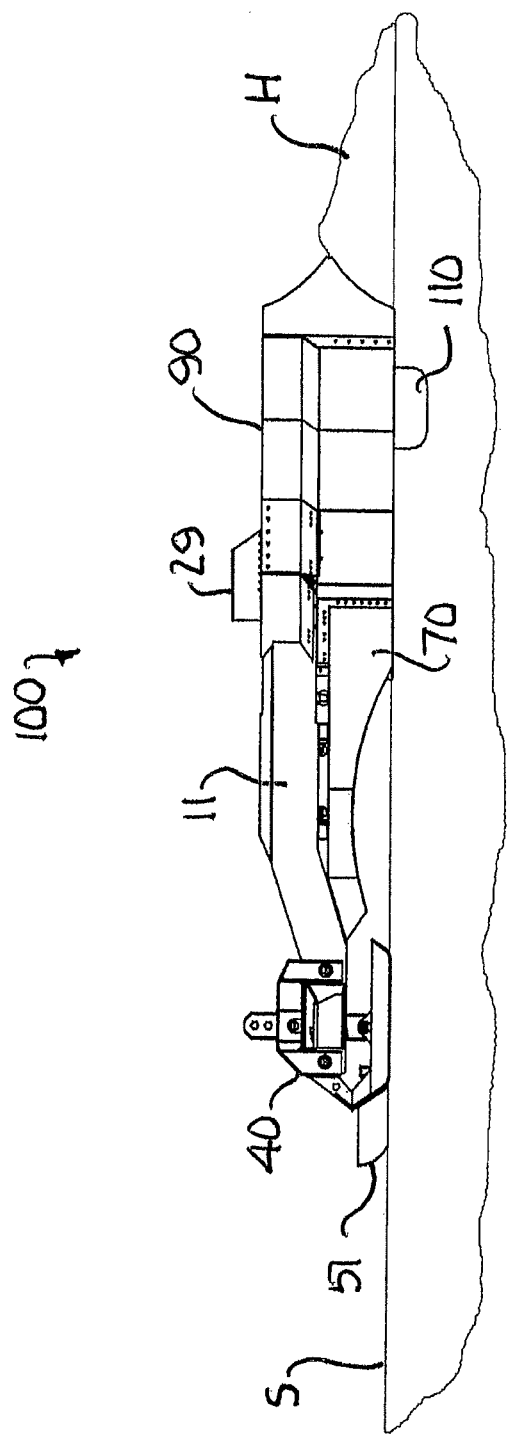
FIG. 25 is a side elevation view of the boulder clearing plow of FIG. 13 in operation.

Turning to FIG. 23-25, the use of the boulder clearing plow 100 to clear boulders B from a path P on the seabed is illustrated. As seen in FIG. 24, the plow 100 is positioned with the plow 100 bow-forward in the direction of an initial seabed path $P_1$ which will be at the center of the intended final path P. The pattern of the final path P spirals out from the initial path $P_1$. The plow 100 is then propelled, perhaps at the end of the pulling line L, powered by a winch or by the travel of the vessel, along the initial path $P_1$ to clear boulders B from the initial path $P_1$ to the port and starboard sides of the plow 100. After the initial path $P_1$ is cleared, boulder clearing continues, if a wider path P is necessary, by repositioning the plow 100 bow-forward, for travel in a direction opposite the initial seabed path direction, on a second seabed path $P_2$ along, as shown, the starboard side of the initial path $P_1$. The plow 100 is then propelled along the second path $P_2$ to clear boulders in the second path $P_2$ further away from the path $P_1$. After the second path $P_2$ is cleared, boulder clearing continues, if a wider path P is necessary, by repositioning the plow 100 bow-forward, for travel in the direction of the initial seabed path direction, on a third seabed path $P_3$ along the port side of the initial path $P_1$. The plow 100 is then propelled along the third path $P_3$ to clear boulders from the third path $P_3$ further away from the first path P1. If a still wider path P is necessary, boulder clearing can further include repeating the widening along the path P resulting from the contiguity of the initial, second and third paths $P_1$, $P_2$ and $P_3$, as shown along paths $P_4$ and $P_5$. The boulder clearing process anticipates repetition of the widening steps to widen successively contiguous paths $P_n$ until a single path P of desired width has been cleared along the seabed.

Looking at FIG. 25, as the head 51 strikes one or more boulders B in its initial path $P_1$, the boulders B will be torqued out of the seabed and around the port or starboard side of the head 51, depending on which side of the head 51 strikes the boulders B. The trailing moldboards 90 will torque and push the boulders B further to port or starboard away from the plow 100. On ensuing paths $P_{2-n}$, only the outside of the head 51 and the outside moldboards 90 are on a path to strike the boulders B, pushing them further away from the initial path $P_1$. As seen in FIG. 22, boulders B which have been pushed aside will be deposited in a small spoil heap H created aft of the plow 100 by the partial penetration of the seabed by the moldboards 90.

Trench Cutting Plow and Methods

Looking at FIGS. 26-29, the trench cutting plow 200 includes the chassis 10, the skid 40, the moldboards 90 and the share 210. The skid 40, in the configuration shown in FIG. 10, is mounted on and supports the skid end 13 of the chassis 10 above the seabed. The moldboards 90 initially include only the primary moldboards 91 mounted on the tool end 15 of the chassis 10. If more than one pass of a trench cutting plow 200 is to be performed, the secondary and tertiary moldboards 93 and 95 can be added. Wedges (not shown) can be positioned between the chassis 10 and the moldboards 90 to angle the moldboards at a desired angle upward and rearward from the chassis 10 for second and subsequent passes of the plow. The transition attachment 70 is not used. As shown, the head 51 may optionally be attached to the skid 40 in the first pass of the second/trench cutting mode 200.

As best seen in FIG. 20, in the second/trench cutting mode 200 the chassis 10 is oriented right-side up as shown in FIGS. 1 and 2. That is, in the trench cutting plow 200, the skid end 13 is higher than the tool end 15 of the elongated member 11 and the skid post 45 extends upward through the receptacle 19 in the skid end 13 of the chassis 10.

The plow share 210 may be permanently or detachably mounted on the chassis 10. A preferred embodiment of the share 210 shown in FIGS. 26-32 includes a shoe box 211 joining the bottoms of center ribs 213 and side plates 215 which support the parting plates 217 of the share 210. A vertical plate 219 aligned with the shoe box 211 extends upwardly above the parting plates 217 and is inserted between the share connection plates 23 on the chassis 10. A pin 221 inserted through a boss 223 on the vertical plate 219 and the connection plates 23 secures the share 210 to the chassis 10.

Figure 33:
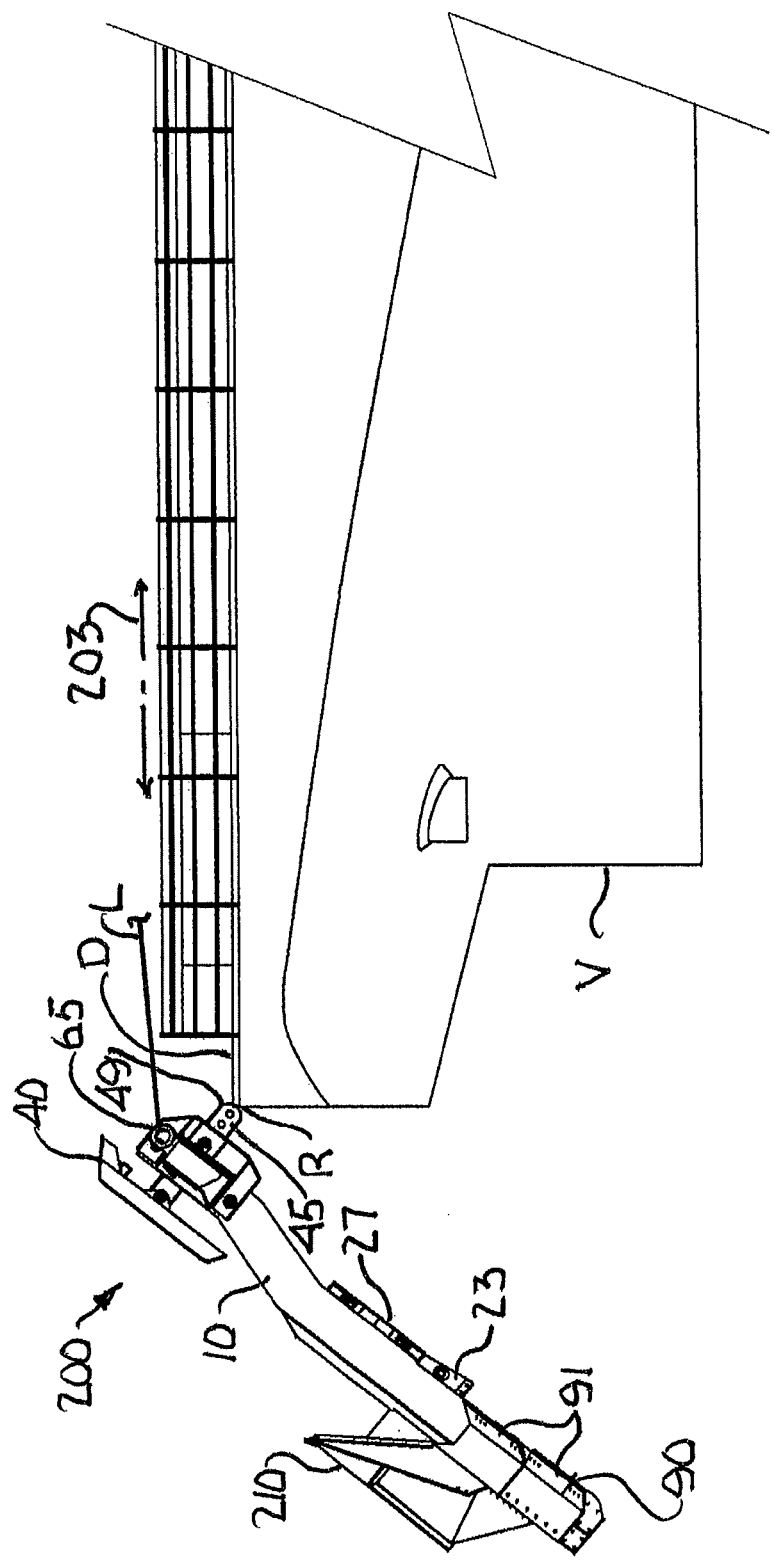
FIG. 33 is a side elevation view of the trench cutting plow of FIG. 26 during release from/retrieval to a vessel with the skid post passing over the stern of a vessel.
Figure 34:
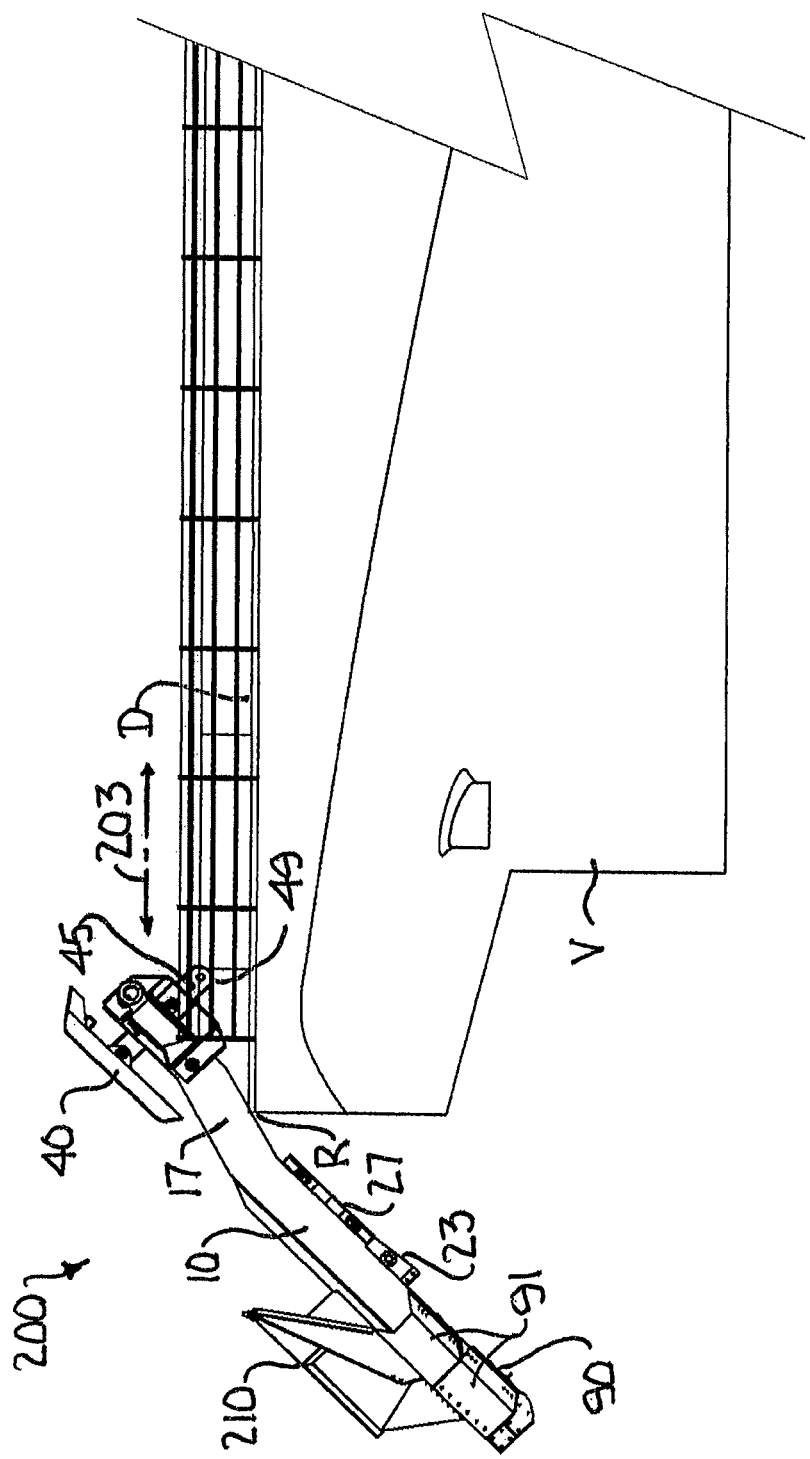
FIG. 34 is a side elevation view of the trench cutting plow of FIG. 26 during release from/retrieval to a vessel with the chassis angled portion passing over the stern of a vessel.
Figure 35:
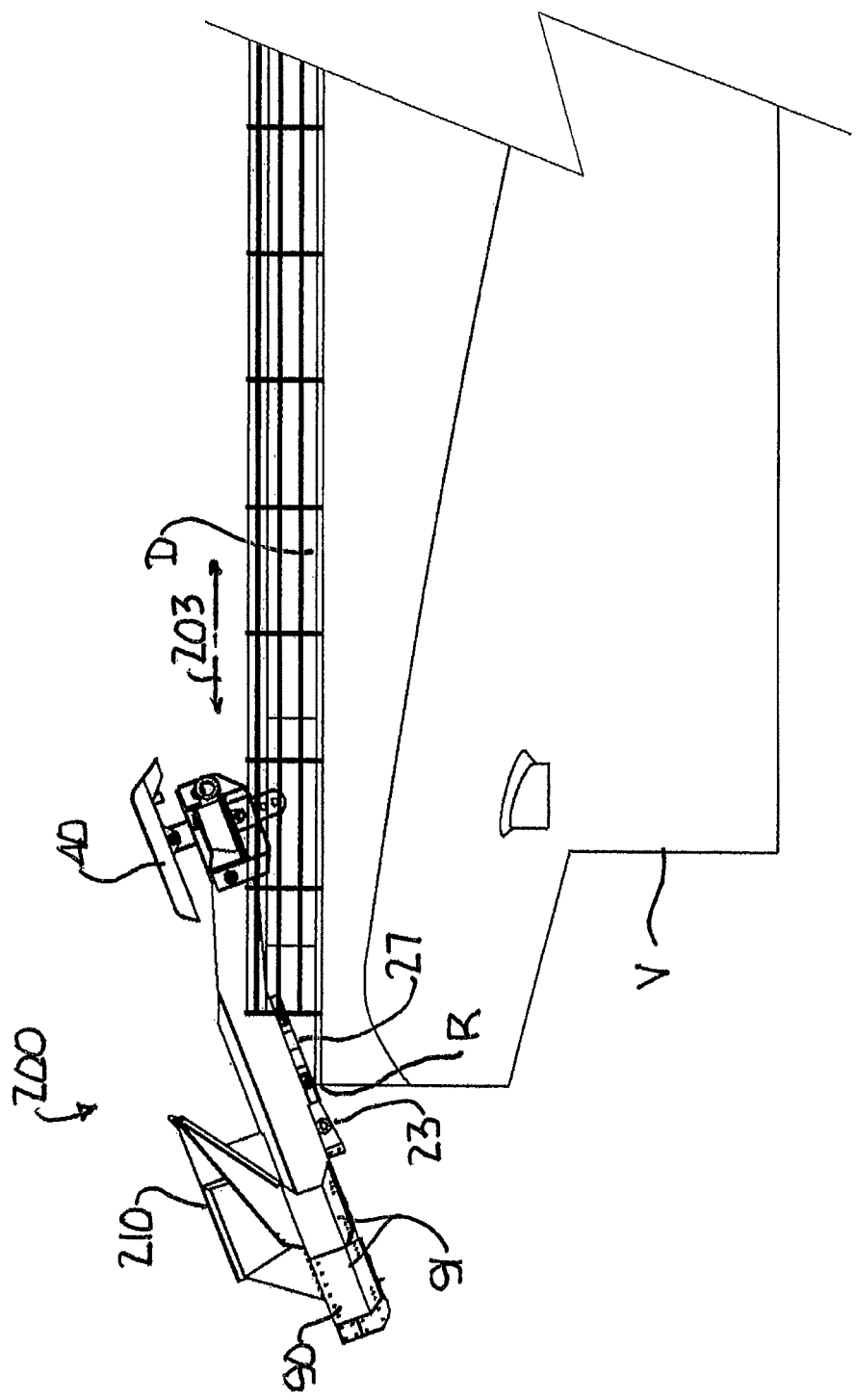
FIG. 35 is a side elevation view of the trench cutting plow of FIG. 26 during release from/retrieval to a vessel with the chassis transition surface and share attachment plates passing over the stern of a vessel.
Figure 36:
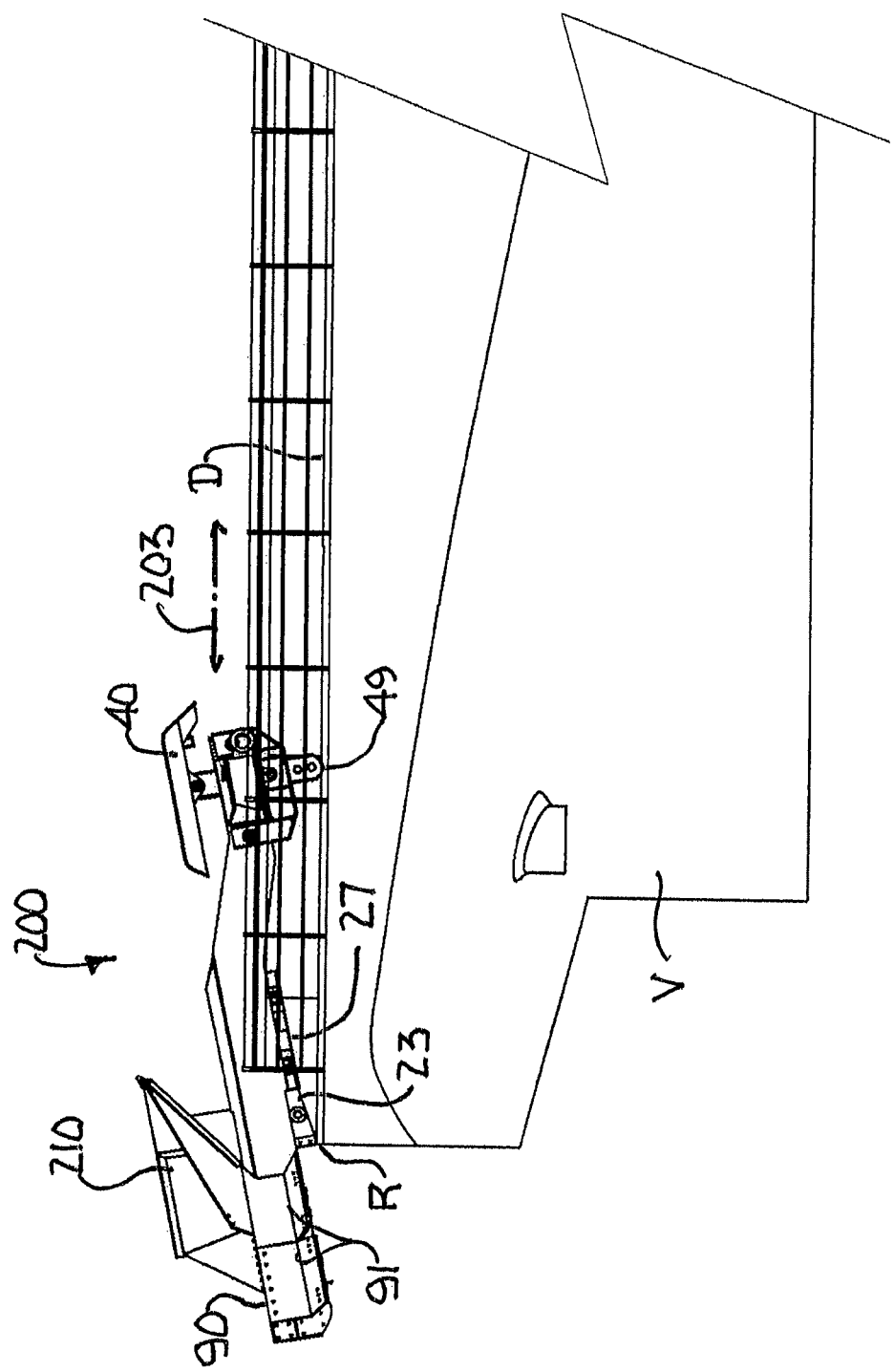
FIG. 36 is a side elevation view of the trench cutting plow of FIG. 26 during release from/retrieval to a vessel with the moldboards passing over the stern of a vessel.

Turning to FIGS. 33-36, the over-the stern release (FIGS. 36-33) and retrieval (FIGS. 33-36) of the trench cutting plow 200 from the vessel V to the seabed S and from the seabed S onto the vessel V, respectively, are illustrated. During release, the plow 200 herein described is initially positioned upside down on the deck D with moldboards 90 aft and the longitudinal axis 201 of the plow 200 aligned on the plow's transition axis 203. The arcuate top 49 of the skid post 45 and the free ends of the moldboards 90 provide the initial contact points or surfaces with the deck D. As seen in FIG. 36, as the plow 200 is propelled, by winch or other suitable push/pull equipment (not shown), along the deck D of the vessel V toward and across the fulcrum/roller R at the stern of the vessel V, only the moldboards 90 and the arcuate top 49 of the post 45 will remain in contact with the fulcrum/roller R until the share connection plates 23 reach the fulcrum/roller R. As seen in FIG. 35, as the plow 200 continues sternward travel, only the tops of the share connection plates 23 followed by the trailing top or transition surface 27 of the transition member 25 and the arcuate top 49 of the post 45 will remain in contact with the fulcrum/roller R. As seen in FIG. 34, as the center of gravity of the plow 200 has passed the fulcrum/roller R, the cantilevered weight of the plow 200 causes the plow 200 to pivot on the transition surface 27 of the transition member 25, allowing the moldboards 90 to drop toward the seabed S and the skid post 45 to rise from the deck D. At this point in transition, all contact between the plow 200 and the vessel V transfers to the angled portion 17 of the chassis elongated member 11 and the fulcrum/roller R of the vessel V. Looking at FIG. 33, after the angled portion 17 of the chassis elongated member 11 has traveled sternward beyond the fulcrum/roller R, the plow 200 will have rotated further toward the seabed S and all further contact between the plow 200 and the vessel V will have transferred to the arcuate top 49 of the skid post 45 and the fulcrum/roller R of the vessel V. The arcuate top 49 of the skid post 45 provides the final contact with the fulcrum/roller R as the plow 200 is fully released at the end of a pulling line L to the seabed S.

Retrieval of the trench cutting plow 200 at the end of the pulling line L from the seabed S is accomplished by reversal of the release method. As seen in FIG. 33, as the plow 200 is raised at the end of the line L toward the fulcrum/roller R on the stern of the vessel V, the arcuate top 49 of the skid post 45 will first contact the fulcrum/roller R. As noted above, the pulling points 65 of the plow 110 are located so as to assure that the post 45 will not hang up on the fulcrum/roller R. Further contact with the fulcrum/roller R transfers sequentially to the angled portion 17 of the chassis elongated member 11 as seen in FIG. 34, to the transition surface 27 as seen in FIG. 35, and to the tops of the share connection plates 23 as seen in FIG. 36. When the plow 200 has been pulled fully across the fulcrum/roller R, it will come to rest with the arcuate top 49 of the skid post 45 and the tops of the free ends of the moldboards 90 as the contact points on the deck D of the vessel V.

Backfill Plow and Methods

Turning to FIGS. 37-40, for backfilling spoil into a seabed trench, the backfill plow 300 includes the chassis 10, the skid 40 configured to straddle the trench being backfilled, the moldboards 90 mounted on the chassis 10 forward of the skid 40 and the blade 310 mounted on and spanning the bottom edges of the moldboards 90.

As best seen in FIG. 37, in the third/backfill mode 300, the chassis 10 is oriented upside down in comparison to its orientation as shown in FIGS. 1 and 2. That is, in the backfill plow 300, the skid end 13 is lower than the tool end 15 of the elongated member 11, as in the first/boulder clearing mode 100 shown in FIG. 13, and the crossbeam center post 59 extends upward through the receptacle 19 in the skid end 13 of the chassis 10, similar to the post 45 in the first/boulder clearing mode 100 shown in FIG. 13. However, the chassis 10 is oriented in reverse in comparison to the first/boulder clearing mode 100 shown in FIG. 13, so that the skid 40 is at the trailing end of the backfill plow 300. In comparison to the first/boulder clearing mode 100, the skis 41 are also reversed in the third/boulder clearing mode 300 for forward travel in a trailing position.

As seen in FIGS. 37-40, in the third/backfill mode, the moldboards 90, including the primary moldboards 91, the secondary moldboards 93 and the tertiary moldboards 95, are mounted on the chassis 10 in the same way as described in relation to the first/boulder clearing mode 100 of FIGS. 13-17 by use of the chassis extension 33 and supporting structure 37. The transition attachment 70 is also mounted to the chassis 10 in the same manner as described in relation to the first/boulder clearing mode 100 of FIGS. 13-17. The recovery fins 97 are appended to the free ends of the tertiary moldboards 95 as described in relation to the first/boulder clearing mode 100 of FIGS. 13-17.

Looking at FIG. 41, the blade 310 has a passage 311 at its rear apex 313. The passage 311 is configured to dispense the spoil collected by the blade 310 and funneled by the moldboards 90 onto the top of a pipe or cable C disposed in the trench T below the passage 311. The side edges of the blade 310 are secured to the lower portions of their respective moldboards 90 by use of side plates 315 and to the chassis extension 33 by use of an upright mounting structure 317. The mounting structure 317 is centered on the leading edge 319 of the blade 310 and, as shown, extends from the blade edge 319 to the passage 311. The blade 310 may be stiffened by ribs 321. As shown, the passage 311 is slightly greater than semi-circular with a diameter 323 parallel to the blade leading edge 319. The stiffening ribs 321 fan out from points along the passage circumference 325 to respective points along the blade leading edge 319.

Looking at FIG. 42, the backfill plow 300 preferably further includes a flapper board 340 aft of the passage 311. The flapper board 340 includes a plate 341 fixed to and swinging below a horizontal shaft 343. The shaft 343 is journalled to reciprocate on an axis parallel to the passage diameter 323. A weight 345 biases the plate 341 toward a vertical orientation. The slapping action of the flapper board 340 fragments spoil discharged through the blade passage 311. Large and small stiffeners 347 and 349 reinforce the plate 341. The reciprocating swing of the plate 341 on its shaft 343 is caused as water and spoil discharging through the passage 311 swings the plate 341 toward the rear and the weight 345 causes the plate 341 to swing back toward vertical.

Figure 40:
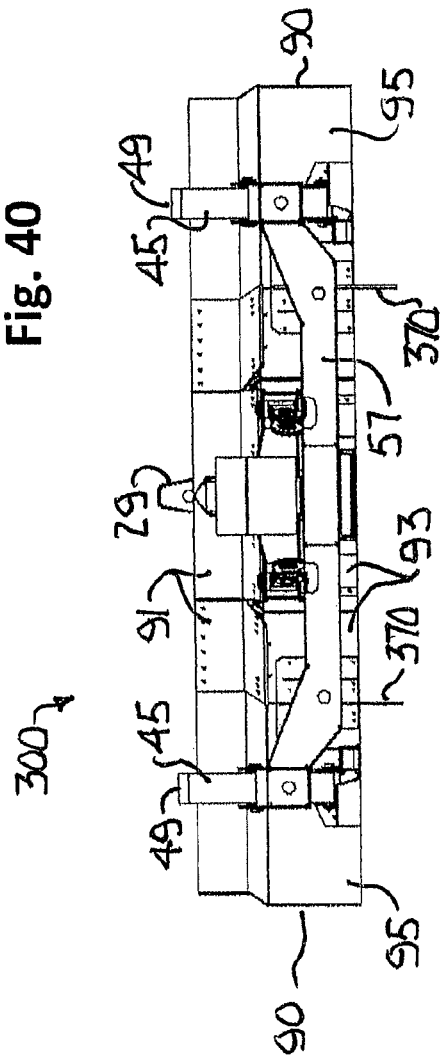
FIG. 40 is a front elevation view of the backfill plow of FIG. 37.

The backfill plow 300 may also include keel plates 370, at least one keel plate 370 extending on opposite sides of the spoil passage 311. The keel plates 110, shown in FIG. 18 for use in the first/boulder clearing mode 100, can be used in the third/backfill mode 300 except that, in the backfill mode 300, they are mounted on the front of the moldboards 90 and extend under the blade 310. As seen in FIGS. 38-40, the keel plates 370 are mounted in parallel at the junctions of the secondary and tertiary moldboards 93 and 95. The primary function of the keel plates 370 is to steady the path of the backfill plow 300 as the blade 310 and moldboards 90 encounter and collect spoil M on the seabed S.

Figure 43:
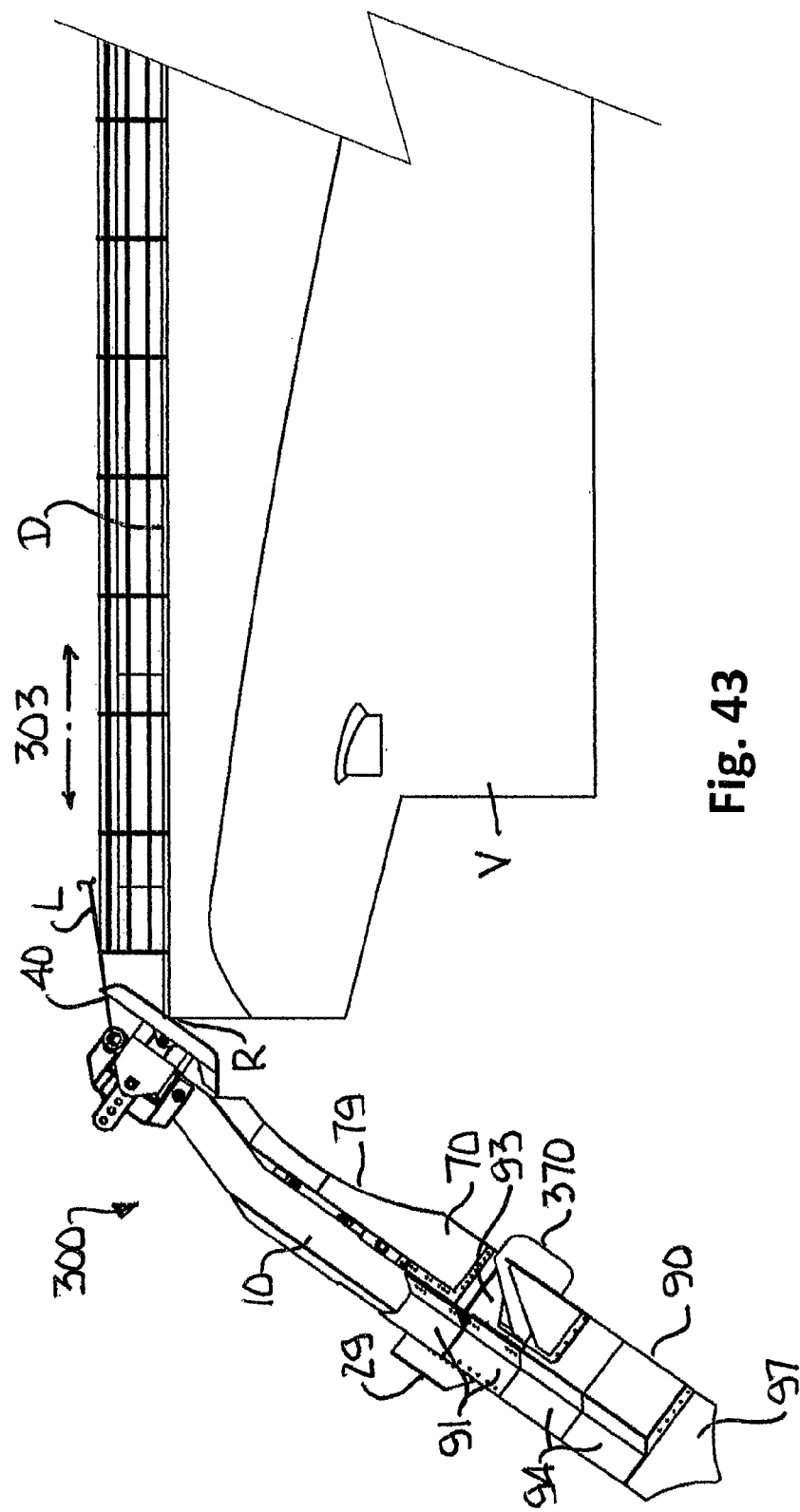
FIG. 43 is a side elevation view of the backfill plow of FIG. 37 during release from/retrieval to a vessel with the plow skid pivoting on the stern of a vessel.
Figure 44:
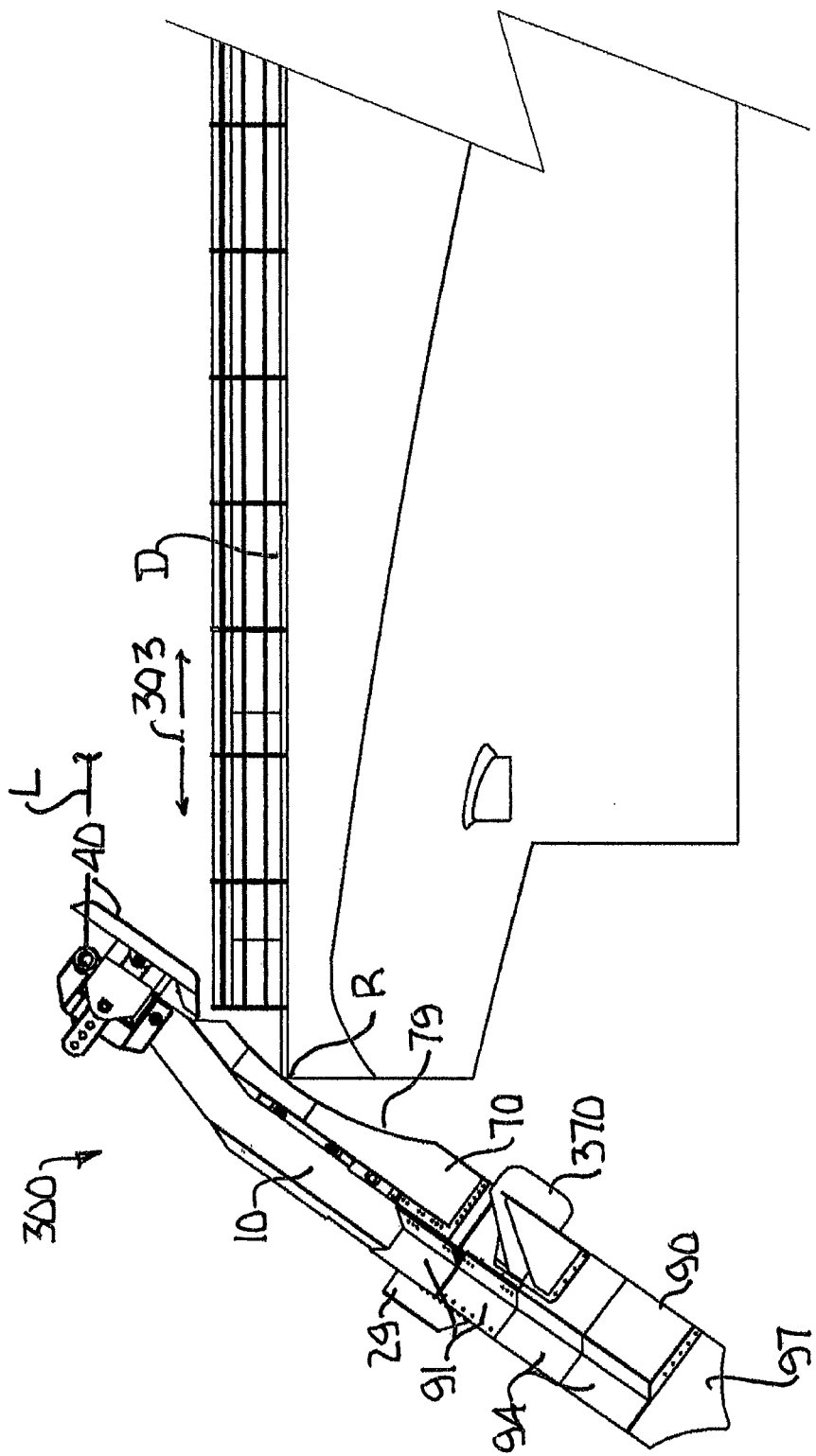
FIG. 44 is a side elevation view of the backfill plow of FIG. 37 during release from/retrieval to a vessel with the chassis angled portion pivoting on the stern of a vessel.
Figure 45:
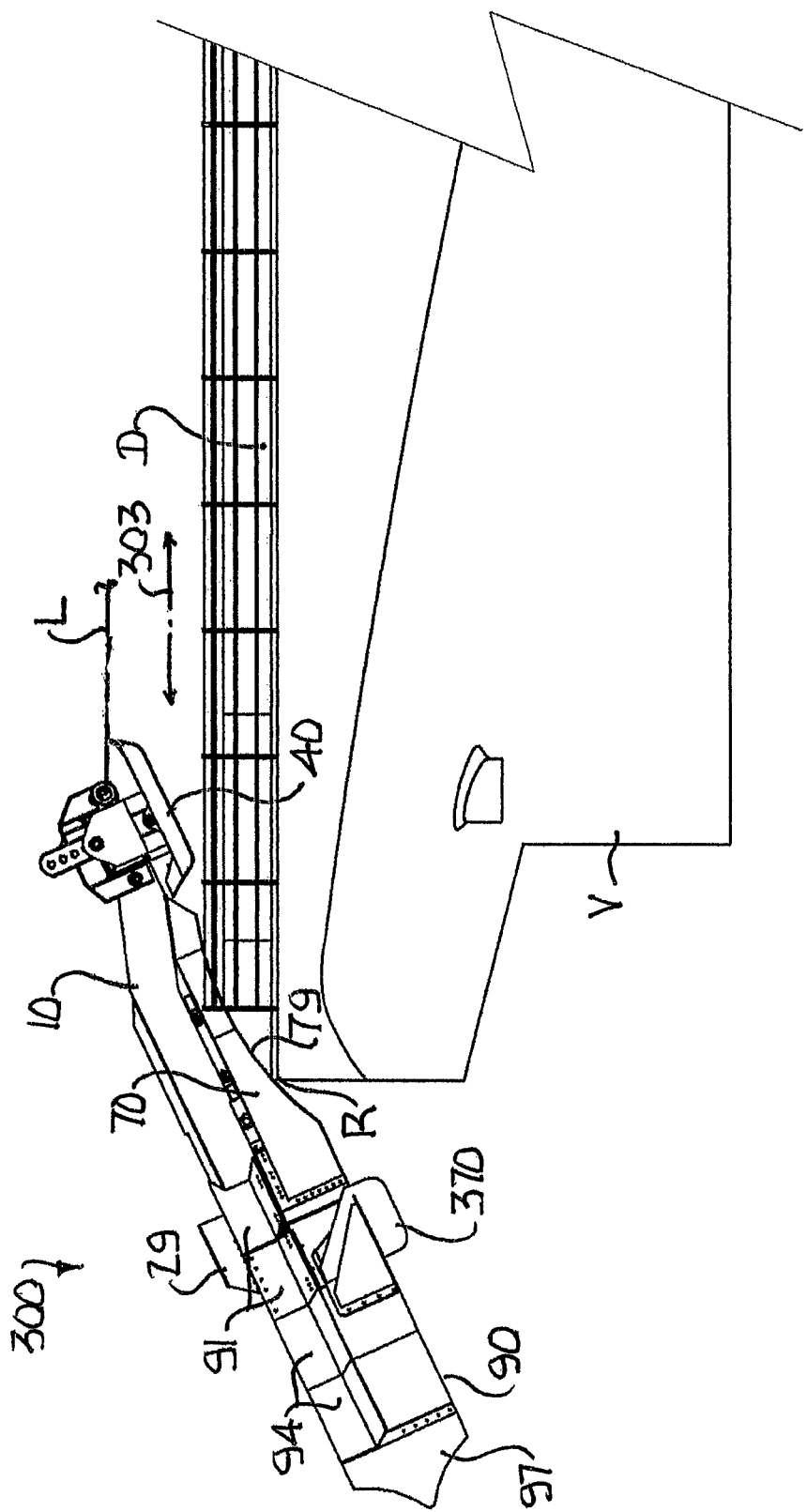
FIG. 45 is a side elevation view of the backfill plow of FIG. 37 during release from/retrieval to a vessel with the plow transition attachment pivoting on the stern of a vessel.
Figure 46:
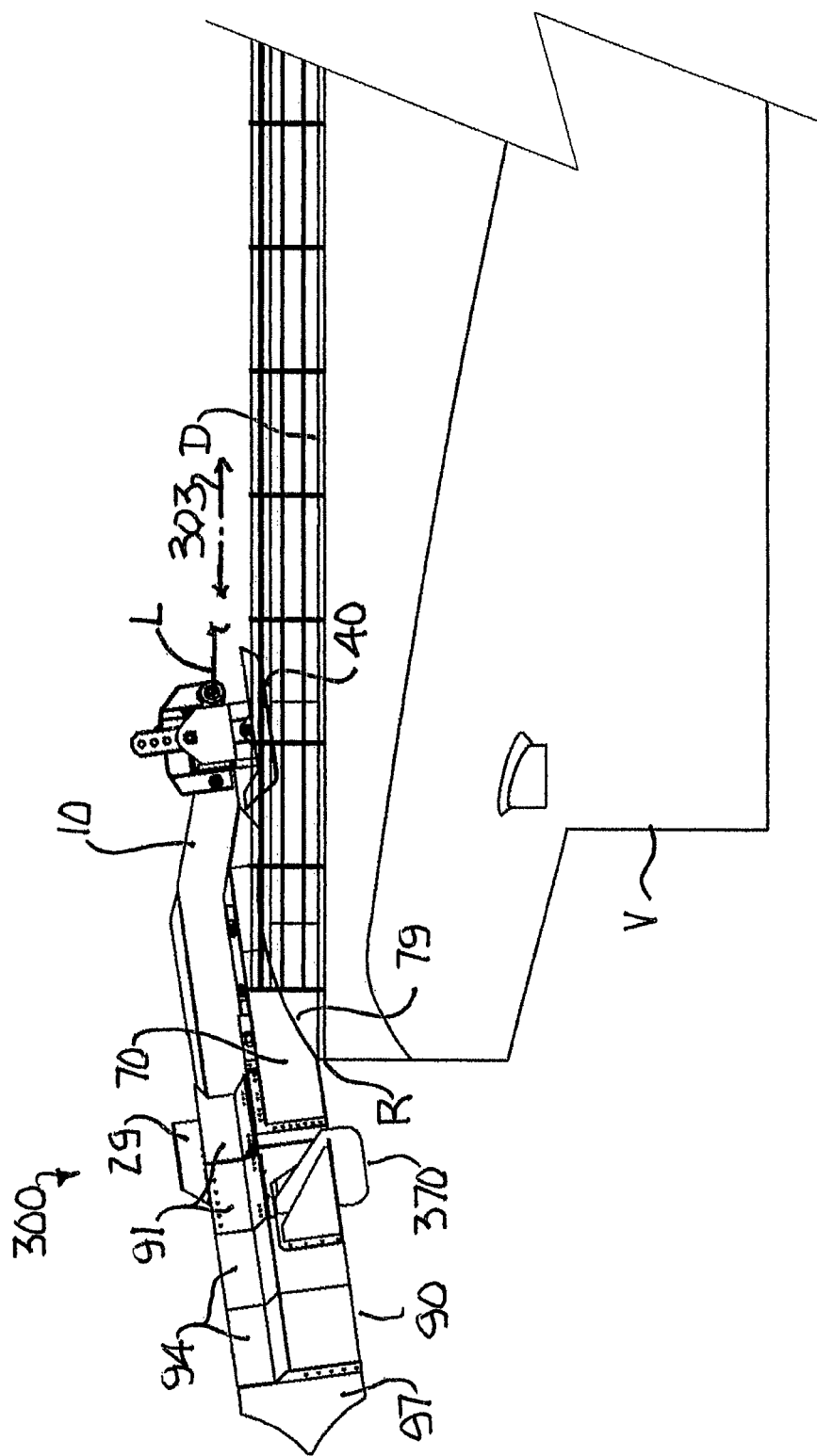
FIG. 46 is a side elevation view of the backfill plow of FIG. 37 during release from/retrieval to a vessel with the plow keel plates pivoting on the stern of a vessel.

Turning to FIGS. 43-46, the over-the stern release (FIGS. 46-43) and retrieval (FIGS. 43-46) of the backfill plow 300 from a vessel V to the seabed S or from the seabed S onto a vessel V, respectively, are illustrated. During release, the plow 300 described herein is initially positioned on the deck D with moldboards 90 aft and the longitudinal axis 301 of the plow 300 aligned on the transition axis 303 of the plow 300. The skid 40 and bottoms of the keel plates 370 provide the initial contact points with the deck D. As seen in FIG. 46, as the plow 300 is propelled, by winch or other suitable push/pull equipment (not shown), along the deck D of the vessel V toward and across the fulcrum/roller R at the stem of the vessel V, the keel plates 370 clear the fulcrum/roller R, allowing the moldboards 90 to drop toward the seabed S. The plow begins to pivot on the transition surface 79 and the skid 40 begins to rise from the deck D. At this point in transition, all contact between the plow 300 and the vessel V has transferred to the transition attachment 70 and the fulcrum/roller R of the vessel V. Looking at FIG. 45, as the plow 300 travels further sternward across the fulcrum/roller R, all contact between the plow 300 and the vessel V has transferred to the concave portion of the transition surface 79 of the attachment 70 and the fulcrum/roller R of the vessel V. As seen in FIG. 44, as the attachment 70 has traveled sternward beyond the fulcrum/roller R, all contact between the plow 300 and the vessel V remains on the angled portion 17 of the chassis elongated member 11 and the fulcrum/roller R of the vessel V. The plow 300 has tipped so that the skid 40 nears vertical. Looking at FIG. 43, as the plow 300 continues to rotate on and travel across the fulcrum/roller R, the buoyancy of the sea water and the travel speed of the vessel V limit rotation of the plow 300 as the transition attachment 70 slides off the fulcrum/roller R. The shape of the attachment 70 affords a smooth transition from the transition surface 79 to the skid 40. The skid 40 becomes the final contact with the fulcrum/roller R until the plow 100 is fully released at the end of a pulling line L to the seabed S.

Retrieval of the backfill plow 300 at the end of the pulling line L from the seabed S is accomplished by reversal of the release method. As seen in FIG. 43, as the plow 300 is raised at the end of the line L toward the fulcrum/roller R on the stem of the vessel V, the skid 40 will first contact the fulcrum/roller R. As noted above, the pulling points 65 of the plow 300 are located so as to assure that the head 51 and skis 41 and 43 of the sled 40 will not hang up on the fulcrum/roller R. Further contact with the fulcrum/roller R transfers sequentially to the angled portion 17 of the chassis elongated member 11 as seen in FIG. 44, to the attachment transition surface 79 as seen in FIG. 45 and to the bottom of the keel plates 370 as seen in FIG. 46. When the plow 300 has been pulled fully across the fulcrum/roller R, it will come to rest with the skid 40 and keel plates 370 as the contact points on the deck D of the vessel V.

Figure 47:
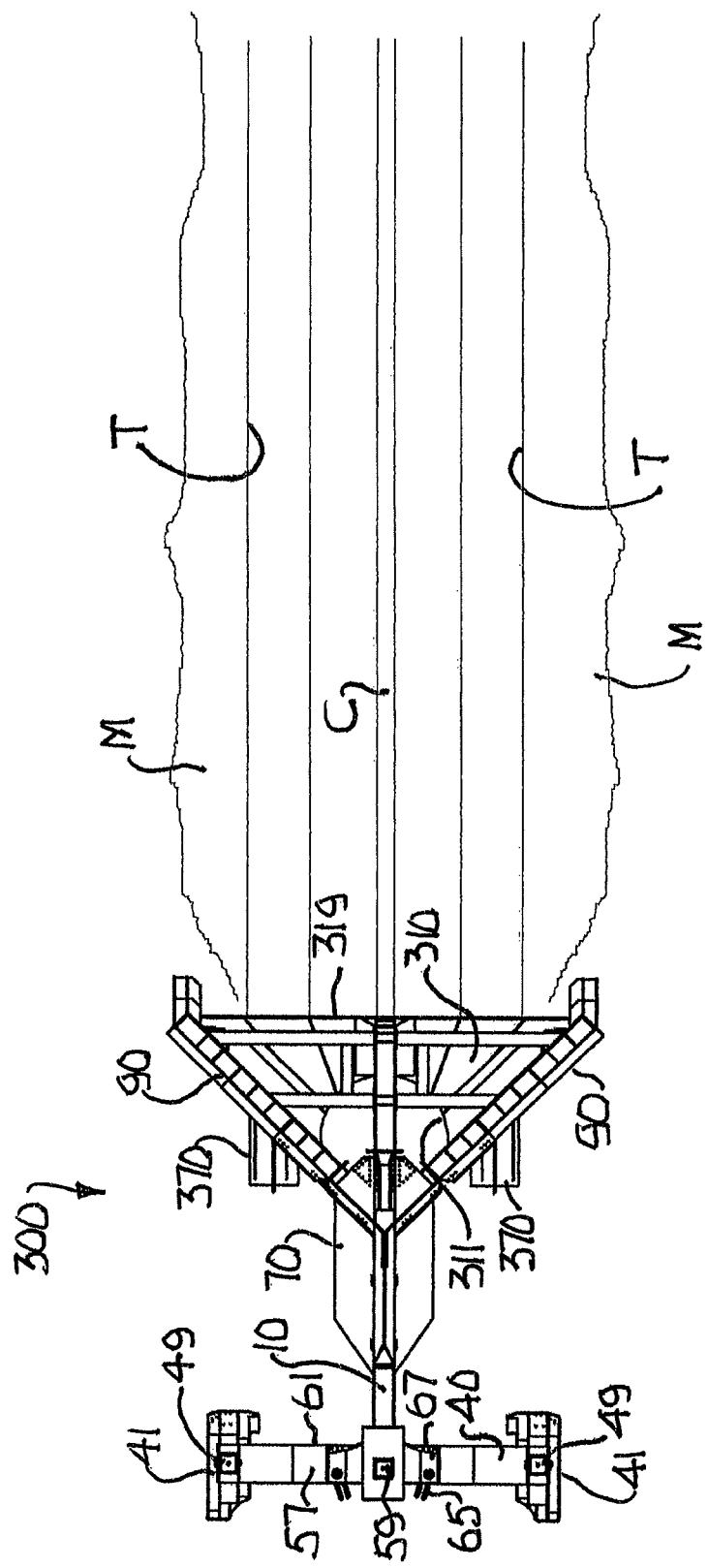
FIG. 47 is a top plan view of the backfill plow of FIG. 37 in operation.
Figure 48:
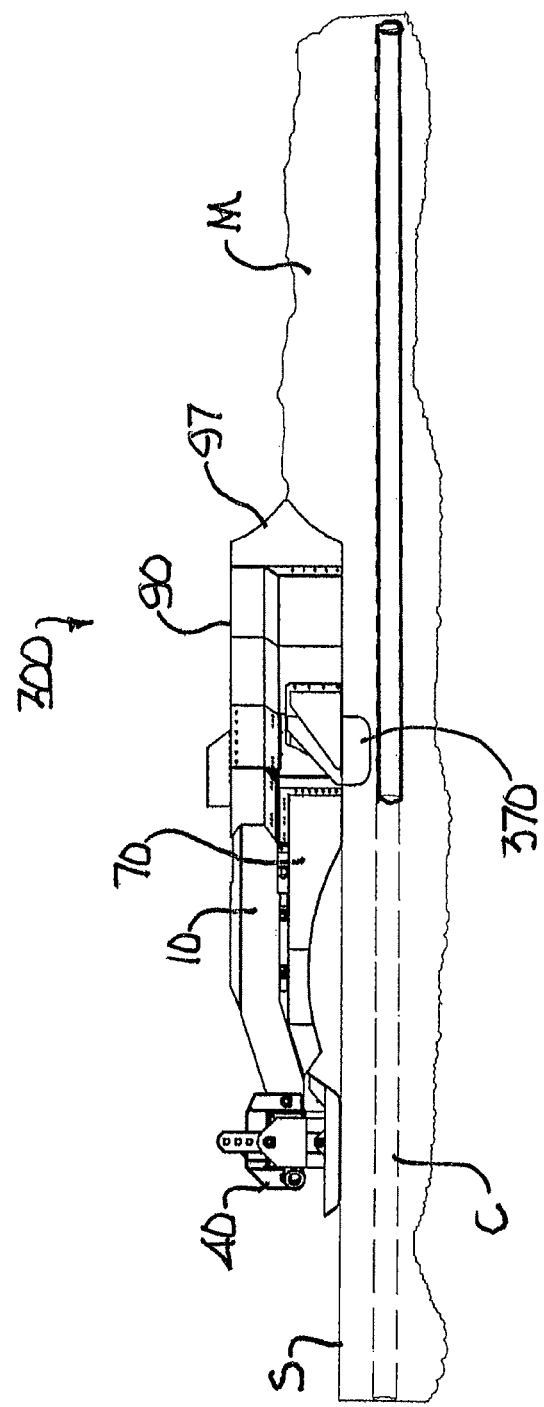
FIG. 48 is a side elevation view of the backfill plow of FIG. 37 in operation.

Turning to FIGS. 47 and 48, in backfilling spoil M to cover a pipe P laid in a seabed trench T, the backfill plow 300, with the blade 310 forward, is propelled to travel on the seabed S and collect spoil M along the sides of the trench T. The moldboards 90 funnel the collected spoil M toward the rear apex 313 of the blade 310 and the funneled spoil M is discharged through the passage 311 in the blade apex 313 and onto the top surface of the pipe P disposed in the trench T. Preferably, the discharged spoil M is fragmented, as shown by the flapper board 340, before the discharged spoil M reaches the pipe P and the spoil M discharged onto the pipe P and into the trench T is leveled by the front surface 61 of the skid crossbar 57. The use of the passage 311 to discharge the spoil M directly onto, rather than to the sides of, the pipe P reduces the likelihood that the more dense spoil M will lift the pipe P in the trench T during backfilling.

Figure 49:
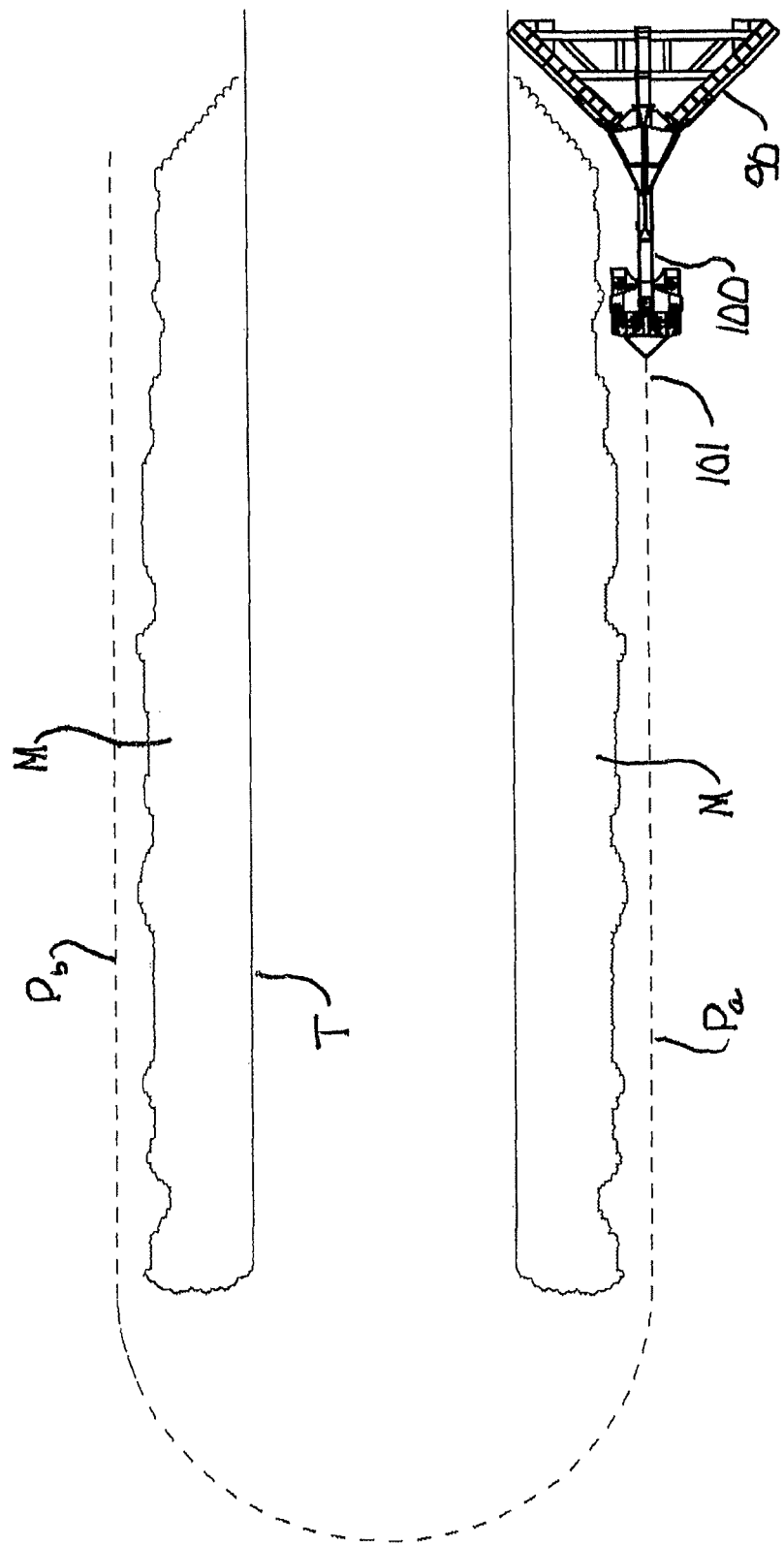
FIG. 49 is a top plan view illustrating the boulder clearing plow of FIG. 13 positioned to backfill a wide trench on a typical wide trench backfill route pattern.

Turning to FIG. 49, for trenches wider than the widest span of the moldboards 90, the boulder clearing plow 100 seen in FIG. 13 can be used to narrow the width of the trench T. This is accomplished by aligning the longitudinal axis 101 of the plow 100 outside of the spoil M one side of the trench T, as shown with only the starboard moldboards 90 pushing the spoil M. On the first pass $P_a$ the spoil M in the path of the starboard moldboards will be pushed toward or into the trench T. When the first pass $P_a$ is completed, the plow 100 is aligned on the other side of the trench T, as shown again with only the starboard moldboards 90 pushing the spoil M. On the second pass $P_b$, the spoil M in the path of the starboard moldboards will be pushed toward or into the trench T. When the second pass $P_b$ is completed, the process can be repeated for passes $P_n$ until the trench T is filled or until the trench T is sufficiently filled to complete backfilling using the backfill plow 300.

Figure 50:
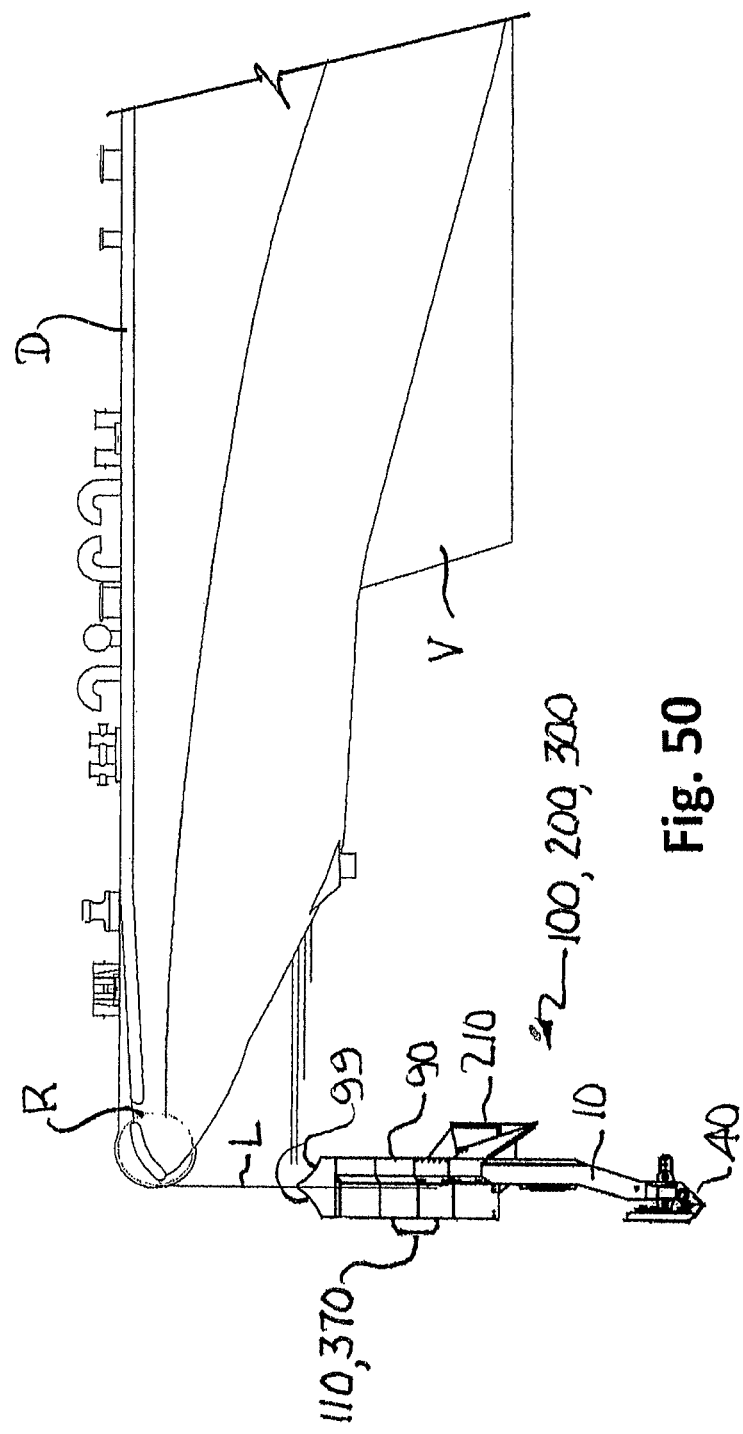
FIG. 50 is a side elevation view illustrating a plow suspended below the stern roller of a vessel.
Figure 51:
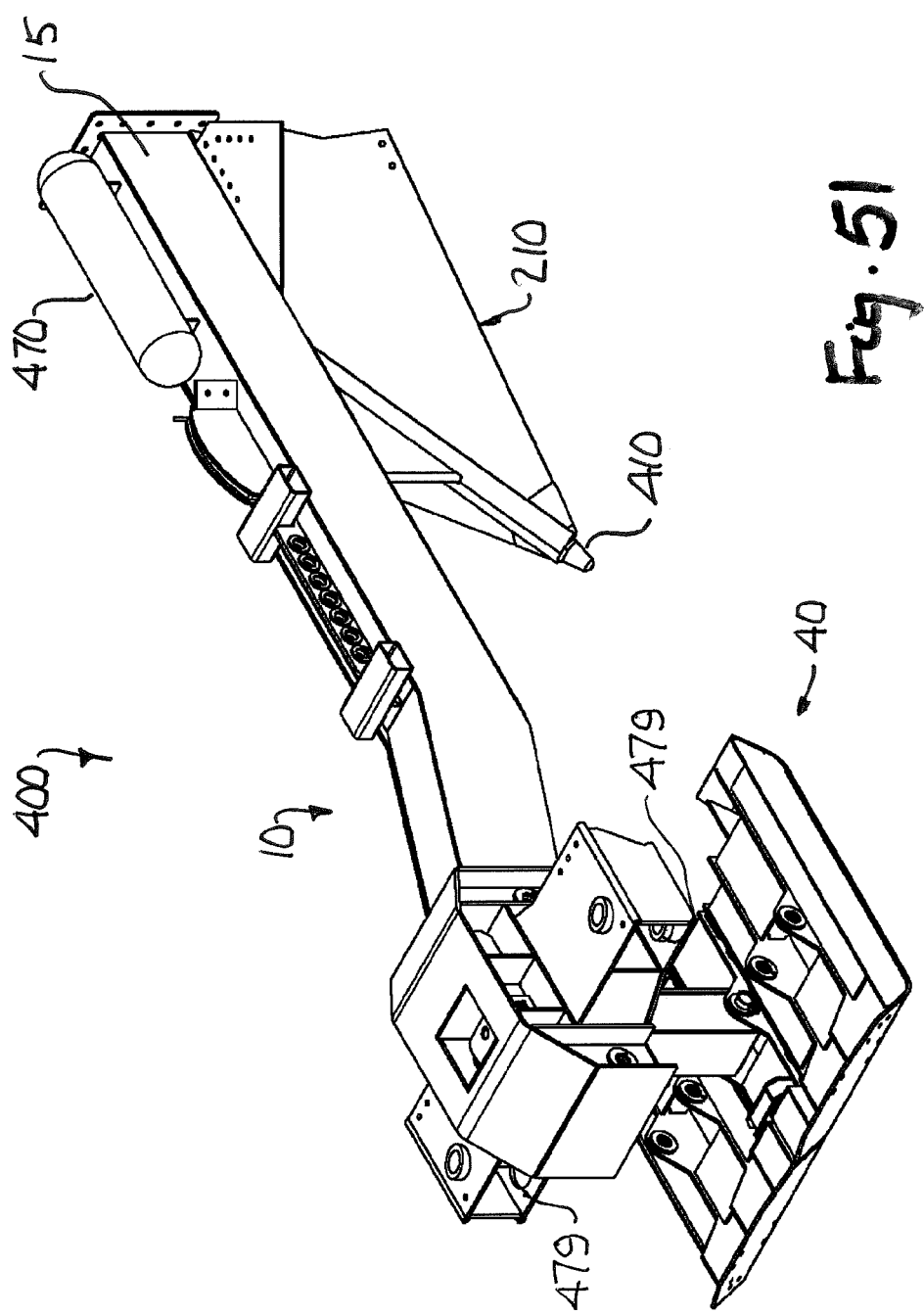
FIG. 51 is a top, right, front perspective view of an externally mounted instrumented bottle embodiment of a BAS plow having no moldboards.
Figure 52:
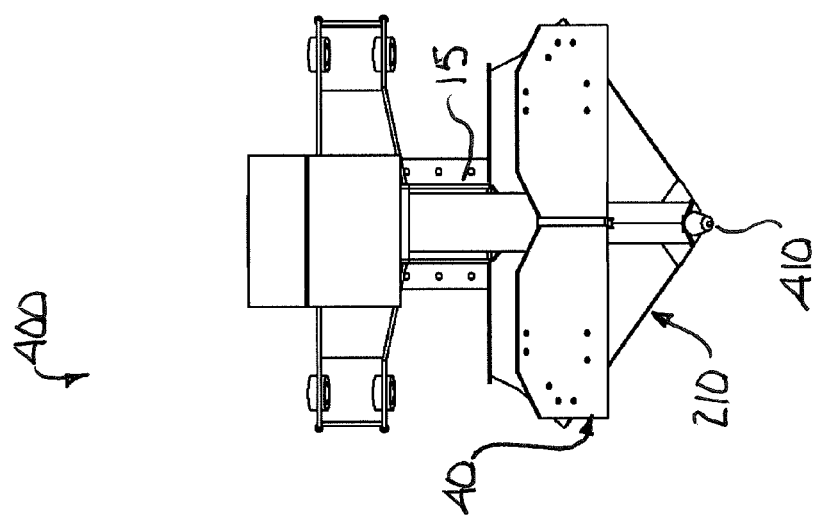
FIG. 52 is a front elevation view of a the BAS plow of FIG. 51.
Figure 53:
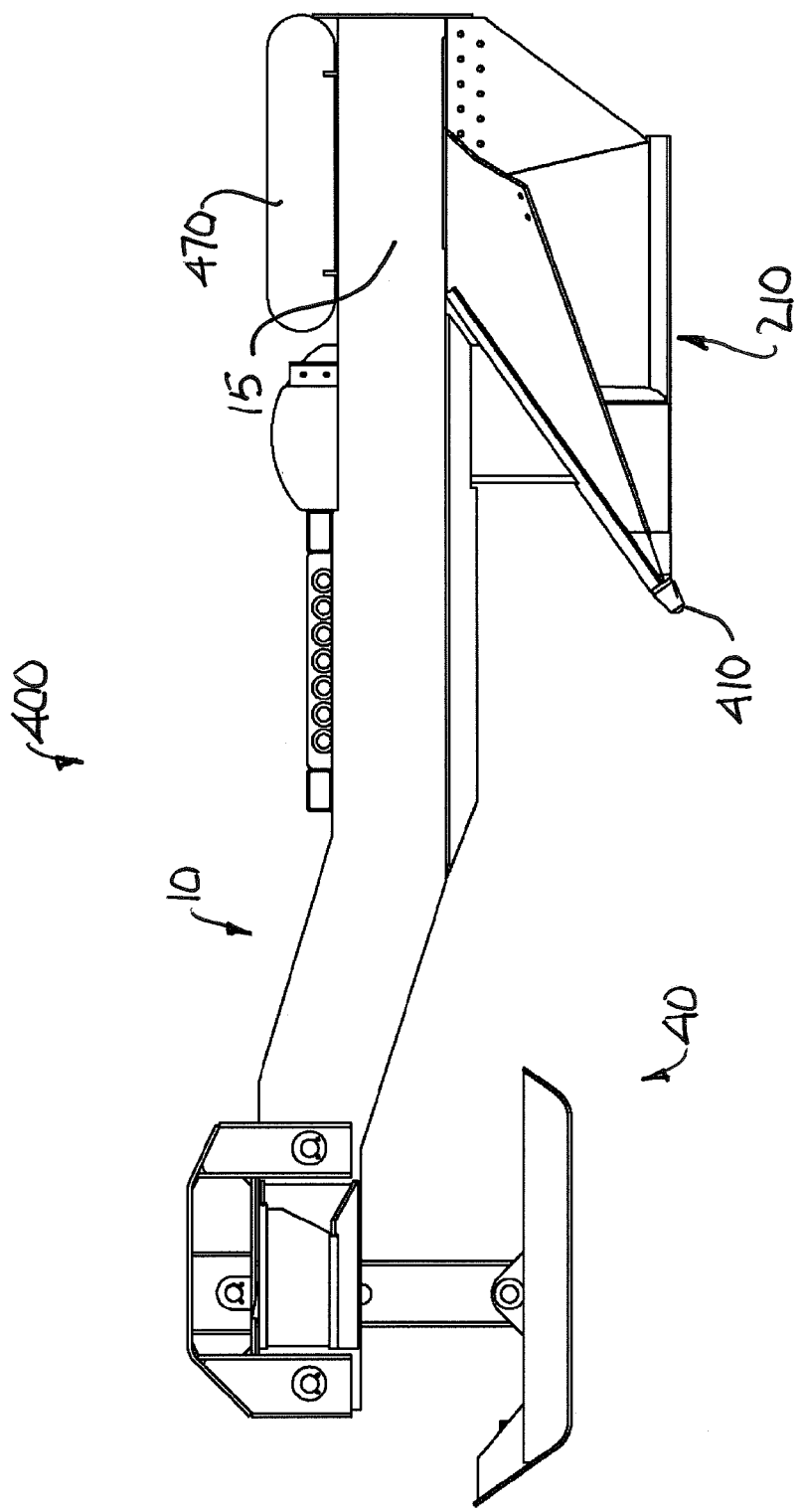
FIG. 53 is a side elevation view of a the BAS plow of FIG. 51.
Figure 54:
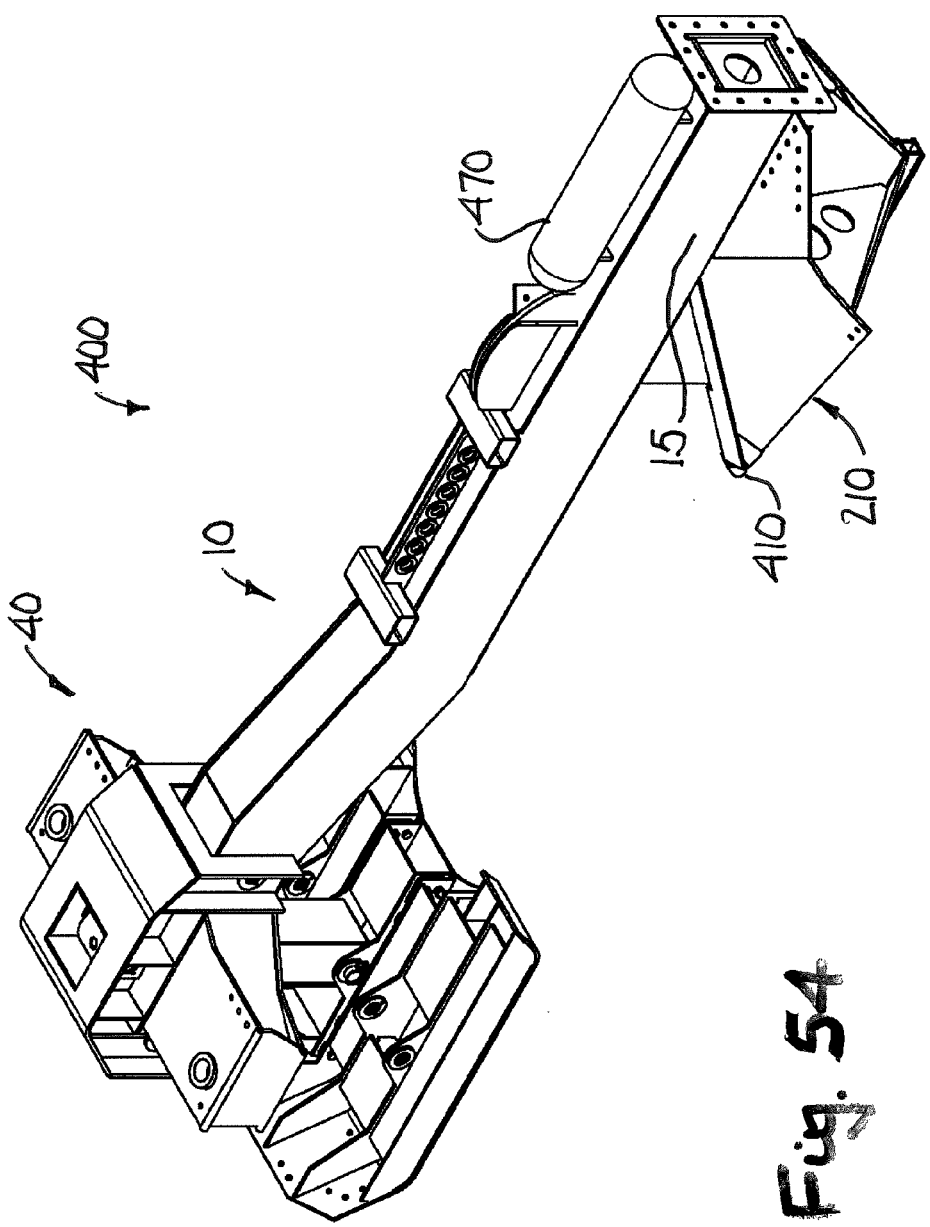
FIG. 54 is a top, left, rear perspective view of the BAS plow of FIG. 51.
Figure 55:
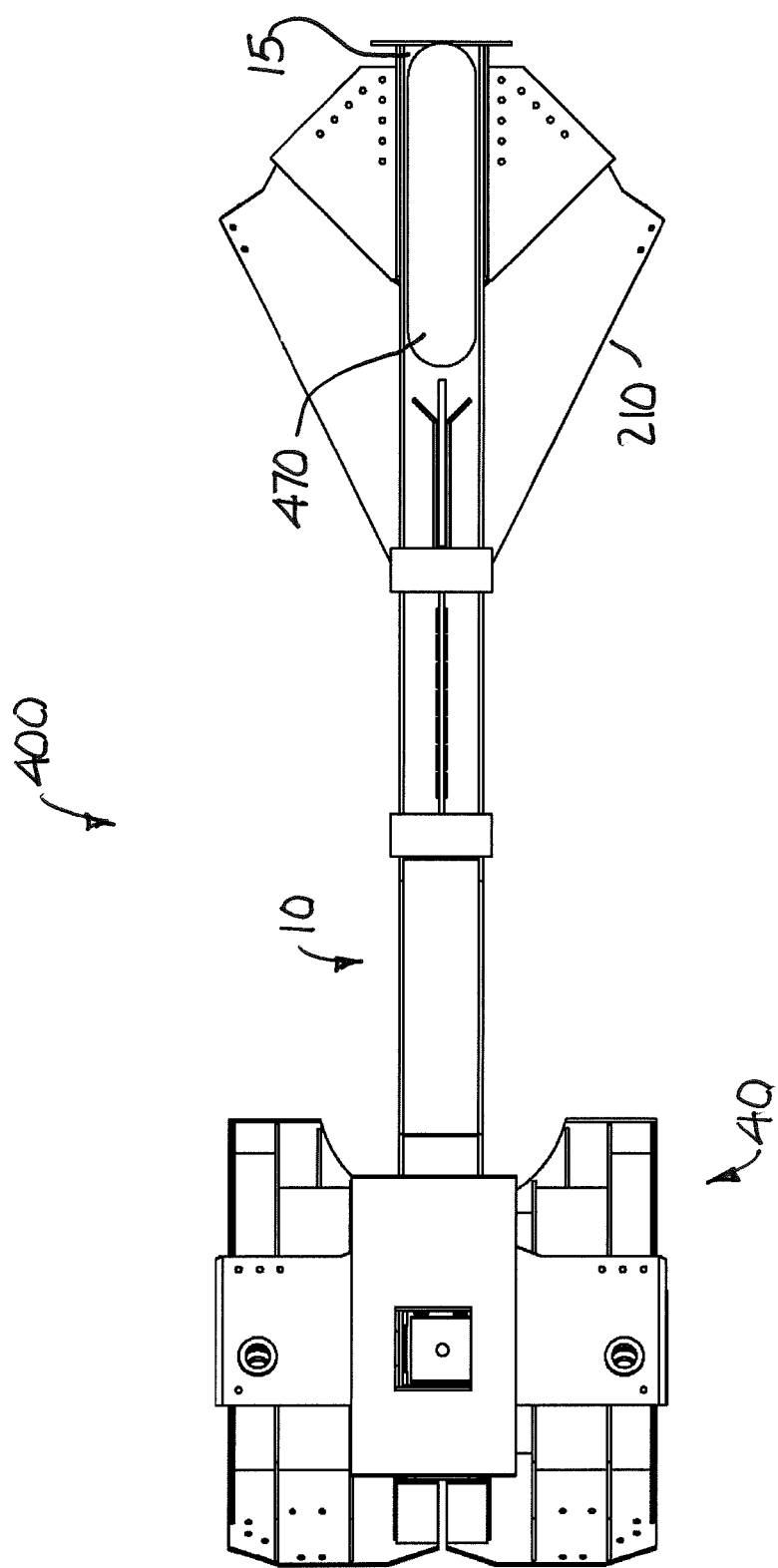
FIG. 55 is a top plan view of a the BAS plow of FIG. 51.
Figure 56:
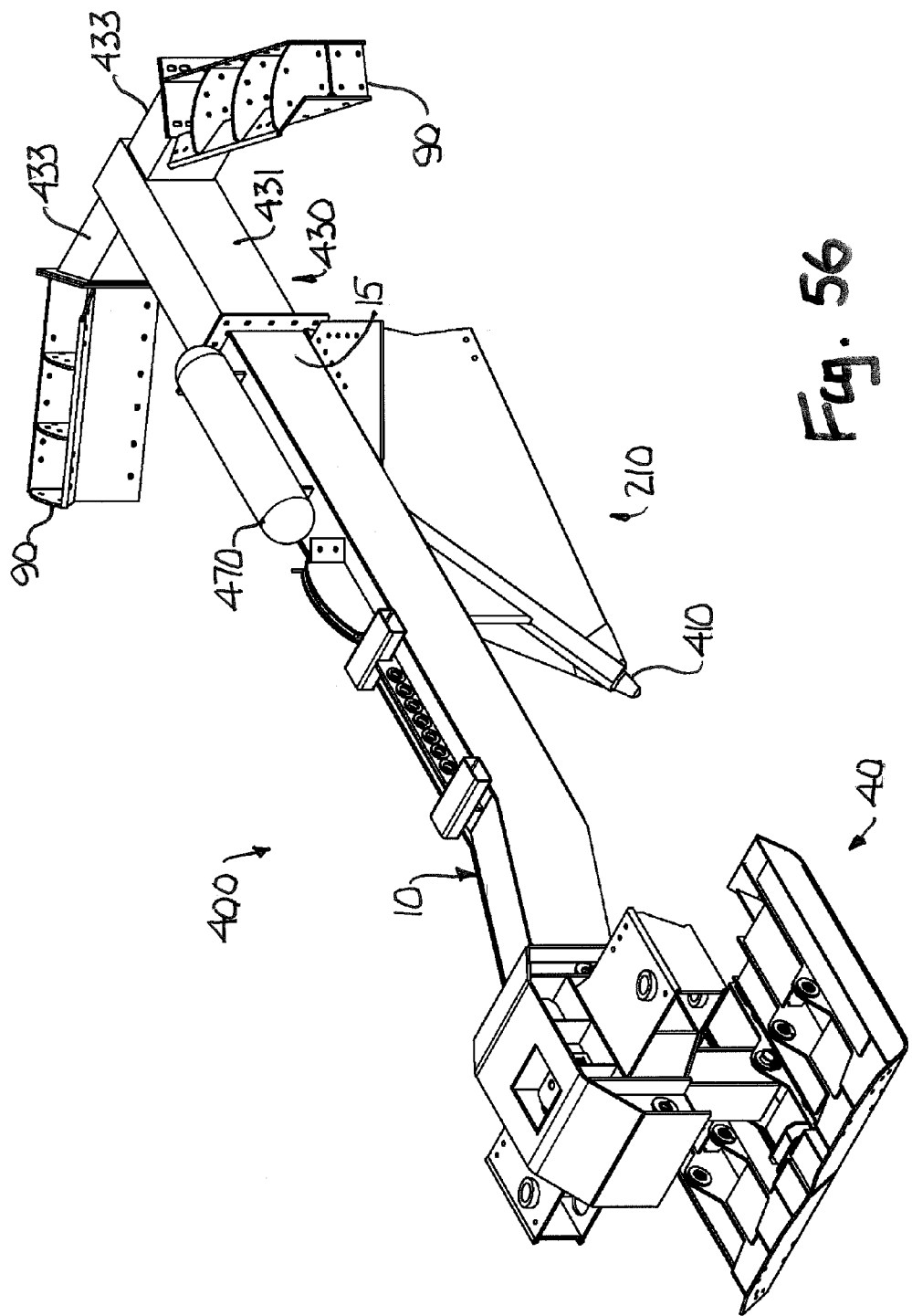
FIG. 56 is a top, right, front perspective view of an externally mounted instrumented bottle embodiment of a BAS plow with moldboards mounted on a straight extension.

Turning to FIG. 50, the plows 100, 200 or 300 can be retrieved by use of the tow line L connected to the retrieval fins 97. Depending on which of the plows 100, 200 or 300 is retrieved, the orientation of the plow 100, 200 or 300 can be rotated 180° about the axis of the tow line L to a suitable retrieval position. In either 180° orientation, the arcuate ends 99 of the fins 97 will enable the plow 100, 200 or 300 to pass over the fulcrum/roller R.

The plows 100, 200 and 300 are made using steel plates which are welded, bolted or pinned, depending on the intended permanency or detachability of the components being connected. The same chassis 10, skids 40, transition attachment 70, moldboards 90, and keel plates 110 can be configured into three different modes of operation and the share 210 and blade 310 added as needed for their respective modes. The need for a large vessel, cranes and supporting equipment is eliminated since the plow modes 100, 200 and 300 are all capable of over-the-stern launch and recovery.

While the convention apparatus and methods have been described in relation to laying pipe, it is also applicable to laying cable. Furthermore, all of the plows 100, 200 and 300 can be adapted for use with a remotely operated vehicle (ROV) which can "dock" on the plow to provide additional mechanical functionality such as skid height adjustment or electrical functionality such as cameras, lights, and load measurement.

BAS Plow and Method

FIGS. 51-55, 56-60, 61-65 and FIGS. 66-70 illustrate a number of possible embodiments of an instrumented bottle-type BAS plow 400. The BAS plow embodiments shown in FIGS. 51-70 may all use the same chassis 10 and skid 40 hereinbefore described in relation to the trench cutting plow 200 of FIGS. 26-29. They all may also use the same plow share 210 hereinbefore described in relation to the trench cutting plow 200 of FIGS. 26-29, except that a BAS plow sensor 410 is added to the tip of the trench cutting plow share 210. Furthermore, if they use moldboards at all, they may use the same moldboards 90 hereinbefore described in relation to the trench cutting plow 200 of FIGS. 26-29 but, if used, they are mounted on either a straight BAS extension 430 or on an angled BAS extension 450 added at the tool end 15 of the chassis 10. The extensions 430 and 450 can be added to the chassis 10 of the BAS plow in a manner as described in relation to the extension 33 added to the boulder clearing plow 100 of FIGS. 13-15. In all of the BAS embodiments, an instrumented bottle 470 is added, externally or internally, to the chassis 10. The BAS plow can be structurally modified to eliminate or reduce spoil heaps created by digging the BAS plow trench. The self-backfilling embodiments of the BAS plow are especially beneficial when multiple routes, none of which may be used, are trenched and when seabed restoration and minimal seabed impact are desirable.

Figure 71:
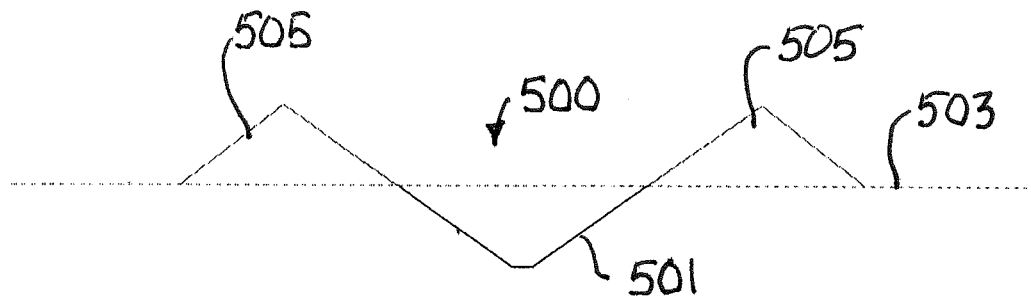
FIG. 71 is a trenching profile created by the BAS plow of FIG. 51.

In FIGS. 51-55, the instrumented bottle 470 is mounted externally on the chassis 10 and the BAS plow 400 has no moldboards. As shown, the instrument bottle 470 is secured to the top of, and in longitudinal axial alignment with, the tool end 15 of the chassis 10. This is the most convenient embodiment of the BAS plow 400 because the trench cutting plow 200 can be created by merely adding the moldboards 90 to the BAS plow 400 after the burial assessment surveys are completed. The instrumented bottle 470 could be left on the trench cutting plow 200 or could, if desired, be removed. The trenching profile 500 resulting from the first pass of the BAS plow embodiment of FIGS. 51-55 is seen in FIG. 71 in which the V-trench 501 below the seabed 503 is flanked by the spoil 505 dispersed above the seabed 503 and extending the walls of the V-trench 501 above the seabed 503.

Figure 57:
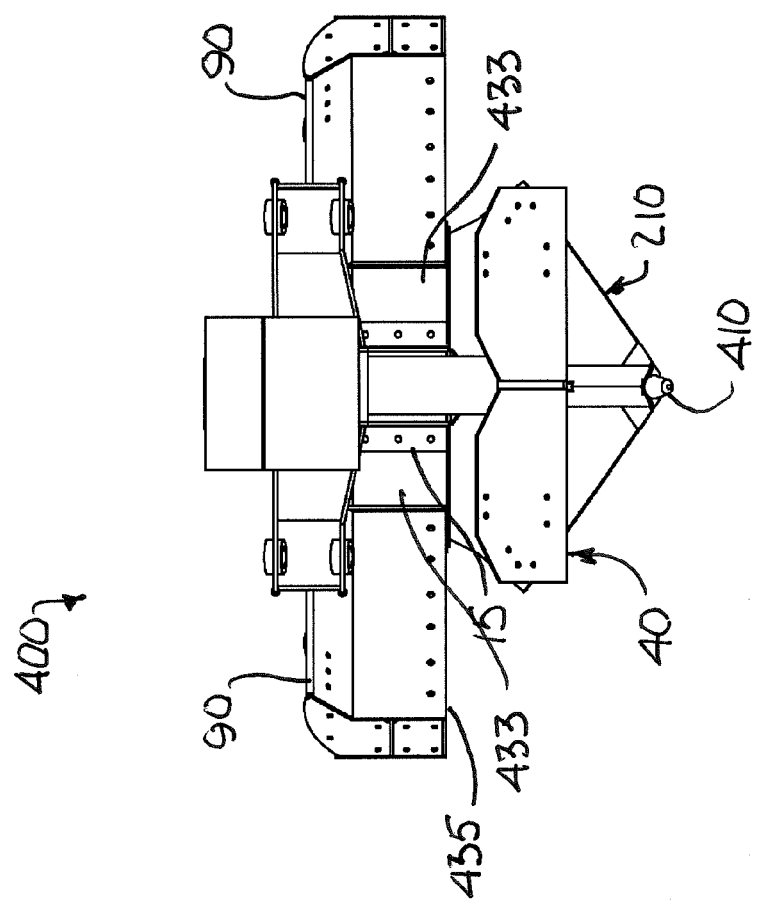
FIG. 57 is a front elevation view of a the BAS plow of FIG. 56.
Figure 58:
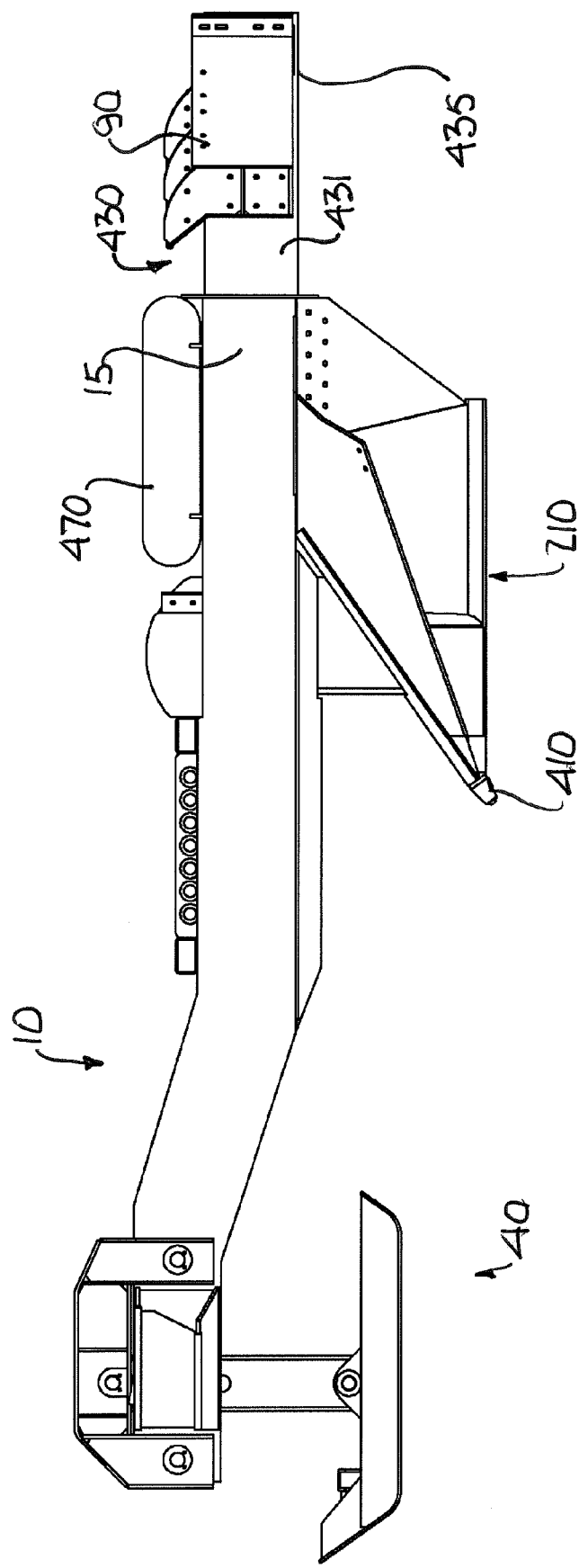
FIG. 58 is a side elevation view of a the BAS plow of FIG. 56.
Figure 59:
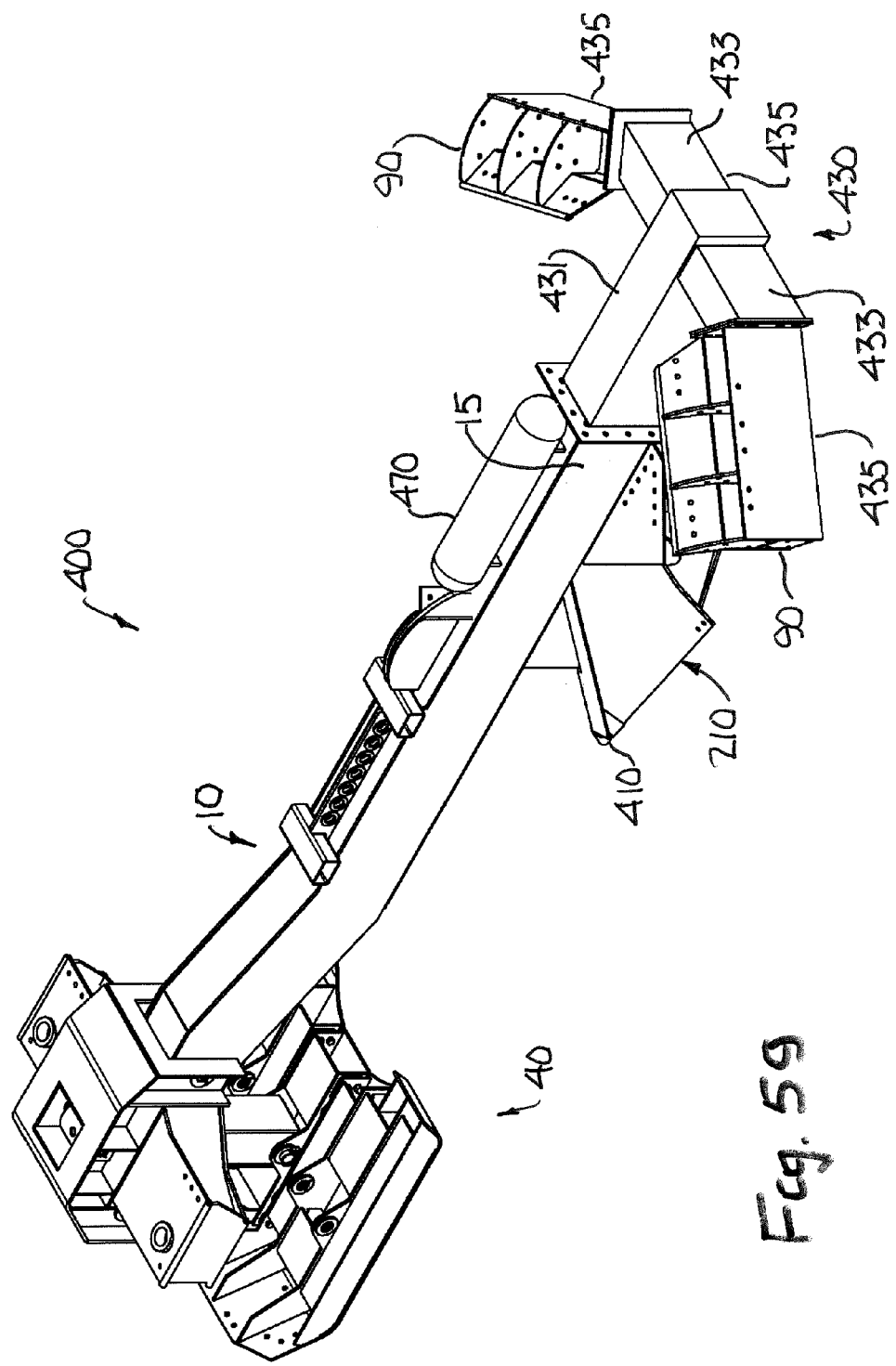
FIG. 59 is a top, left, rear perspective view of the BAS plow of FIG. 56.
Figure 60:
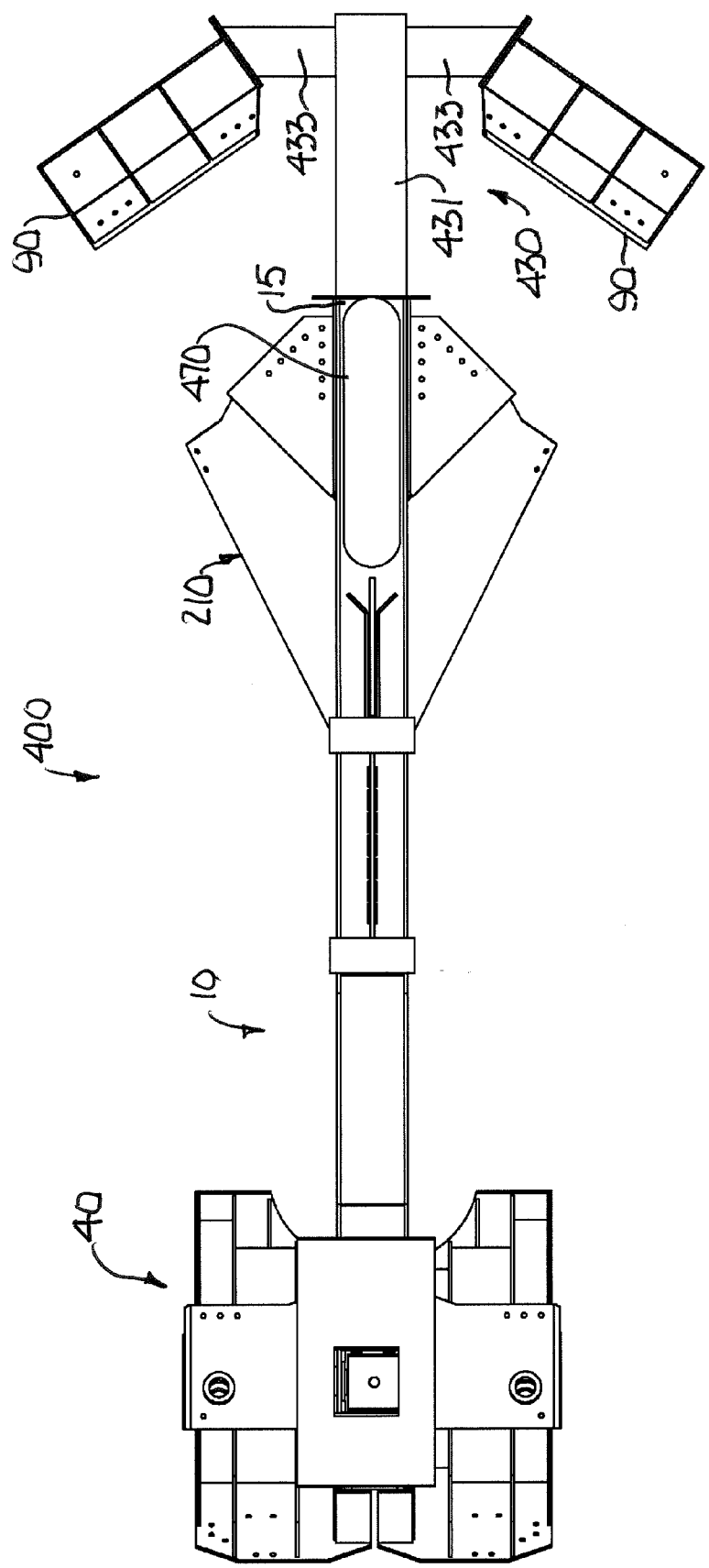
FIG. 60 is a top plan view of a the BAS plow of FIG. 56.
Figure 61:
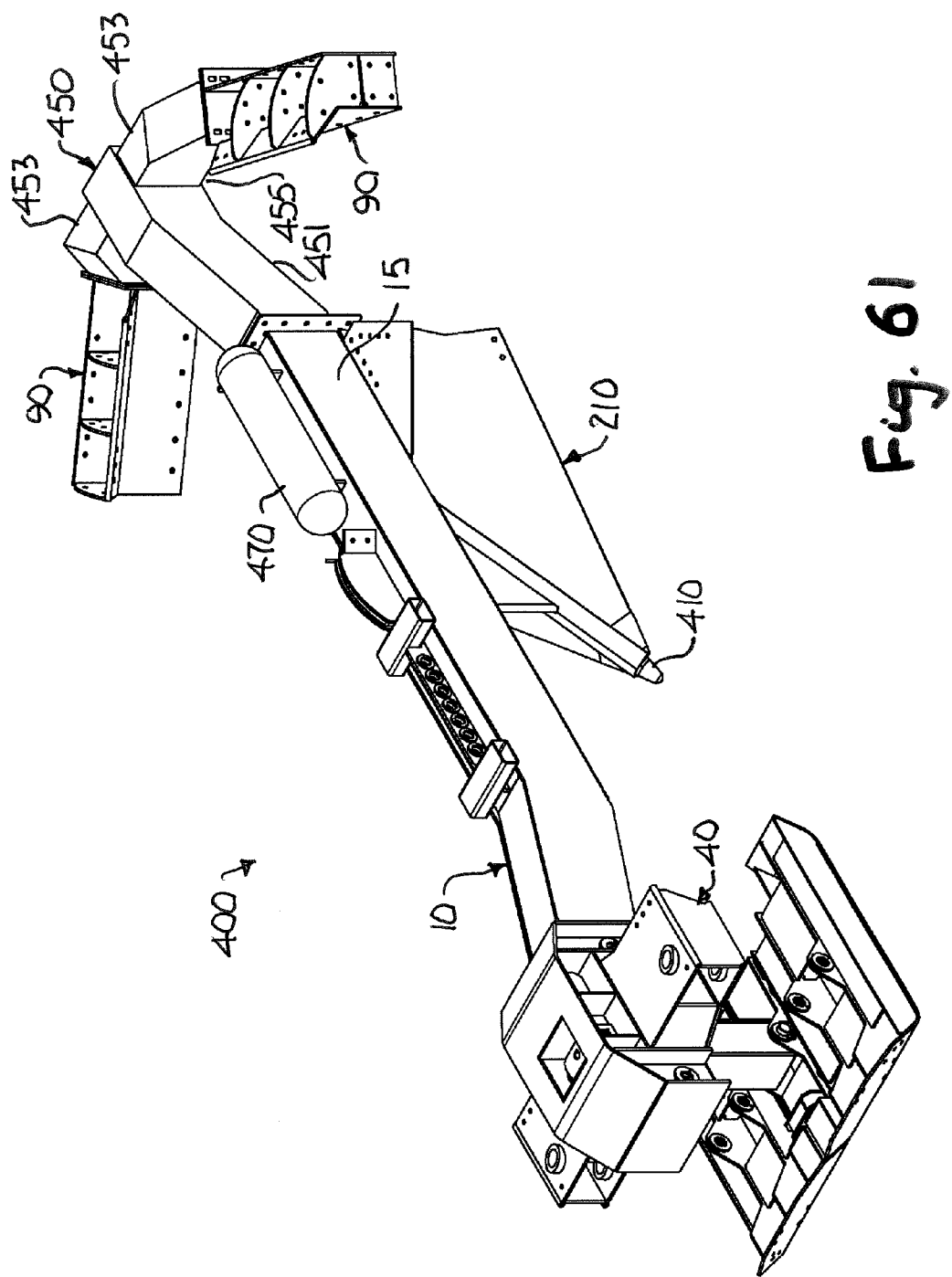
FIG. 61 is a top, right, front perspective view of an externally mounted instrumented bottle embodiment of a BAS plow with moldboards mounted on an angled extension.
Figure 62:
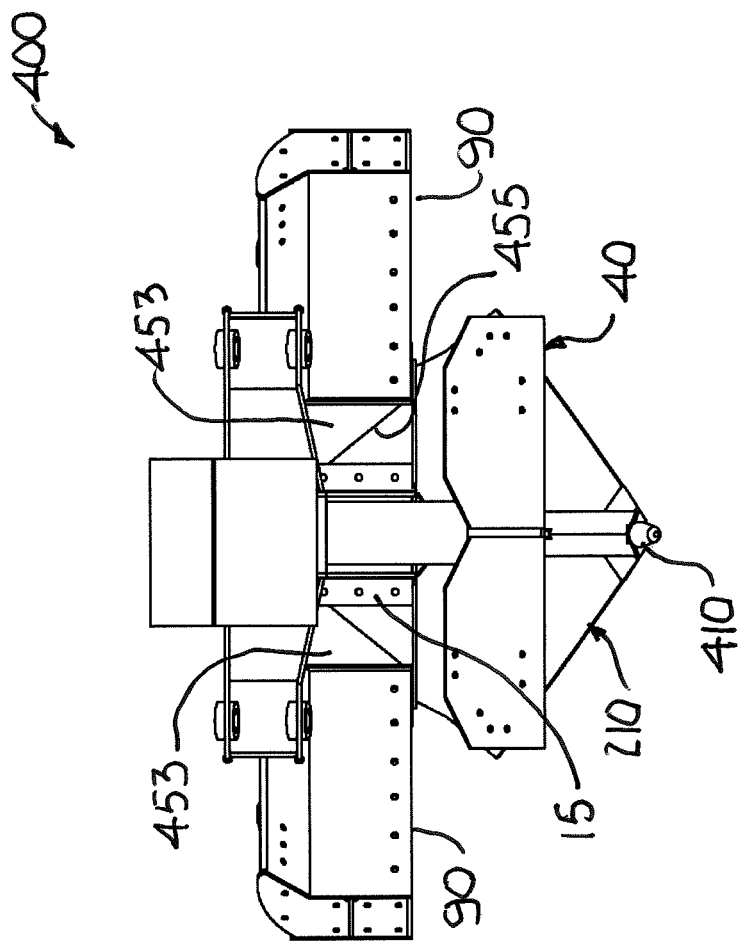
FIG. 62 is a front elevation view of a the BAS plow of FIG. 61.
Figure 63:
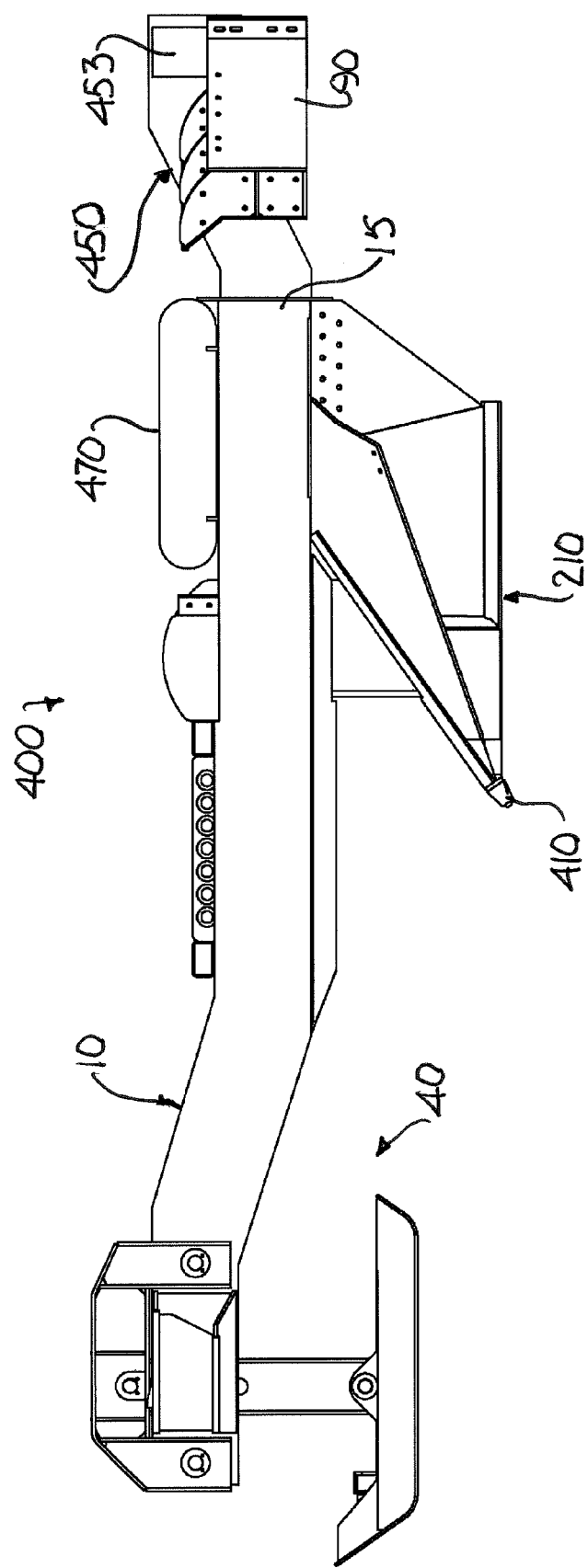
FIG. 63 is a side elevation view of a the BAS plow of FIG. 61.
Figure 64:
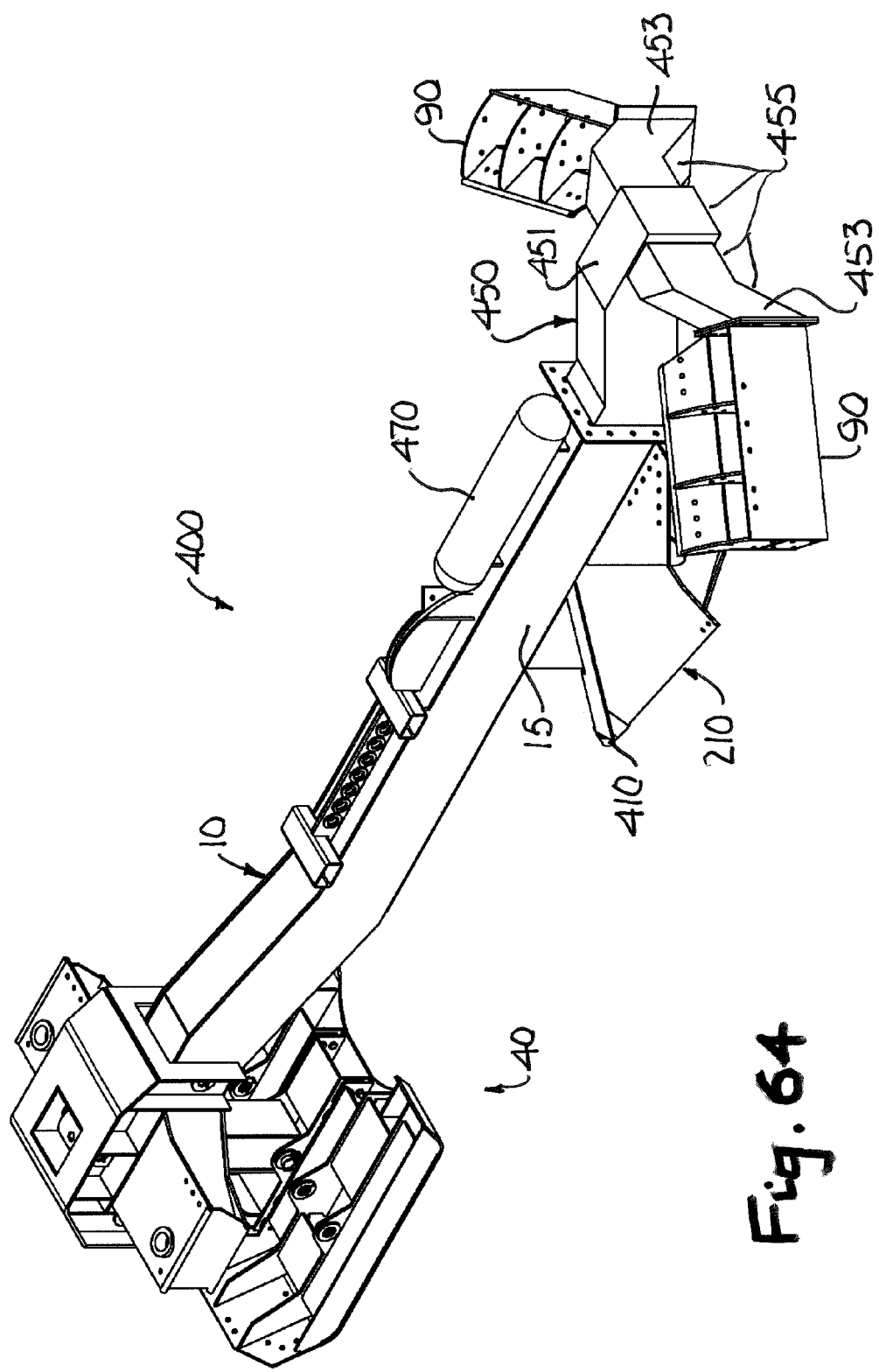
FIG. 64 is a top, left, rear perspective view of the BAS plow of FIG. 61.
Figure 65:
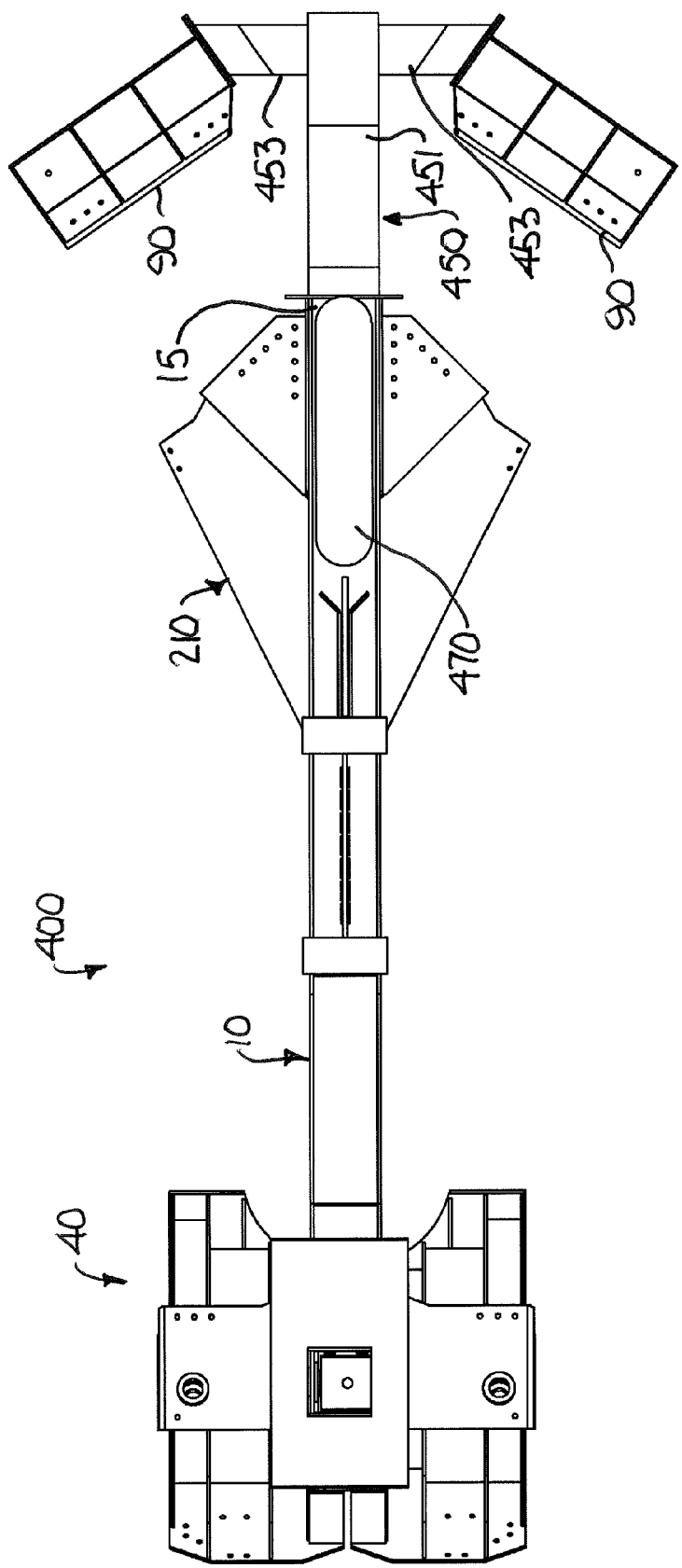
FIG. 65 is a top plan view of a the BAS plow of FIG. 61.
Figure 66:
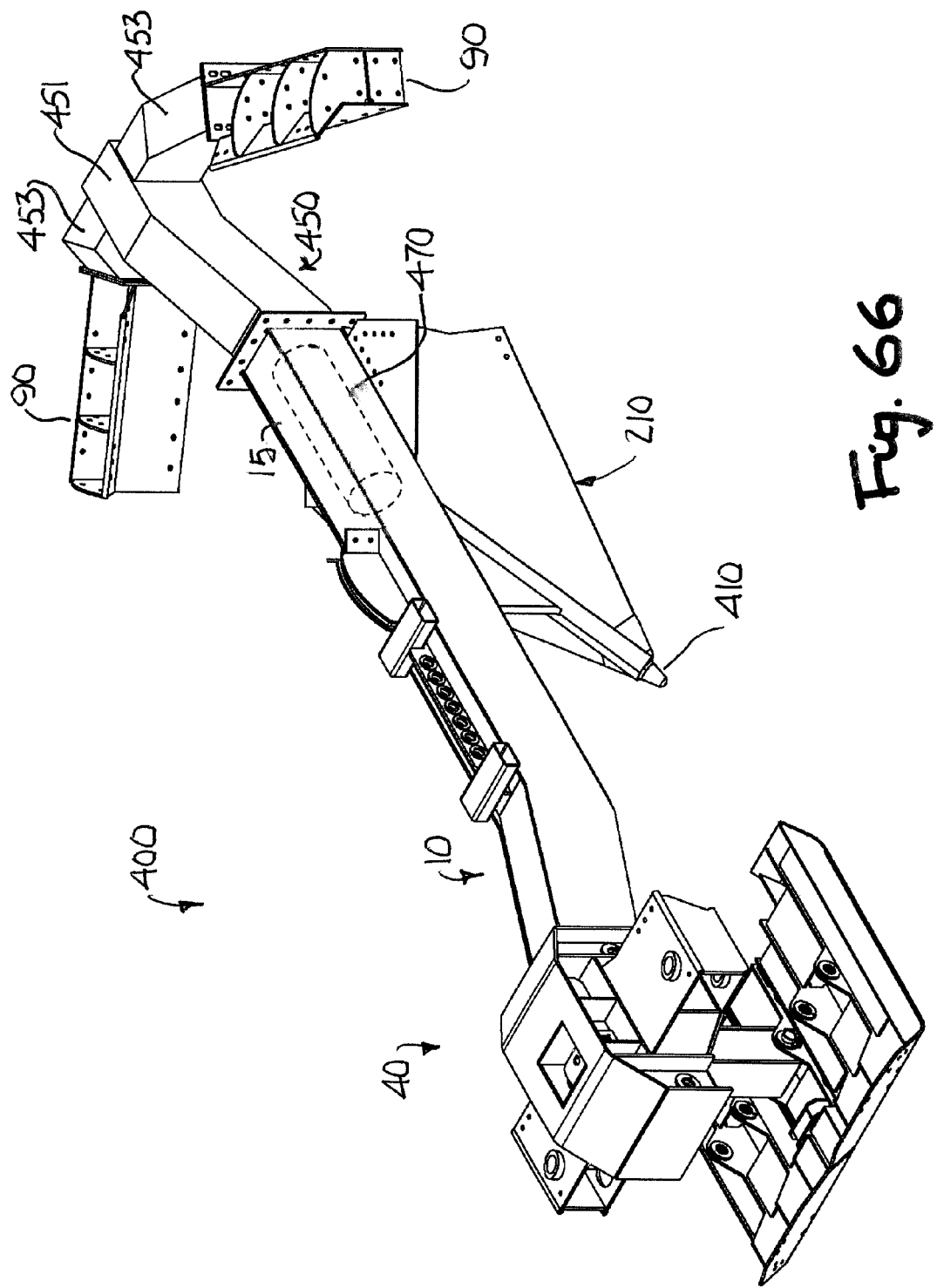
FIG. 66 is a top, right, front perspective view of an internally mounted instrumented bottle embodiment of a BAS plow without boulder clearance boards.
Figure 67:
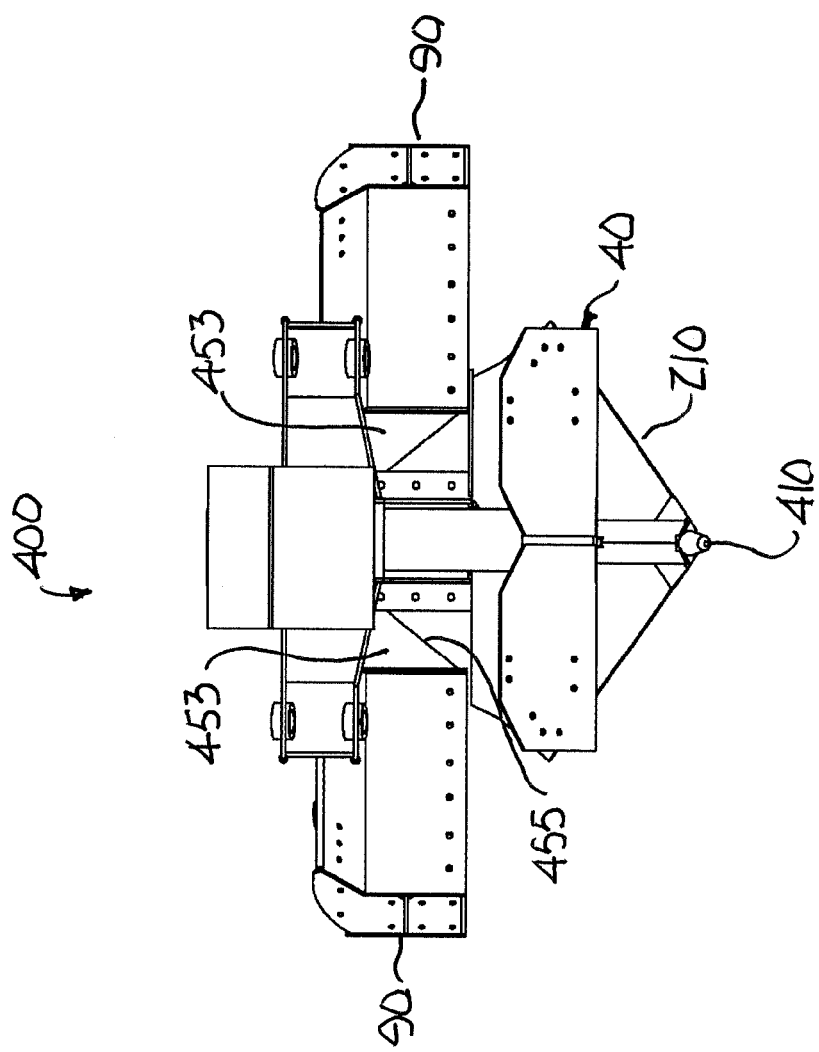
FIG. 67 is a front elevation view of a the BAS plow of FIG. 66.
Figure 68:
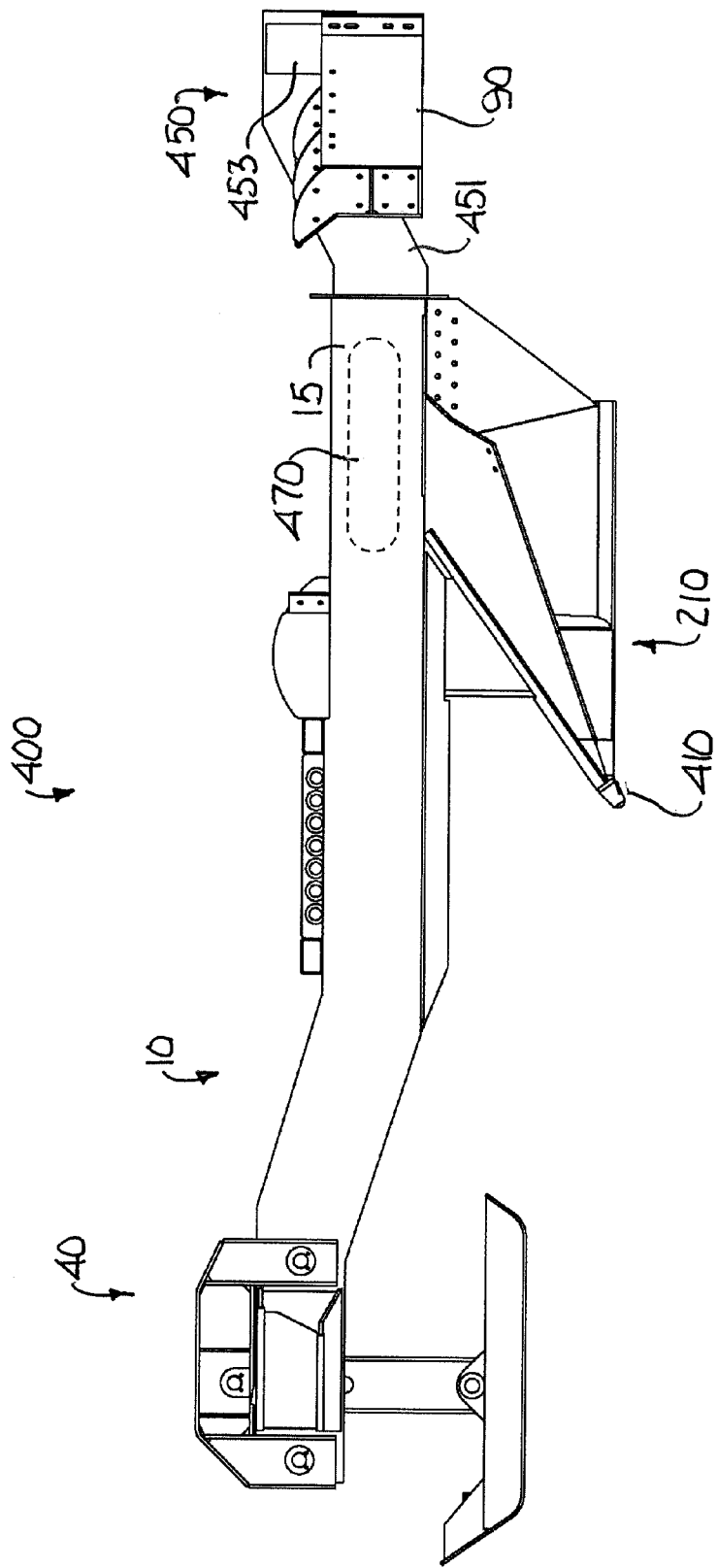
FIG. 68 is a side elevation view of a the BAS plow of FIG. 66.
Figure 69:
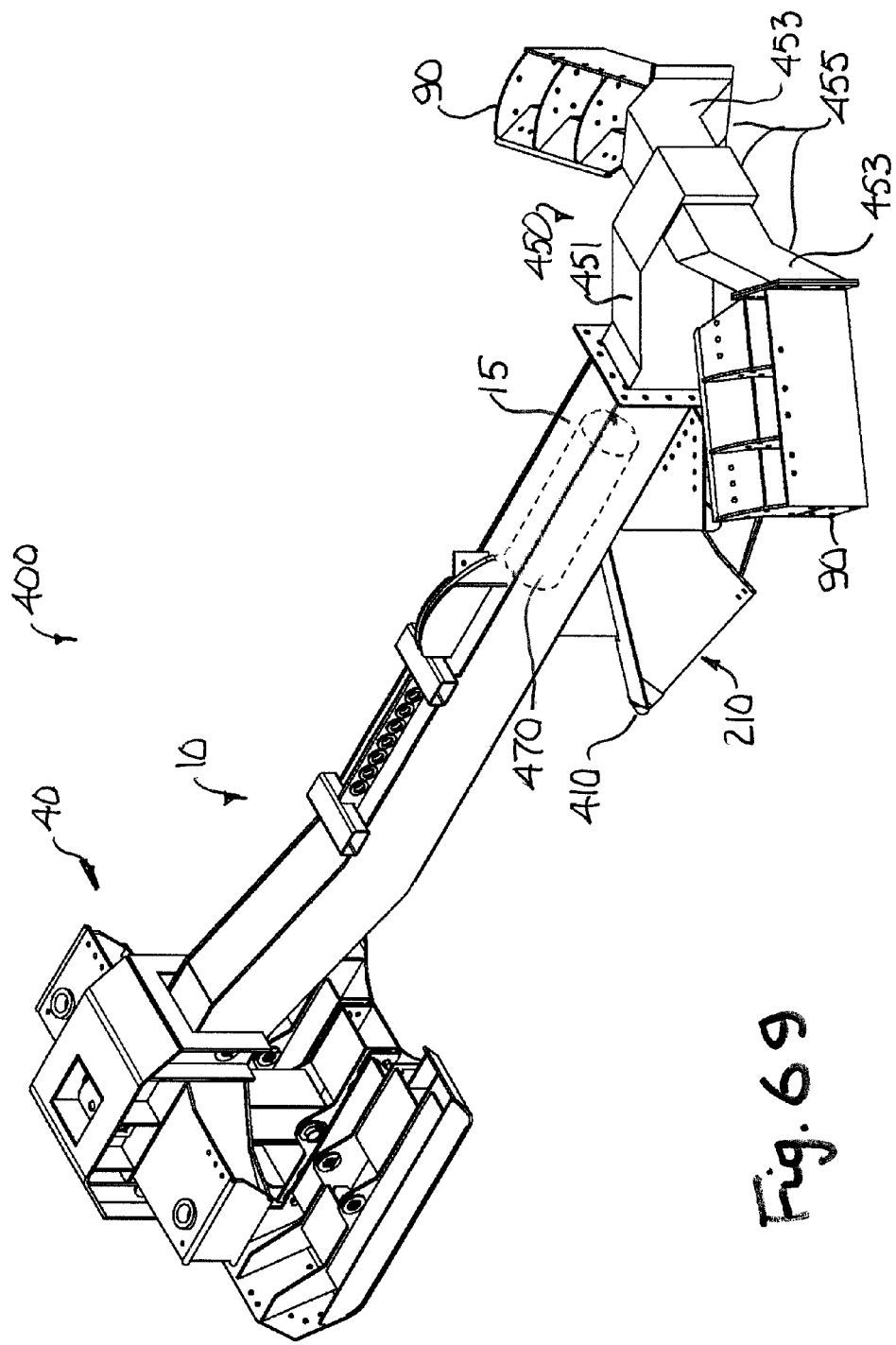
FIG. 69 is a top, left, rear perspective view of the BAS plow of FIG. 66.
Figure 70:
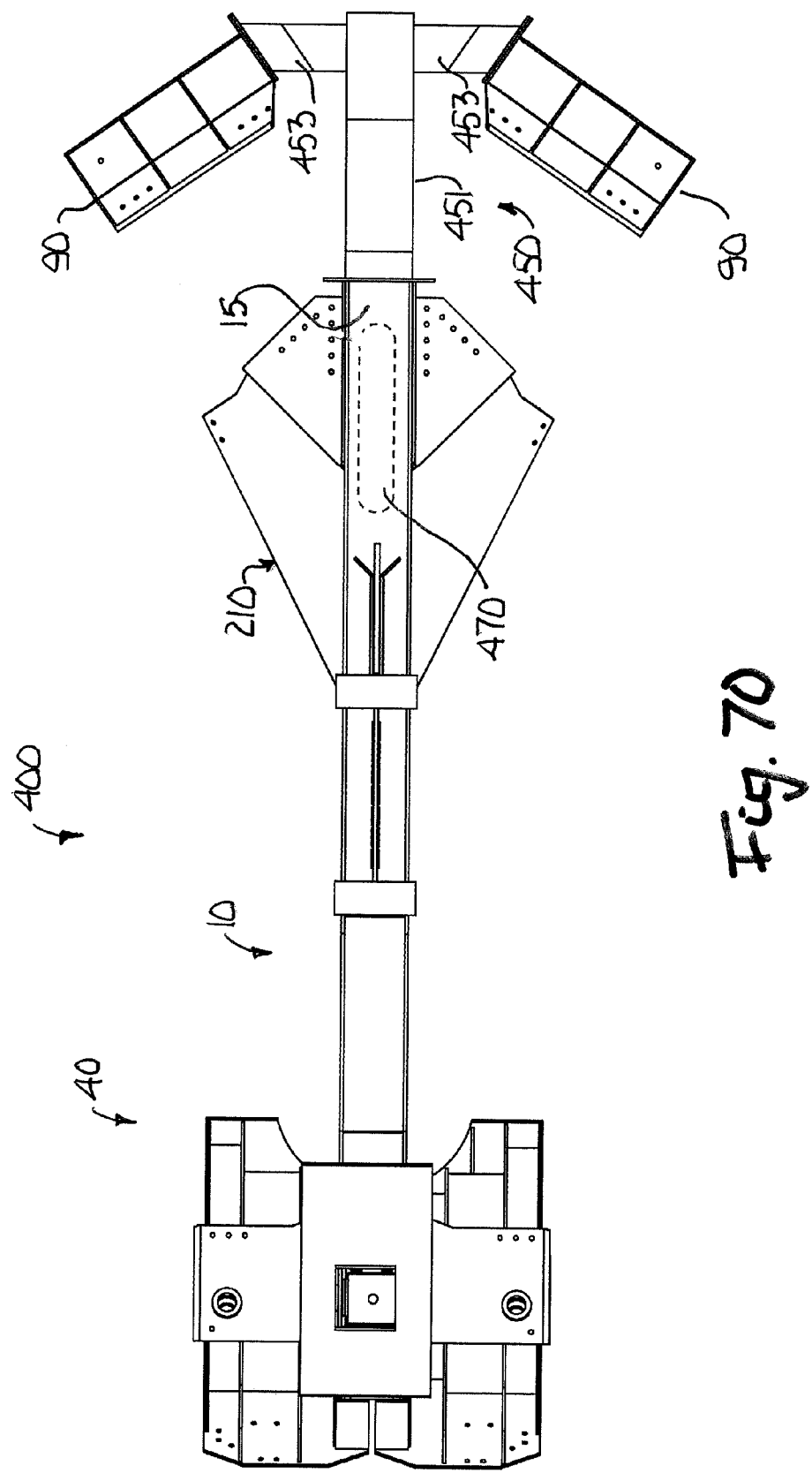
FIG. 70 is a top plan view of a the BAS plow of FIG. 66.
Figure 72:
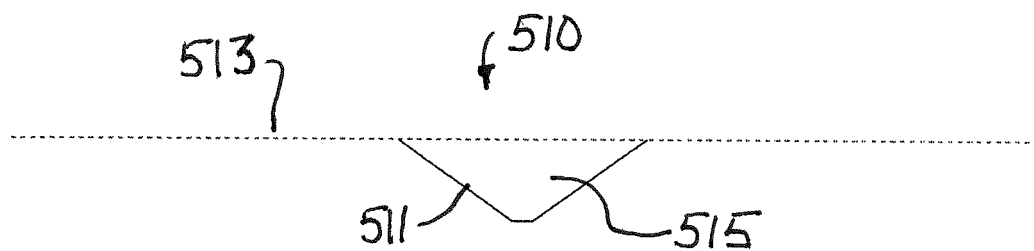
FIG. 72 is a trenching profile created by the BAS plow of FIG. 56.

Looking at FIGS. 56-60, the instrumented bottle 470 is mounted externally on the chassis 10 of the BAS plow 400 and the mold boards 90 are mounted on the straight extension 430 of the tool end 15 of the chassis 10. This embodiment is used when it is desirable to backfill the trench created by the BAS plow 400 but is unlike the backfill plow 300 described in relation to FIG. 37. In the backfill plow 300, the moldboards 90 lead the skid 40 with the apex of the moldboards 90 directed at the skid 40. In the BAS plow 400 of FIGS. 56-60, the moldboards 90 trail the skid 40 with the apex of the moldboards 90 directed away from the skid 40. This is the opposite of the moldboards 90 of not only the backfill plow 300 of FIG. 37 but also of the trench cutting plow 200 of FIG. 26, so conversion of this embodiment of the BAS plow 400 to the trench cutting plow 200 would require removal of the extension 430 and moldboards 90 and attachment of the moldboards 90, if desired, directly to the chassis 10. As best seen in FIG. 60, the straight extension 430 is T-shaped. The T-shaped extension 430 has a leg 431 mounted on and extending rearward from the trailing end 15 of the chassis 10 and arms 433 extending outward from a trailing end of the leg 431. The moldboards 90 extend outward and forward from distal ends of the arms 433. As best seen in FIGS. 57 and 58, the bottom surfaces of the leg 431, the arms 433 and the moldboards 90 are in a common plane 435. This embodiment is especially useful when there are no large boulders on the pipeline or cable path. Large, as herein used, refers to boulders which would be expected not to fit within the cross-section of the trench. However, the elevation of the moldboards 90 can be adjusted on the arms 433 of the extension 430 to accommodate the sand/boulder content of the seabed and best backfill the trench. The trenching profile 510 resulting from the first pass of the BAS plow embodiment of FIGS. 56-60 is seen in FIG. 72 in which the V-trench 511 below the seabed 513 is filled with spoil or spoil and small boulders 515.

Figure 73:
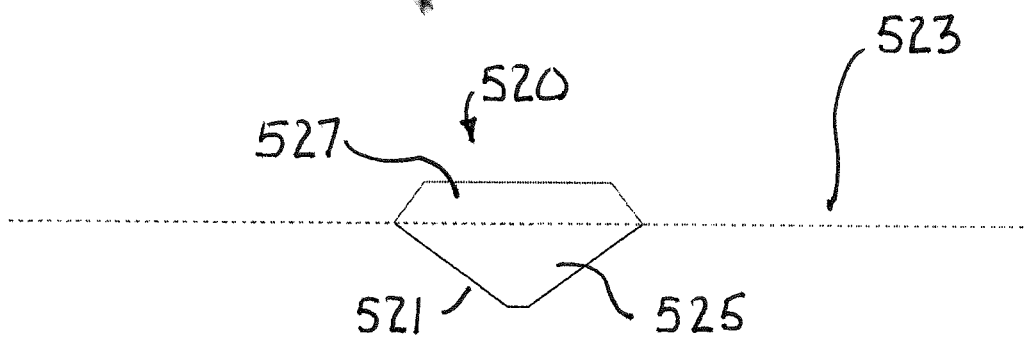
FIG. 73 is a trenching profile created by the BAS plows of FIGS. 61 and 66.
Figure 74:
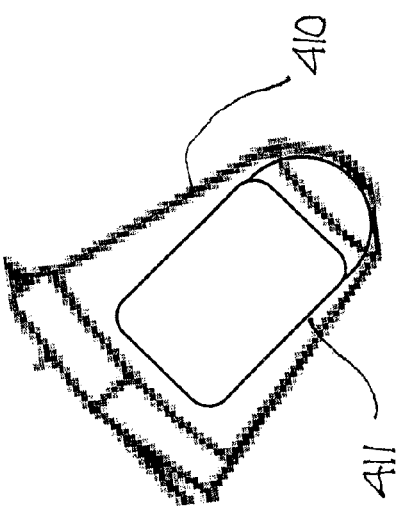
FIG. 74 is a schematic diagram illustrating the operation of the plow share tip sensor.
Figure 75:
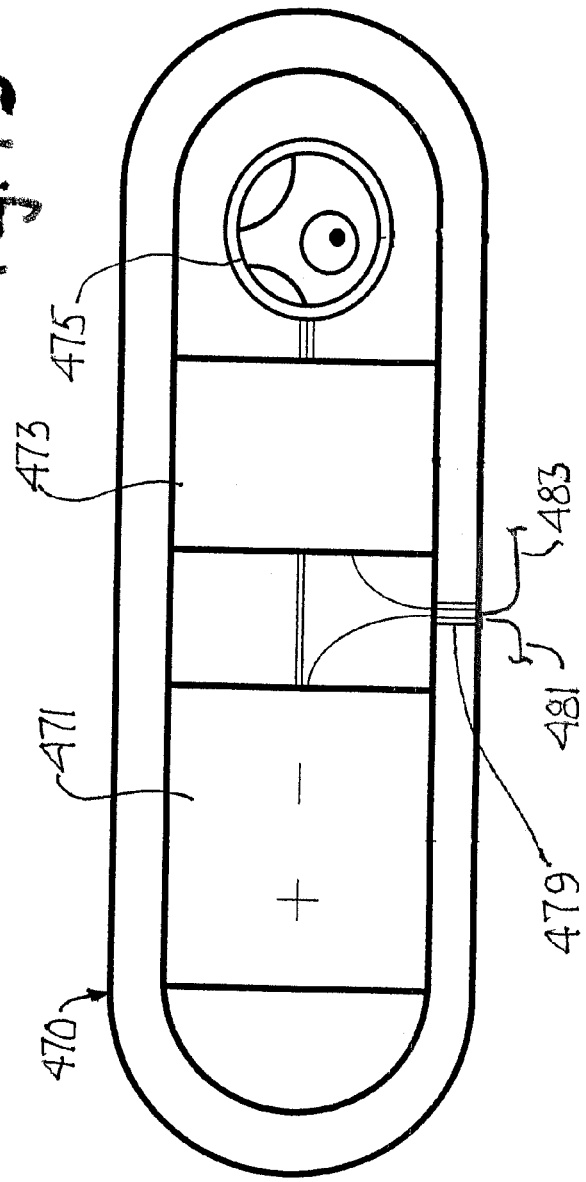
FIG. 75 is a schematic diagram illustrating the contents and operation of the instrumented bottle.

Looking at FIGS. 61-65, the instrumented bottle 470 is mounted externally on the chassis 10 of the BAS plow 400 and the mold boards 90 are mounted on the angled extension 450 of the tool end 15 of the chassis 10. This embodiment of the BAS plow 400 is similar to the embodiment of FIGS. 56-60 and is also used to backfill the trench created by the BAS plow 400. It is unlike the embodiment of FIGS. 56-60 in that, while T-shaped, the leg 451 of the T is angled rearward and upward to its arms 453 and the outer portions of the arms 453 of the arms 453 are angled outward and downward to the moldboards 90. Thus, the bottom surfaces of the leg 451 and the arms 453 define an arch 455 permitting spoil and large objects such as boulders to pass between the moldboards 90 and be deposited in and/or lie on the trench within the confines of the inner perimeter of the arch. The elevation of the moldboards 90 can be adjusted on the arms 453 of the extension 450 to accommodate the sand/boulder content of the seabed and best backfill the trench. The trenching profile 520 resulting from the first pass of the BAS plow embodiment of FIGS. 61-65 is seen in FIG. 73 in which the V-trench 521 below the seabed 523 is filled by the collected spoil or spoil and boulders 525 and covered by the collected spoil or spoil and boulders 527 which has passed through the arch 455.

Turning to FIGS. 66-70, the illustrated embodiment of the BAS plow 400 is in all respects the same as the embodiment illustrated in FIGS. 61-65, except that the instrumented bottle 470 is mounted internally in the chassis 10 of the BAS plow 400. As with the external bottle embodiments, the internal instrument bottle 470 is secured in longitudinal axial alignment with the tool end 15 of the chassis 10. The instrumented bottle 470 can similarly be mounted within the chassis 10 of the BAS plow 400 embodiments of FIGS. 51-55 and 56-60. The trenching profile 520 resulting from the first pass of the BAS plow embodiment of FIGS. 66-70 is seen in FIG. 73 in which the V-trench 521 below the seabed 523 is filled by the collected spoil or spoil and boulders 525 and covered by the collected spoil or spoil and boulders 527 which has passed through the arch 455.

As seen in FIGS. 51, 56, 61 and 66, in all configurations of the BAS plow herein shown and discussed, the sensor 410 is mounted on the tip of the plow share 210. Looking at FIG. 71, the tip of the sensor 410 houses a load cell 411 which calculates the shearing force applied by the tip of the plow 400 to the seabed 523. It measures the force required to shear the seabed material and feeds the data 481 back to a data logger 471 contained in the instrumented bottle 470. As seen in FIG. 72, the instrumented bottle 470 includes a power source 471, the data logger 473, a gyro 475 and a load sensors input 477. The gyro measures the pitch, roll, heading, yaw, three dimensional positioning and speed of the plow 400 and the V-trench depth. In addition, load cells 479 mounted on the tow points 65 of the skid 40 calculate the tow force applied to the plow 400 and this load cell data 483 is fed through the load cell input connection 477 to the data logger 473. The difference between the shearing force and the towing force measured at the plow chassis 10 is indicative of the proportion of the force that is actually cutting at the top of the plow share 40. All collected data is stored in the data logger 473 which can be swapped at regular intervals to download data or can be connected to the towing vessel V by an umbilical to provide a live data feed. Alternatively, a hydro-acoustic link could be used to transmit data, but the hydro-acoustic link would at best afford "all is well" signals due to the currently achievable slow transmission rates. The bottle instrumentation effectively monitors the BAS plow reaction to the seabed to image the orientation of the BAS plow 400 on the seabed. As the BAS plow 400 is towed along a possible pipeline or cable burial path, a continuous stream of data is acquired and stored to facilitate a plot of the tow force against the seabed surface position of the BAS plow 400.

The anchor-type plow share 210 herein described affords greater seabed penetration than knife-type seabed cutters. If still deeper trenches are desired, in any of the moldboard configurations of the BAS plow 400 the moldboards 90 can be extended by addition of tertiary moldboards 93 and 95, as is described in relation to the trench cutting plow 200 of FIGS. 26-29. This will facilitate multi-pass BAS plow use, as is also earlier explained in relation to the trench cutting plow 200 of FIGS. 26-29.

The various embodiments of the BAS plow 400 can be configured for release and retrieval over-the-stern using the principles hereinbefore described in relation to the boulder clearing/trench cutting/backfill plows 100/200/300, respectively. Looking at FIGS. 76-80, the over-the stern release (FIGS. 76-80) and retrieval (FIGS. 80-76) of the BAS plow 400, as shown with an internal instrumented bottle 470 and moldboards 90 mounted on a straight extension 430 as herein described, from the vessel V to the seabed S and from the seabed S onto the vessel V, respectively, are illustrated.

Figure 76:
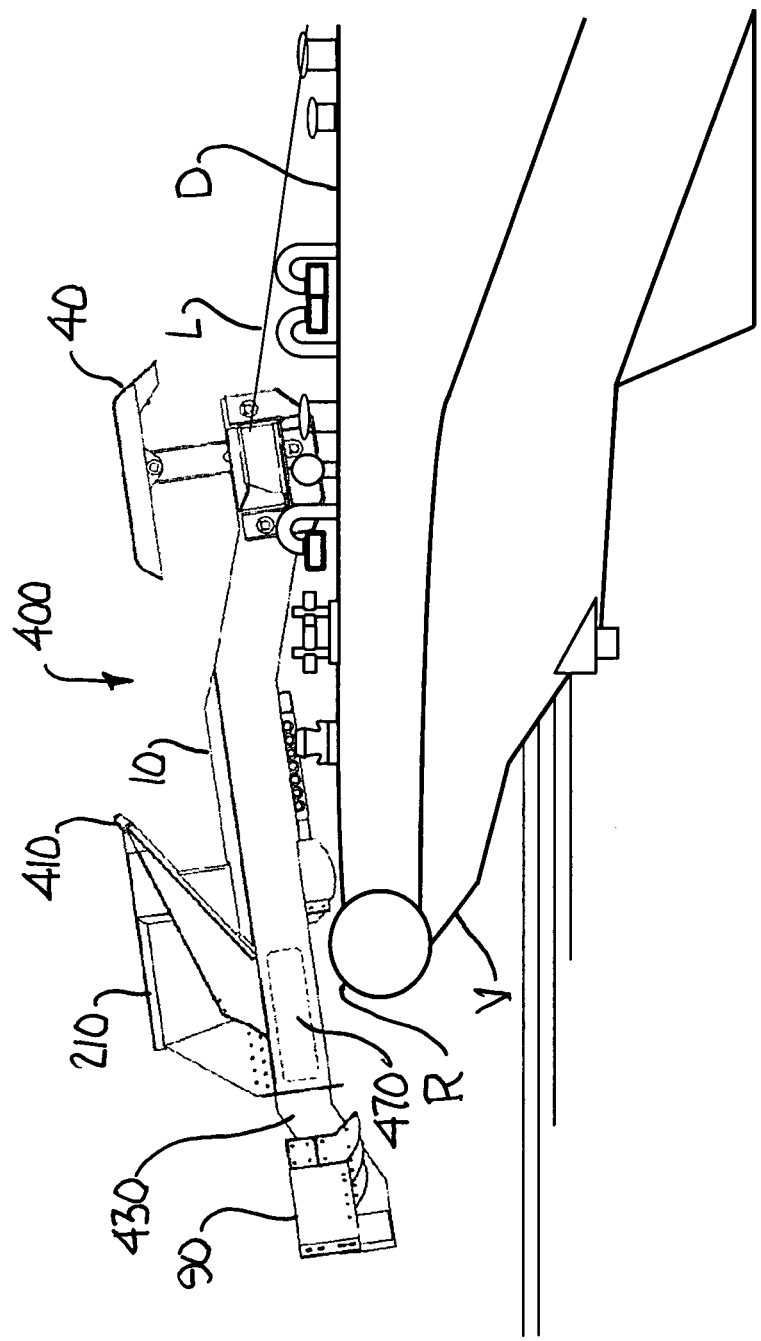
FIG. 76 is a side elevation view of a first/fifth sequential pivot of a BAS plow in release/retrieval from/to a vessel to/from the sea.
Figure 77:
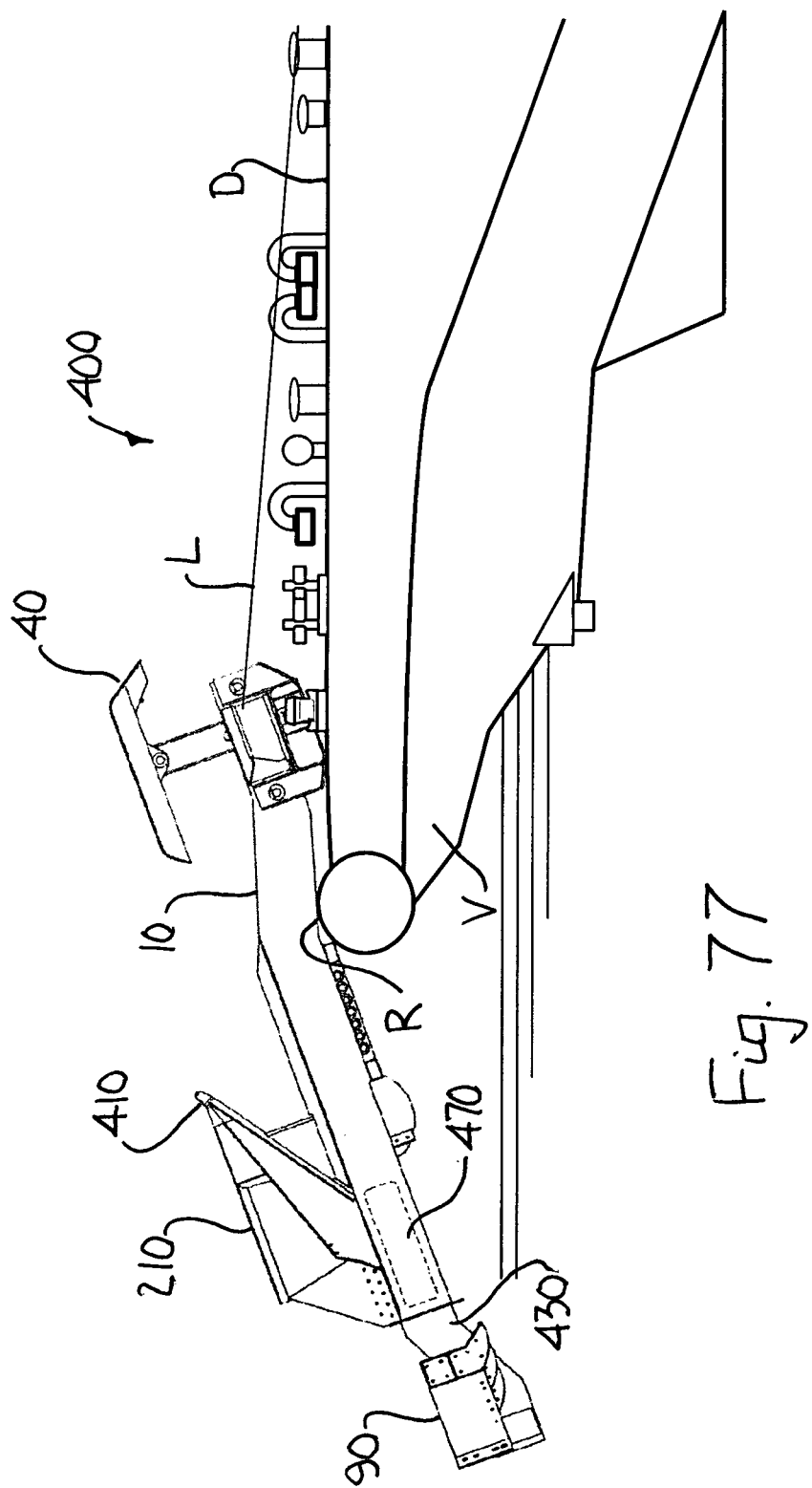
FIG. 77 is a side elevation view of a second/fourth sequential pivot of a BAS plow in release/retrieval from/to a vessel to/from the sea.
Figure 78:
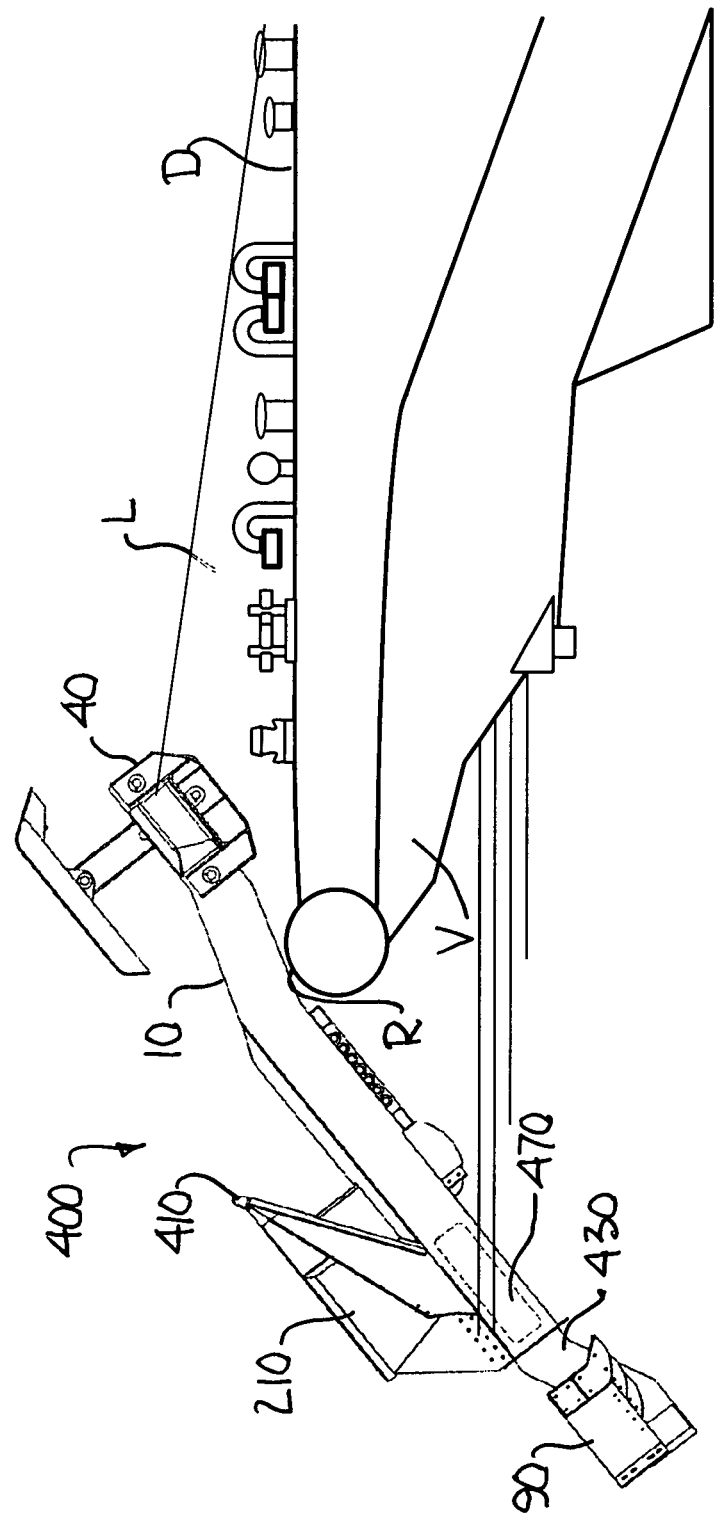
FIG. 78 is a side elevation view of a third sequential pivot of a BAS plow in release/retrieval from/to a vessel to/from the sea.

During release, the plow 400 is initially positioned upside down on the deck D with moldboards 90 at and the longitudinal axis of the plow 400 aligned on the plow's transition axis. The arcuate top 49 of the skid post 45 and the free ends of the moldboards 90 provide the initial contact points or surfaces with the deck D. As seen in FIG. 76, as the plow 400 is propelled, by winch or other suitable push/pull equipment (not shown), along the deck D of the vessel V toward and across the fulcrum/roller R at the stern of the vessel V, only the moldboards 90 and the arcuate top 49 of the post 45 will remain in contact with the fulcrum/roller R until the share connection plates 23 reach the fulcrum/roller R. As seen in FIG. 77, as the plow 400 continues sternward travel, only the tops of the share connection plates 23 followed by the trailing top or transition surface 27 of the transition member 25 and the arcuate top 49 of the post 45 will remain in contact with the fulcrum/roller R. As seen in FIG. 78, as the center of gravity of the plow 400 has passed the fulcrum/roller R, the cantilevered weight of the plow 400 causes the plow 400 to pivot, allowing the moldboards 90 to drop toward the seabed S and the skid post 45 to rise from the deck D. At this point in transition, all contact between the plow 400 and the vessel V transfers to the angled portion 17 of the chassis elongated member 11 and the fulcrum/roller R of the vessel V. Looking at FIG. 79, after the angled portion 17 of the chassis elongated member 11 has traveled sternward beyond the fulcrum/roller R, the plow 400 will have rotated further toward the seabed S and all further contact between the plow 200 and the vessel V will have transferred to the arcuate top 49 of the skid post 45 and the fulcrum/roller R of the vessel V. The arcuate top 49 of the skid post 45 provides the final contact with the fulcrum/roller R. As seen in FIG. 80, the plow 400 is fully released at the end of a pulling line L to the seabed S.

Figure 79:
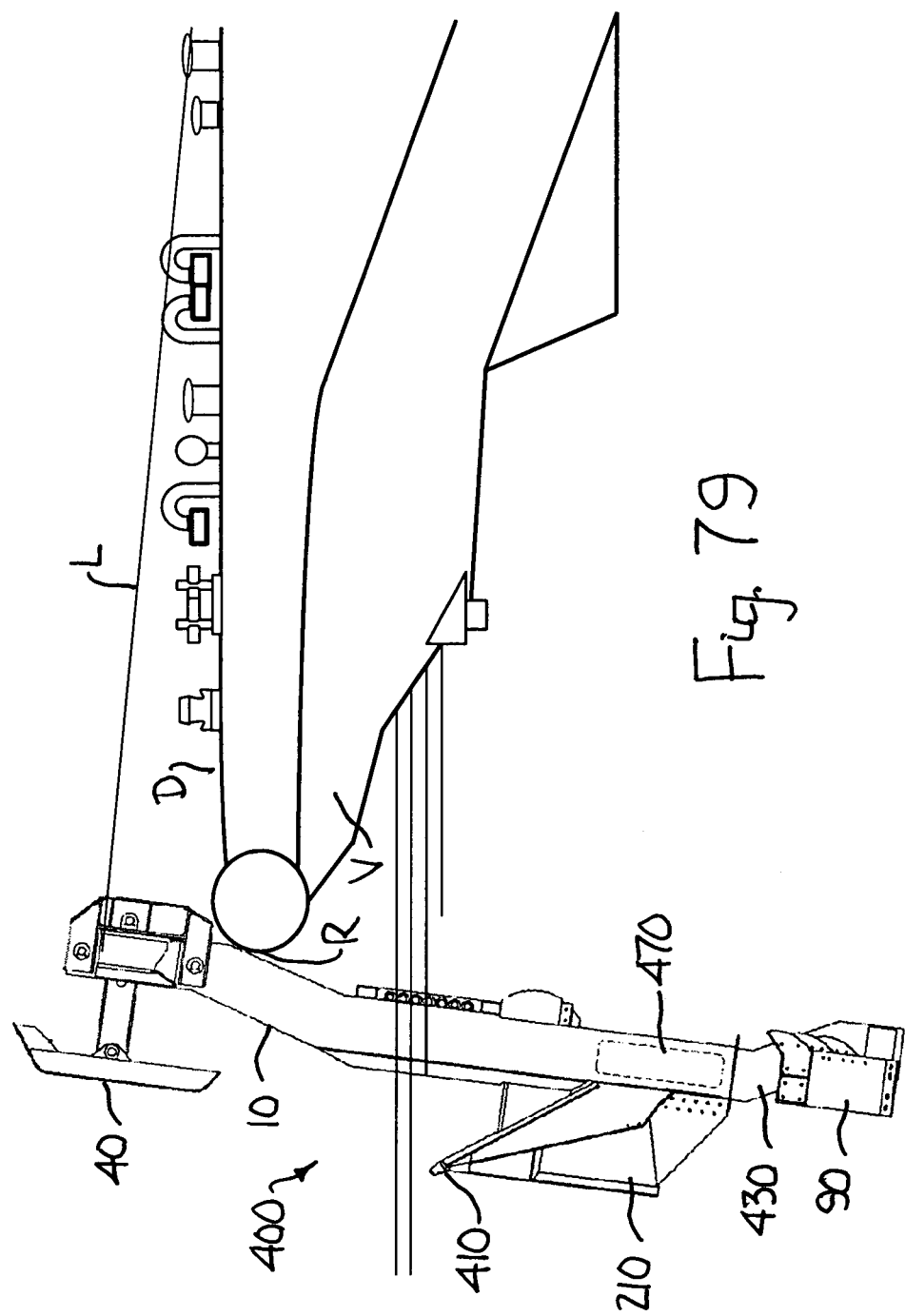
FIG. 79 is a side elevation view of a fourth/second sequential pivot of a BAS plow in release/retrieval from/to a vessel to/from the sea.

Retrieval of the BAS plow 400 at the end of the pulling line L from the seabed S is accomplished by reversal of the release method. As seen in FIG. 80, as the plow 400 is raised at the end of the line L toward the fulcrum/roller R on the stern of the vessel V, the arcuate top 49 of the skid post 45 will first contact the fulcrum/roller R. As noted above, the pulling points 65 of the plow 110 are located so as to assure that the post 45 will not hang up on the fulcrum/roller R. Further contact with the fulcrum/roller R transfers sequentially to the angled portion 17 of the chassis 10 as seen in FIG. 79, to the transition surface 27 as seen in FIG. 78, and to the tops of the share connection plates 23 as seen in FIG. 77. When the plow 400 has been pulled fully across the fulcrum/roller R, it will come to rest with the arcuate top 49 of the skid post 45 and the tops of the free ends of the moldboards 90 as the contact points on the deck D of the vessel V, as seen in FIG. 76.

The present method and apparatus are useful in the performance of burial assessment surveys. They are capable of producing continuous streams of data descriptive of the V-trench cross-sections of possible pipeline or cable paths. Since they create a V-trench which can be used as a first pass of a trench cutting process, they are also capable of reducing the total time required for combined BAS and actual pipeline or cable V-trench cutting processes. And, since they are also capable of enabling backfilling of a BAS V-trench, they can be used to perform burial assessment surveys without leaving a disrupted seabed when the trace is completed.

Thus, it is apparent that there has been provided, in accordance with the invention, a multi-mode seabed plow and plow release, operation and retrieval methods that fully satisfy the objects, aims and advantages set forth above. It is also apparent that there has been provided, in accordance with the invention, a method and apparatus for performing burial assessment surveys that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit of the appended claims.

What is claimed is:

1. For performing burial assessment surveys (BAS) along offshore pipeline and cable paths, a BAS plow comprising:
   a chassis;
   a skid mounted on a leading end of said chassis;
   an anchor-type plow share mounted proximate a trailing end of said chassis; and
   a sensor mounted on a tip of said plow share, said sensor acquiring data indicative of a shearing force applied by said plow tip to the seabed.

2. A BAS plow according to claim 1, said sensor further providing a continuous readout of said acquired data.

3. A BAS plow according to claim 1 further comprising load cells mounted on said skid providing data indicative of tow force applied to said chassis.

4. A BAS plow according to claim 1 further comprising a bottle mounted externally on said chassis.

5. A BAS plow according to claim 1 further comprising a bottle mounted internally within said chassis.

6. A BAS plow according to claim 1 further comprising:
   a T-shaped extension having a leg mounted on and extending rearward from said trailing end of said chassis and arms extending outward from a trailing end of said leg; and
   moldboards extending outward and forward from distal ends of said arms, bottom surfaces of said leg, said arms and said moldboards being in a common plane.

7. A BAS plow according to claim 6, an elevation of said moldboards in relation to said arms being adjustable.

8. A BAS plow according to claim 1 further comprising:
   a T-shaped extension having a leg mounted on and extending rearward and upward from said trailing end of said chassis and arms extending outward and downward from a trailing end of said leg; and
   moldboards extending forward from distal ends of said arms, bottom surfaces of said leg and said arms defining an arch between said moldboards.

9. A BAS plow according to claim 8, an elevation of said moldboards in relation to said arms being adjustable.

10. A BAS plow according to claim 1 further comprising a gyro measuring electronic logging data indicative of at least one of pitch, roll, heading, yaw, three dimensional positioning and speed of the plow.

11. A BAS plow according to claim 1 further comprising a data transmission umbilical providing a real time stream of data.

12. A BAS plow according to claim 1 further comprising a hydro-acoustic link.

13. A method of performing burial assessment surveys (BAS) along offshore pipeline and cable paths comprising the steps of:
   towing on the seabed a BAS plow having an anchor-type plow share with a sensor mounted on a tip of a plow share and a bottle mounted on the plow, the bottle containing instruments adapted to collect selected types of BAS data and the sensor being adapted to collect data indicative of a shearing force applied by the plow tip to the seabed; and simultaneously creating a V-shaped trench and continuously acquiring the collected selected types of BAS data and the data indicative of a shearing force applied by the plow tip to the seabed along the trench being created as the BAS plow is towed.

14. A method according to claim 13, the data indicative of a shearing force comprising at least the tip resistance of the plow share.

15. A method according to claim 13, said step of continuously acquiring comprising towing the BAS plow with load cells located to monitor at least one of the tow tension and tow force applied to the plow.

* * * * *